(12) United States Patent
Kikkawa et al.

(10) Patent No.: US 8,135,844 B2
(45) Date of Patent: Mar. 13, 2012

(54) CONTENT PROVIDING SERVER, INFORMATION PROCESSING DEVICE AND METHOD, AND COMPUTER PROGRAM

(75) Inventors: Norifumi Kikkawa, Tokyo (JP); Tatsuya Igarashi, Tokyo (JP); Hiroyuki Mitsubori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1625 days.

(21) Appl. No.: 10/552,442

(22) PCT Filed: Apr. 5, 2004

(86) PCT No.: PCT/JP2004/004921
§ 371 (c)(1),
(2), (4) Date: Oct. 7, 2005

(87) PCT Pub. No.: WO2004/090736
PCT Pub. Date: Oct. 21, 2004

(65) Prior Publication Data
US 2006/0212531 A1    Sep. 21, 2006

(30) Foreign Application Priority Data
Apr. 8, 2003 (JP) ................ P2003-103717

(51) Int. Cl.
G06F 15/16    (2006.01)
(52) U.S. Cl. ................ 709/227; 709/203
(58) Field of Classification Search ............ 709/227
See application file for complete search history.

(56) References Cited

U.S. PATENT DOCUMENTS

| | | | |
|---|---|---|---|
| 5,878,222 A * | 3/1999 | Harrison | 725/139 |
| 6,304,564 B1 * | 10/2001 | Monin et al. | 370/338 |
| 6,421,733 B1 * | 7/2002 | Tso et al. | 709/246 |
| 6,970,127 B2 * | 11/2005 | Rakib | 341/173 |
| 7,024,679 B1 * | 4/2006 | Sie et al. | 725/101 |

(Continued)

FOREIGN PATENT DOCUMENTS

| | | |
|---|---|---|
| CA | 2 324 856 | 5/2001 |
| JP | 11-088279 | 3/1999 |
| JP | 2001-092749 | 4/2001 |
| JP | 2001-211410 | 8/2001 |

(Continued)

OTHER PUBLICATIONS

Steidley, C.W.; Object-oriented software: theory, practice, and implementation; Northcon/93 Conference Record; Oct. 12-14, 1993; pp. 132-135; pp. 1-4 as printed.*

*Primary Examiner* — Philip Chea
*Assistant Examiner* — Michael Chao
(74) *Attorney, Agent, or Firm* — Finnegan, Henderson, Farabow, Garrett & Dunner, L.L.P.

(57) ABSTRACT

A device and method is provided to enable improved control of streaming live delivery and recording processing as to a client from a server of tuner-received content. This is configured such that a tuner control instance which executes streaming delivery of the tuner-received content under the control of the tuner, and a storage unit control instance which executes recording of the tuner-received content under the control of the content storage unit such as a hard disk, are independently set, and to each a channel list URL and video capsule URL are set as the content URL capable of specifying the processing control object, and requests can be received from the client individually by setting a control instance ID which is a control instance (AVT instance) identifier. By this configuration, independent processing according to the client request is enabled.

28 Claims, 29 Drawing Sheets

U.S. PATENT DOCUMENTS

| | | | |
|---|---|---|---|
| 7,085,814 B1 * | 8/2006 | Gandhi et al. | 709/208 |
| 7,159,224 B2 * | 1/2007 | Sharma et al. | 719/310 |
| 2002/0019827 A1 * | 2/2002 | Shiman et al. | 707/200 |
| 2002/0095359 A1 | 7/2002 | Mangetsu | |
| 2003/0088876 A1 * | 5/2003 | Mao et al. | 725/91 |
| 2003/0182567 A1 * | 9/2003 | Barton et al. | 713/193 |
| 2004/0236844 A1 | 11/2004 | Kocherlakota | |

FOREIGN PATENT DOCUMENTS

| | | |
|---|---|---|
| JP | 2001-333410 | 11/2001 |
| JP | 2002-140614 | 5/2002 |
| JP | 2002-189943 | 7/2002 |
| JP | 2002-312391 | 10/2002 |
| JP | 2002-354451 | 12/2002 |
| JP | 2003-050799 | 2/2003 |

* cited by examiner

FIG. 4

| CONTENT NO. | TITLE | ARTIST NAME | CHANNEL | CONTENT URL |
|---|---|---|---|---|
| 0001 | Abc··ffg | Csde··fddd | ··· | http://1.2··· (VIDEO CAPSULE URL) |
| 0002 | | | | |
| 0003 | TERRESTRIAL CHANNEL LIST | | 1ch – 12ch | http://1.2··· (CHANNEL LIST URL) |
| 0004 | SATELLITE BROADCAST CHANNEL LIST | | BS1ch – CSnnch | http://5,6··· (CHANNEL LIST URL) |
| | | | | |

FIG. 10

| CLIENT | CONNECTION ID | AVT INSTANCE ID | PROTOCOL INFORMATION |
|---|---|---|---|
| CLIENT A | 123aac33 | AB66ac33 | MPEG |
| CLIENT B | 253bed31 | CD54ed22 | internal:1.2.3.4:application/x-av-tuner-content:func-id=t01 |
| .. | .. | .. | .. |
| CLIENT N | 753bab55 | ED78ab21 | ATRAC |

| CLIENT | CONNECTION ID | AVT INSTANCE ID | PROTOCOL INFORMATION |
|---|---|---|---|
| CLIENT A | 123aac33 | AB66ac33<br>(TUNER CONTROL) | internal:1.2.3.4:application<br>/x-av-tuner-content:func-id=t01 — 681 |
| CLIENT A | 253bed31 | CD54ed22<br>(VIDEO CAPSULE CONTROL) | internal:1.2.3.4:video/mpeg:func-id=hdd"<br>av:codec="MPEG2V" duration="00:00:00.000" ... — 682 |
| .. | .. | .. | .. |
| CLIENT N | 753bab55 | ED78ab21 | ATRAC |

FIG. 21

| PROPERTY | CONTENT |
|---|---|
| av:recordStatus | SPECIFY Recording. |
| av:recordStart DateTime | RECORDIGN START TIME. FOR LIVE RECORDINGS, 0000-00-00T00:00:00.000Z IS SPECIFIED. TIME ZONE PORTIONS MAY DIFFER. |
| av:recordEndDateTime | RECORDING END TIME.<br>SPECIFICATION OF THE CLIENT IS Optional. WHETHER OR NOT THE SERVER CAN PERFORM SETTINGS IS ALSO Optional. CLIENT MUST CHECK Capability AS TO WHETHER OR NOT THIS PROPERTY CAN BE SET WITH X_GetSchema.<br>IN THE CASE THAT SPECIFICATION IS MADE, IF THIS VIDEO CAPSULE IS IN A RECORDIGN STATE IN THE SERVER AT THIS TIME, THE RECORDING IS ENDED.<br>IN THE CASE THAT SETTINGS ARE NOT MADE, IF SUFFICIENT TIME HAS PASSED, OR IN THE CASE THAT PROBLEMS HAVE OCCURRED WITHIN THE SERVER, THE SERVER MAY END THE RECORDING. |
| av:recordQuality Level | IMAGE QUALITY LEVEL AT TIME OF RECORDING.<br>SPECIFICATION OF THE CLIENT IS Optional. CLIENT MUST CHECK THE VALUE CAPABLE OF SETTINGS. |
| av:recordInput FuncID | FuncID ILLUSTRATING THE FUNCIONALITY HANDLING THE CONTENT TO BE THE RECORDING SOURCE.<br>SPECIFICATION OF THE CLIENT IS Optional. CLIENT MUST CHECK THE VALUE CAPABLE OF SETTINGS. |
| av:recording Method | RECORDING METHOD.<br>SPECIFICATION OF THE CLIENT IS Optional. CLIENT MUST CHECK THE VALUE CAPABLE OF SETTINGS. |
| res | SHOWS RESOURCE OF THE CONTENT TO BE THE RECORDING SINK.<br>DO NOT ADD IN THE CASE OF NOT SPECIFYING res@protocolInfo.<br>LEAVE THE res VALUE BLANK IN THE CASE OF SPECIFYING res@protocolInfo. |
| res@protocol Info | PROTOCOL INFORMATION OF THE CONTENT TO BE THE RECORDING SINK.<br>Func-id OF additionalInfo (FOURTH COLUMN) ONLY CAN BE SPECIFIED. THIS ILLUSTRATES THE FUNCTIONALITY FOR HANDLING THE CONTENT TO BE THE RECORDING SINK. THE OTHER COLUMNS ARE SPECIFIED WITH "*".<br>SPECIFICATION OF THE CLIENT IS Optional. CLIENT MUST CHECK THE VALUE CAPABLE OF SETTINGS.<br>EXAMPLE: *:*:*:fnc-id=hdd1 |

FIG. 25

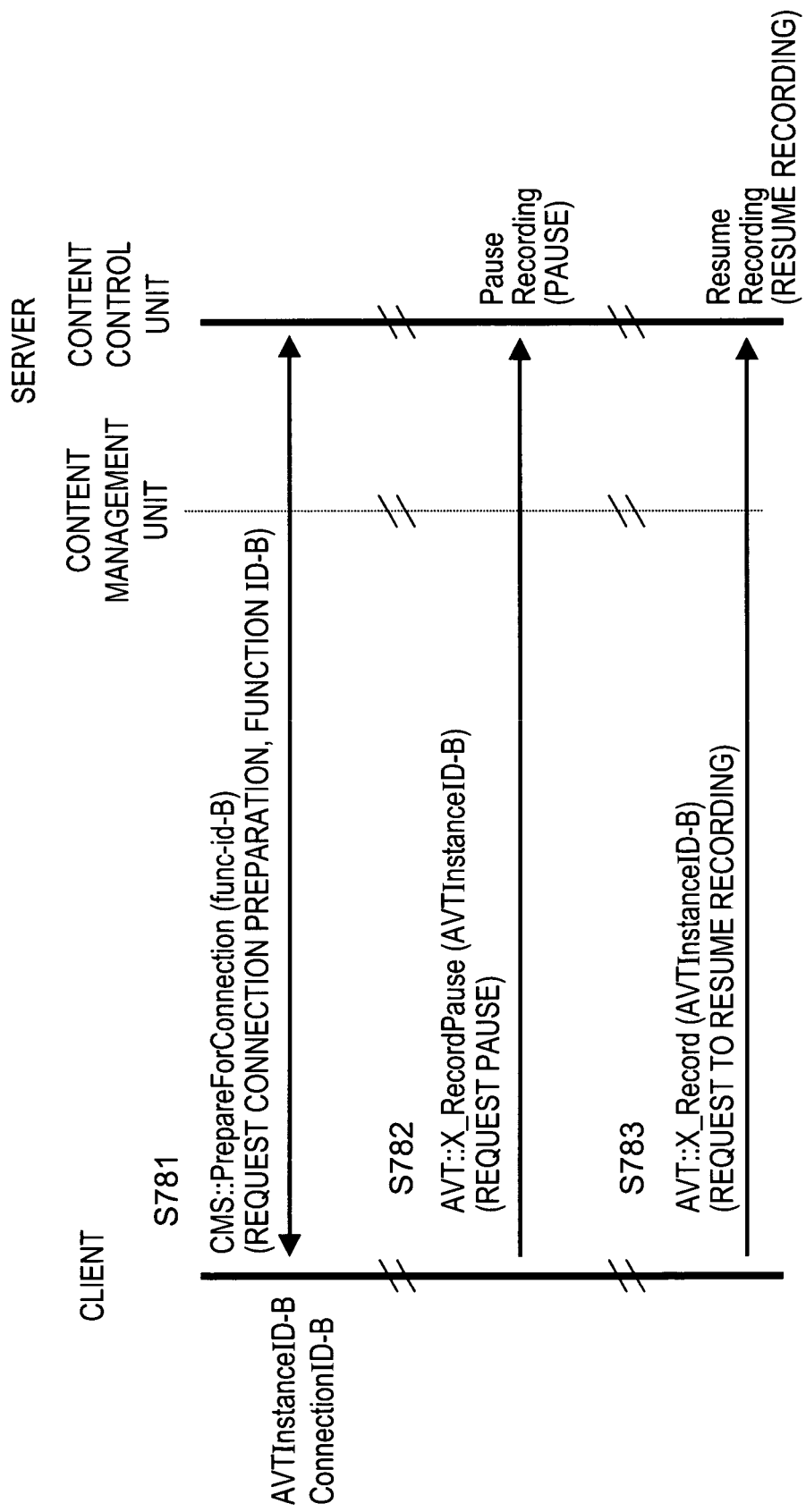

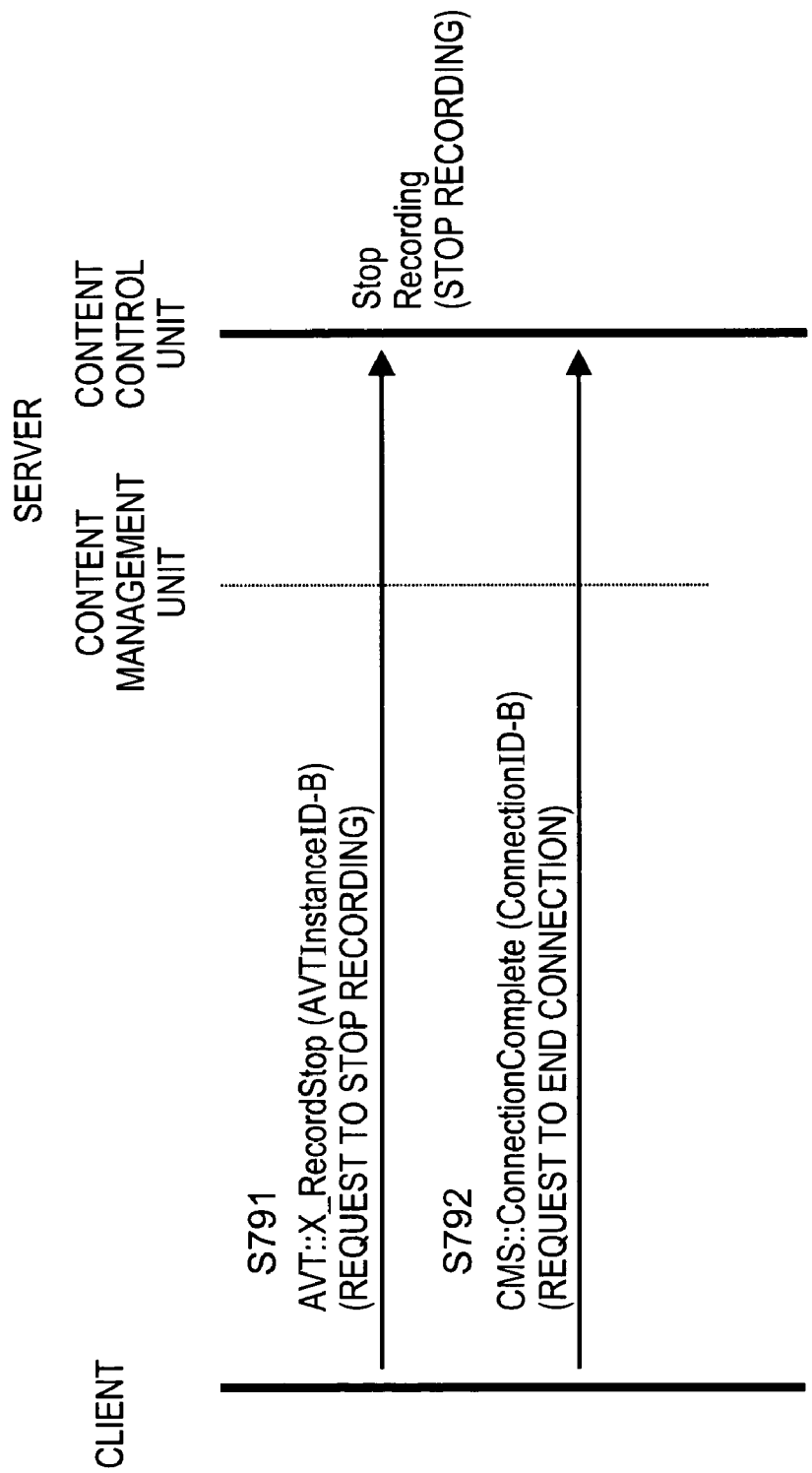

CONTENT PROVIDING SERVER, INFORMATION PROCESSING DEVICE AND METHOD, AND COMPUTER PROGRAM

CROSS REFERENCE TO RELATED APPLICATIONS

This application is a national phase application of International Application Number PCT/JP2004/004921, filed Apr. 5, 2004, and claims the priority of Japanese Patent Application No. 2003-103717, filed Apr. 8, 2003, the content of both of which is incorporated herein by reference.

TECHNICAL FIELD

The present invention relates to a content-providing server, an information processing device and method, and a computer program. In particular the present invention relates to a content-providing server, an information processing device and method, and a computer program, which is applicable to the delivery and storage processing of streaming data to be executed by a server-client system.

BACKGROUND ART

In general, along with the recent widespread use of data communication networks, home appliances and computers and other peripheral devices are connected via a network even within the home, and the so-called home network, which enables communication between various devices, is becoming more commonplace. A home network enables sharing of data processing functionality of various devices by performing communication between the devices connected to the network. Sending and receiving content between devices connected to the network provides convenience and comfort to the user, and it is expected that hereafter, there will be increased widespread use.

UPnP (a registered trademark) is known as a protocol applicable to the configuration of this type of home network. UPnP can easily construct a network without any complicated operations, and services can be received which are provided by various connected devices which are connected to the network without difficult operations or setups. Also, UPnP has the advantages of not relying on the OS (operating system) of the devices, and of devices being added easily.

UPnP exchanges definition files compliant with XML (extensible Markup Language) between the connected devices, and performs mutual authentication between the devices. An outline of UPnP processing is as follows.

(1) Addressing process to acquire an individual device ID such as an IP address.
(2) Discovery process to perform a search on the network for each device, receive a response from each device, and acquire information such as device type, functionality, and so forth included in the responses.
(3) Service request process to request service from each device, based on the information acquired in the discovery process.

By performing the above-mentioned procedures, services applicable to the devices connected to the network can be provided or received. A device newly connected to the network acquires a device ID from the above-mentioned addressing process, and acquires information about other devices connected to the network in the discovery process, and can request service to other devices based on the acquired information.

For example, in the case of attempting to play back content such as music data or image data stored on the server on a device on the client side, the client acquires information regarding the content retained on the server. The server has content stored in a storage unit and attribute information stored in a storage unit, including information related to various content received externally via the tuner, and provides this information to the client. The attribute information includes, for example, the title of a song or movie, the artist name, recorded date as the content, and other information relating to the data compression state for example. This attribute information is called metadata or meta information.

The client can perform an acquisition request to the server for content attribute information for various content information stored on the server, for example the title of a song or movie, the artist name, and also data compression state information (ATRAC: adaptive transform acoustic coding, MPEG: moving picture experts group, and so forth), and further, copyright information, as necessary.

The server sends to the client the metadata (attribute information) relating to the content retained on the server according to the request by the client. The client displays the content information on a display of a client device according to a predetermined display program based on the metadata acquired from the server. For example, a song title list formed of the artist name and title and so forth, for example, is displayed on a display. The user confirms or selects the content object for playback, based on the display information, and sends a content transmission request to the server. The server receives the content request from the client, and content transmission is performed from the server to the client according to the received request, and playback of the received content on the client side is performed.

Thus, the content stored on the server is searched for from other devices (clients) connected to the network, and specific content can be specified and played back.

Also, a server configuration having a delivery configuration of so-called live streaming data is proposed, wherein a tuner functionality is established on the server which provides the content, the video or audio data received via the tuner is sent to the client. The configuration is such that, for example, various types of broadcasting data such as terrestrial or satellite broadcasting or the like are received in the tuner within the home server, and the received data is sent from the server to the client, for example to a PC or the like without a tuner, and the user views and listens to various television or radio programs via the display and speaker provided on the PC.

A system wherein the server is operated remotely from the client, and the television data received by the tuner within the server is received and played back on the client side via a local area network, is described in for example Patent Document 1 (1 Japanese Unexamined Patent Application Publication No. 2002-84484).

However, the configuration described in Patent Document 1 is such that the data received by the tuner within the server is stored in a storage means within the server, for example an HDD, and this storage data is provided to the client, and realizes virtual live streaming to the tuner-received data by executing similar processing as the so-called storage content within the server that is provided to the client.

The processing in the case that the client acquires specific content from the server is processing wherein a content identifier is sent from the client to the server, and the server acquires and sends the specified content based on the received identifier from the client.

For example, a content URL (Uniform Resource Locators) which the server coordinates with the content is maintained as metadata corresponding to the content, and by generating a GET method of the HTTP (Hyper Text Transfer Protocol) wherein the client has specified the content URL and sending this to the server, the server can transmit specific content to the client based on the received URL.

If the configuration is assumed to be such that the data to be received via the tuner is sent from the server to the client based on the URL specification similar to the above-described, the server sets a large number of URLs corresponding to the data for each of a large number of channels to be received via the tuner, and the client needs to send a content request specifying a URL corresponding to each channel to the server.

However, with such a URL setting configuration for each channel, if the client tries to switch channels, it becomes necessary to newly send to the server the HTTP-GET method wherein the URL corresponding to the channel after switching is set. Accordingly, between the server and client, the connection based on the URL before switching becomes invalid, and a new connection based on a new URL is set, and delivery of the streaming data of the channel after switching is performed based on the newly set connection.

Thus, in the case of URL setting configuration for each channel, it becomes necessary to perform connection settings between the server and client each time the client switches the channel, and the burden is increased on both sides. Further, interruption of communication can occur with each channel switch, and there is the problem that a smooth processing environment such as that with channel switching using a normal television remote control cannot be obtained.

Also, in an environment where multiple clients are receiving the same program from one server and multiple users are viewing and listening, there is the problem wherein the program interrupts each time the individual users switch channels.

Further, in the case of performing recording processing of the tuner-received content on the server, the client needs to issue a recording request to the server while viewing or listening to the tuner-received content. In such a case, various processing becomes necessary on the server, such as setting a so-called video capsule for recording content. It becomes necessary for the server to concurrently execute delivery processing control to the client of the content and recording processing control, but a configuration is desired wherein the client can request and process recording of the viewing or listening content to the server with arbitrary timing without influencing control of delivery content.

DISCLOSURE OF INVENTION

In view of the above-described problems, it is an object of the present invention to provide a content-providing server, an information processing device and method, and a computer program, wherein between the server and client, control from the client to the server can be executed smoothly and effectively, and for example, while providing the streaming data received via the tuner on the server to the client, recording processing of the tuner-received data can be performed according to the content recording request from the client, and the client can request and process recording of the viewing or listening content to the server with arbitrary timing without influencing the control of the delivery content.

A first aspect of the present invention is a content-providing server for executing content transmission to the client and content recording processing, and comprises a tuner for executing data reception processing, a data transmission/reception unit for executing communication processing between server and client of received content from the tuner and of control information, a metadata storage unit wherein attribute information corresponding to the content is stored as content information, a content storage unit for storing content, a content management unit for executing providing processing as to a client of the content information, and a content delivery control unit for executing processing as to received content via the tuner, wherein the content delivery control unit comprises a tuner control instance for executing delivery processing control as to the client of the received content of the tuner, and wherein a recording source content identifier is set corresponding to the tuner-received content, and a storage unit control instance for executing storage processing control as to the content storage unit of the received content by the tuner, and wherein a recording target content identifier is set, wherein each of the tuner control instance and the storage unit control instance independently executes control corresponding to the set content identifiers.

Further, according to an embodiment of the content-providing server of the present invention, a recording source content identifier is set in the storage unit control instance, wherein the storage unit control instance is configured so as to execute specific processing of the recording content based on the recording source content identifier.

Further, according to an embodiment of the content-providing server of the present invention, the content management unit is configured so as to execute content information management based on a content management directory, and is configured so as to set the recording source content identifier as the metadata of the tuner container as an management object of the content management directory, and to set the recording target content identifier as the metadata of a content storage object as an management object of the content management directory, and also to execute the providing processing of the metadata according to a request from the client, and each of the tuner control instance and the storage unit control instance is configured so as to execute setting processing of the recording source content identifier or recording target content identifier, according to a request from the client.

Further, according to an embodiment of the content-providing server of the present invention, the recording source content identifier is a channel list identifier as identifying information of a channel list including at least multiple channels within the receiving channels of the tuner, and the tuner control instance is configured so as to set multiple content received by the tuner, corresponding to multiple channels described in the channel list, as one unit of the control content, and executes control of the delivery content corresponding to the multiple channels described in the channel list, based on a control request corresponding to the channel list identifier received from the client.

Further, according to an embodiment of the content-providing server of the present invention, the recording source content identifier is a channel list URL (Uniform Resource Locator) which is set as identifying information of a channel list including at least multiple channels within the receiving channels of the tuner; wherein the recording source content identifier is a content storage object URL which is set as an identifier of a content storage object corresponding to a content storage region which is set in the content storage unit.

Further, according to an embodiment of the content-providing server of the present invention, the content management unit is configured so as to execute content information management based on the content management directory, and is configured so as to be capable of storing at least one of the setting information of content recording ending time information and recording quality, as the metadata of the content storage object as the management object of the content management directory, and the storage unit control instance wherein the recording target content identifier is set is configured so as to execute the content recording processing according to the setting information.

Further, according to an embodiment of the content-providing server of the present invention, the content management unit is configured so as to execute processing for setting a content storage object URL as the metadata as to the generating object, under the condition that information showing that a generating request for the content storage object for storing live content is included in the generating request of the content storage object from the client.

Further, according to an embodiment of the content-providing server of the present invention, the content-providing server is configured so as to execute setting processing for the storage unit control instance, under the condition that information showing that a generating request for the content storage object for storing live content is included in the generating request of the content storage object from the client.

Further, according to an embodiment of the content-providing server of the present invention, the setting processing of the storage unit control instance includes setting process of the content storage object URL as a recording target content identifier.

Further, according to an embodiment of the content-providing server of the present invention, protocol information corresponding to the content is included in the content information, a function ID as the tuner identifier information is set in the protocol information which is set corresponding to the recording source content, a function ID as the content storage unit identifying information is set in the protocol information which is set corresponding to the recording target content, and the content delivery control unit is configured so as to execute setting processing as a control instance that executes control for control objects wherein each of the tuner control instance and the storage unit control instance is determined based on the function ID.

Further, according to an embodiment of the content-providing server of the present invention, the content delivery control unit is configured so as to set a control instance which executes processing control for content specified by the content identifier, and to execute the control for each content based on the control instance, and executes connection management based on a connection management table corresponding to an instance ID which is an identifier for each of the tuner control instance and the storage unit control instance, a connection ID which is a connection identifier between the server and client, and protocol information corresponding to the delivery content.

Further, according to an embodiment of the content-providing server of the present invention, the content delivery control unit is configured so as to receive a control request for delivery content according to a SOAP (Simple Object Access Control) protocol from a client, and execute content control based on the control request.

Further, a second aspect of the present invention is an information processing device as a client which requests data processing of the tuner-received content as to the server, wherein the information processing device sends to the server, a first protocol including a tuner identifying function ID as the tuner identifying information and a second protocol information including a data storage unit identifying function ID as the data storage unit identifying information, within the protocol information included in the content information received from the server, and is configured so as to execute the sending processing of a control request as to each control instance wherein the tuner control instance ID and the storage unit control instance ID received from the server is acquired, and the control instance ID is specified.

Further, according to an embodiment of the information processing device of the present invention, the information processing device is configured so as to perform setting requests of the recording source content identifier as to the tuner control instance, and of the recording target content identifier as to the storage unit control instance, and also executes processing for notifying the recording source content identifier as to the storage unit control instance.

Further, according to an embodiment of the information processing device of the present invention, the recording source content identifier is a channel list URL (Uniform Resource Locator) which is set as identifying information of a channel list including at least multiple channels within the receiving channels of the tuner; wherein the recording target content identifier is a content storage object URL which is set as an identifier of a content storage object corresponding to a content storage region which is set in the content storage unit.

Further, a third aspect of the present invention is an information processing method for executing processing of content received from the tuner, comprising a step for setting a recording source content identifier as to the tuner control instance which executes delivery processing control as to the client of the content received from the tuner, a step for setting a recording target content identifier as to the storage unit control instance which executes recording processing control as to the content storage unit of the content received from the tuner, a control request receiving step for receiving a control request which has identifying information of the tuner control instance or the storage unit control instance from the client, and a control step for executing tuner control or storage unit control from the tuner control instance or the storage unit control instance, based on the identifying information.

Further, according to an embodiment of the information processing method of the present invention, the information processing method has a step for setting a recording source content identifier as to the recording unit control instance, wherein the recording unit control instance executes specific processing of the recording content based on the recording source content identifier.

Further, according to an embodiment of the information processing method of the present invention, the information processing method further comprises a step for setting the recording source content identifier as the metadata of the tuner container as the management object of the content management directory, a step for setting the recording target content identifier as the metadata of the content storage object as the management object of the content management directory, a step for executing the providing processing of the metadata according to the request from the client; and with each of the tuner control instance and the recording unit control instance, executing of setting processing of the recording source content identifier or recording target content identifier, according to the request from the client.

Further, according to an embodiment of the information processing method of the present invention, the recording source content identifier is a channel list identifier as identifying information of a channel list including at least multiple channels within the receiving channels of the tuner, and the tuner control instance sets multiple content to be received by the tuner, corresponding to multiple channels described in the channel list, as one unit of the control content, and executes control of the delivery content corresponding to the multiple channels described in the channel list, based on a control request corresponding to the channel list identifier to be received from a client.

Further, according to an embodiment of the information processing method of the present invention, the recording source content identifier is a channel list URL (Uniform Resource Locators) which is set as identifying information of a channel list including at least multiple channels within the receiving channels of the tuner, and the recording target content identifier is a content storage object URL which is set as an identifier of a content storage object corresponding to a content storage region which is set in the content storage unit.

Further, according to an embodiment of the information processing method of the present invention, the information processing method further comprises a step for setting at least one of the setting information of content recording ending time information and recording quality, as the metadata of the content storage object as the management object of the content management directory, and a step for executing the content recording processing according to the setting information with the storage unit control instance wherein the recording target content identifier is set.

Further, according to an embodiment of the information processing method of the present invention, the information processing method includes a step for executing processing for setting a content storage object URL as the metadata as to the generating object, under the condition that information showing that a generating request for the content storage object for storing live content is included in the generating request of the content storage object from the client.

Further, according to an embodiment of the information processing method of the present invention, the information processing method includes a step for executing setting processing for the storage unit control instance, under the condition that information showing that a generating request for the content storage object for storing live content is included in the generating request for the content storage object from the client.

Further, according to an embodiment of the information processing method of the present invention, the setting processing of the storage unit control instance includes the setting process of the content storage object URL as a recording target content identifier.

Further, according to an embodiment of the information processing method of the present invention, protocol information corresponding to the content is included in the content information, a function ID as tuner identifying information is set in the protocol information which is set corresponding to the recording source content, a function ID as content storage unit identifying information is set in the protocol information which is set corresponding to the recording target content, and the information processing method-further executes setting processing as a control instance that executes control for control objects wherein each of the tuner control instance and the storage unit control instance is determined based on the function ID.

Further, according to an embodiment of the information processing method of the present invention, the information processing method includes a step for setting a control instance which executes processing control for content specified by the content identifier, and for executing the control for each content based on the control instance, and executes connection management based on a connection management table which is correlated with an instance ID which is an identifier for each of the tuner control instance and the storage unit control instance, a connection ID which is a connection identifier between the server and client, and protocol information corresponding to the delivery content.

Further, according to an embodiment of the information processing method of the present invention, the control request receiving step receives a control request for delivery content according to a SOAP (Simple Object Access Control) protocol from a client; and the control step is configured so as to execute content control based on the control request received from the client.

Further, a fourth aspect of the present invention is an information processing method with a client which requests data processing of the tuner-received content as to the server, comprising a protocol information sending step for sending to the server, first protocol information including a tuner identifying function ID as the tuner identifying information and second protocol information including a data storage unit identifying function ID as the data storage unit identifying information, within the protocol information included in the content information received from the server, an ID acquiring step for acquiring a tuner control instance ID and a storage unit control instance ID which are received from the server, and a control request sending step for executing sending processing of a control request as to each control instance wherein a control instance ID is specified.

Further, according to an embodiment of the information processing method of the present invention, the information processing method includes a step for performing setting requests of the recording source content identifier as to the tuner control instance, and of the recording target content identifier as to the storage unit control instance, and also executes processing for notifying the recording source content identifier as to the storage unit control instance.

Further, according to an embodiment of the information processing method of the present invention, the recording source content identifier is a channel list URL (Uniform Resource Locator) which is set as identifying information of a channel list including at least multiple channels within the receiving channels of the tuner, and the recording target content identifier is a content storage object URL which is set as an identifier of a content storage object corresponding to a content storage region which is set in the content storage unit.

Further, a fifth aspect of the present invention is a computer program for executing processing of content received from the tuner, comprising a step for setting a recording source content identifier as to the tuner control instance which executes delivery processing control as to the client of the content received from the tuner, a step for setting a recording target content identifier as to the storage unit control instance which executes the recording processing control as to the content storage unit of the content received from the tuner, a control request receiving step for receiving a control request which has identifying information of the tuner control instance from the client or the storage unit control instance, and a control step for executing tuner control or storage unit control from the tuner control instance or the storage unit control instance, based on the identifying information.

Further, a sixth aspect of the present invention is a computer program with a client requesting data processing for tuner-received data as to the server, comprising a protocol information sending step for sending to said server, first protocol information including a tuner identifying function ID as the tuner identifying information and second protocol information including a data storage unit identifying function ID as the data storage unit identifying information, within the protocol information included in the content information received from the server, an ID acquiring step for acquiring a tuner control instance ID and a storage unit control instance ID which is received from the server, and a control request sending step for executing sending processing of the control request as to each control instance wherein the control instance ID is specified.

According to the configuration of the present invention, a tuner control instance which executes streaming delivery control of the tuner-received content under the control of the tuner, and a storage unit control instance (video capsule control instance) which executes recording processing of the tuner-received content under the control of a content storage unit such as a hard disk, are independently set, and to each a channel list URL and video capsule URL are set as the content URL capable of specifying the processing control object, and requests can be received from the client individually by setting a control instance ID which is a control instance (AVT instance) identifier, thereby enabling independent processing according to the client request.

Also, with the configuration of the present invention, specified processing of a URI of the image recording source content (AVT:X_SetAVTRecordInputURIaction) is executed as to the AVT instance handling the image recording target content, that is to say, the video capsule control instance, and the configuration is such that the image recording source URL, that is to say, the channel list URL, is notified to the storage unit control instance (video capsule control instance), whereby the storage unit control instance can independently specify the object for image recording processing.

Further, with the configuration of the present invention, a URL is set for the channel list as an aggregate of channels, and the channel list URL is set in the tuner control instance as the recording source content identifier, and therefore with channel changes within the list, continuous content delivery is enabled with no need to perform a content request based on a new URL, and also content recording after channel switching can be executed without the content recording processing being interrupted.

The computer program of the present invention is a computer program which can be provided, by storage media provided in a form that is computer-readable and a communication medium, for example storage media such as CD or FD, MO, or a communication medium such as a network, to a general-purpose computer system capable of executing various program codes, for example. By providing such a program in a form that is computer-readable, the processing according to the program can be realized with the computer system.

Other purposes, characteristics, or advantages of the present invention will be made clear with description in greater detail, based on the embodiments of the present invention to be described later, and the attached drawings. Now, according to the present invention, a system is a logical aggregate configuration of multiple devices, and is not limited to a configuration of devices within the same enclosure.

BRIEF DESCRIPTION OF THE DRAWINGS

FIG. 4 is a diagram describing an example of a content information display.

FIG. 10 is a diagram describing the configuration data of a connection management table belonging to the server which executes streaming delivery processing of the tuner-received data.

FIG. 21 is a diagram describing the configuration data of a connection management table belonging to the server which executes streaming delivery processing of the tuner-received data and live content recording processing.

FIG. 25 is a diagram describing an example of metadata of the content storage object when executing the live content recording processing.

FIG. 26 is a sequence diagram describing the processing of the server and client in the case of executing pause processing during the live content recording processing.

FIG. 27 is a sequence diagram describing the processing of server and client in the case of executing recording ending processing during the live content recording processing.

BEST MODE FOR CARRYING OUT THE INVENTION

The content-providing server, the information processing device, and method, and the computer program of the present invention will be described below with reference to the diagrams.

[System Overview]

Figure 1:
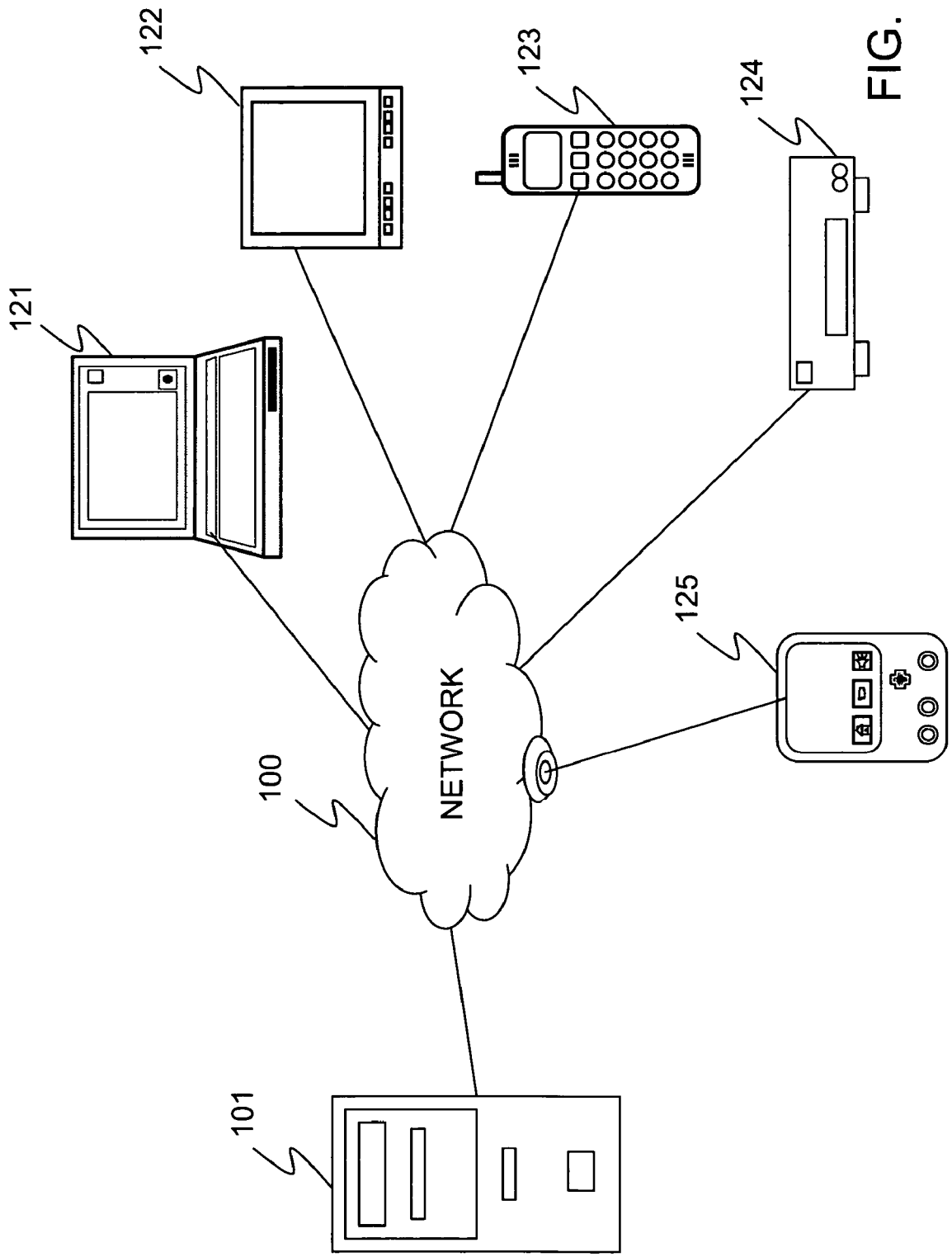
FIG. 1 is a diagram illustrating a network configuration example to which the present invention is applied.

First, a network configuration example to which the present invention can be applied will be described with reference to FIG. 1. FIG. 1 illustrates a configuration wherein a server 101 as a content delivery device which executes processing according to a processing request from various client devices, and clients as content-receiving devices which perform processing requests as to the server 101 are connected via a network 100, for example, a home network configuration. A personal computer (PC) 121, a monitor 122, a portable telephone 123, a playback device 124, and a PDA (Personal Digital Assistant) 125 are illustrated as examples of client devices. However, other client devices can be connected, such as various electronic devices or household electrical appliances.

The processing which the server 101 executes according to the requests from the client, is for example, providing content stored in the storage means such as the hard disk and so forth retained on the server 101, or a content delivery service which transfers live content to be received via a tuner retained on the server 101 to the client, and so forth. In FIG. 1, the server 101 and the client devices are illustrated separately, this illustrates a device which provides service as to requests from the clients as a server, and each client device can provide the functionality of a server in the case of providing its own data processing service to other clients. Accordingly, a client device connected to the network illustrated in FIG. 1 can become a server.

The network 100 is one of a wired or wireless network, and each connected device sends and receives a communication packet, for example, such as an Ethernet (registered trademark) frame and so forth, via the network 100. In other words, the client executes a data processing request as to the server 101 by sending a frame, wherein processing request information is stored in the data portion of an Ethernet frame, to the server 101. The server 101 executes the data processing according to the received processing request frame, and stores the data processing results as result data in the data portion of the communication packet as necessary, and sends this to each client.

The network connection device is configured of, for example, Universal Plug and Play (UPnP) compatible devices. Accordingly, the configuration is such that the addition and removal of connection devices as to the network is easy. A device to be newly connected to the network performs the following procedures, and is thereby able to receive service to which devices connected to the network are applied.

(1) Addressing process to acquire an individual device ID such as an IP address.
(2) Discovery process to perform a search of each device on the network, to receive a response from each device, and to acquire information such as device type and functionality which is included in the response.
(3) Service request process to request service to each device, based on the information acquired in the discovery process.

A hardware configuration example of a PC as one example of an information processing device comprising the server and the client devices illustrated in FIG. 1 will be described with reference to FIG. 2.

A CPU (Central Processing Unit) 201 executes various types of processing according to the program stored in ROM (Read Only Memory) 202 or an HDD (Hard Disk Drive) 204, and functions as data processing means or communication control processing means. A program or data which is executed by the CPU 201 is stored as appropriate in RAM (Random Access Memory) 203. The CPU 201, the ROM 202, the RAM 203, and the HDD 204 are mutually connected via a bus 205.

An input/output interface 206 is connected to the bus 205, and to this input/output interface 206 is connected an input unit 207 comprising, for example, a keyboard, a switch, a button, a pointing device, a mouse, or the like, which are operated by the user, and an output device 208 comprising an LCD, a CRT, a speaker and the like, which presents the various types of information to the user. Further, a communication unit 209 which functions as data sending and receiving means, and further a removable storage medium 211 such as a magnetic disk, an optical disk, a magneto-optical disk, or a semi-conductor memory can be mounted, and a drive 210 is connected which executes data reading or writing processing from the removable medium 211.

Further, a tuner 220 is provided, which performs receiving of delivery data from various external sources such as terrestrial broadcasting data, satellite broadcasting data, cable television data, Internet delivery data, and the like.

Figure 2:
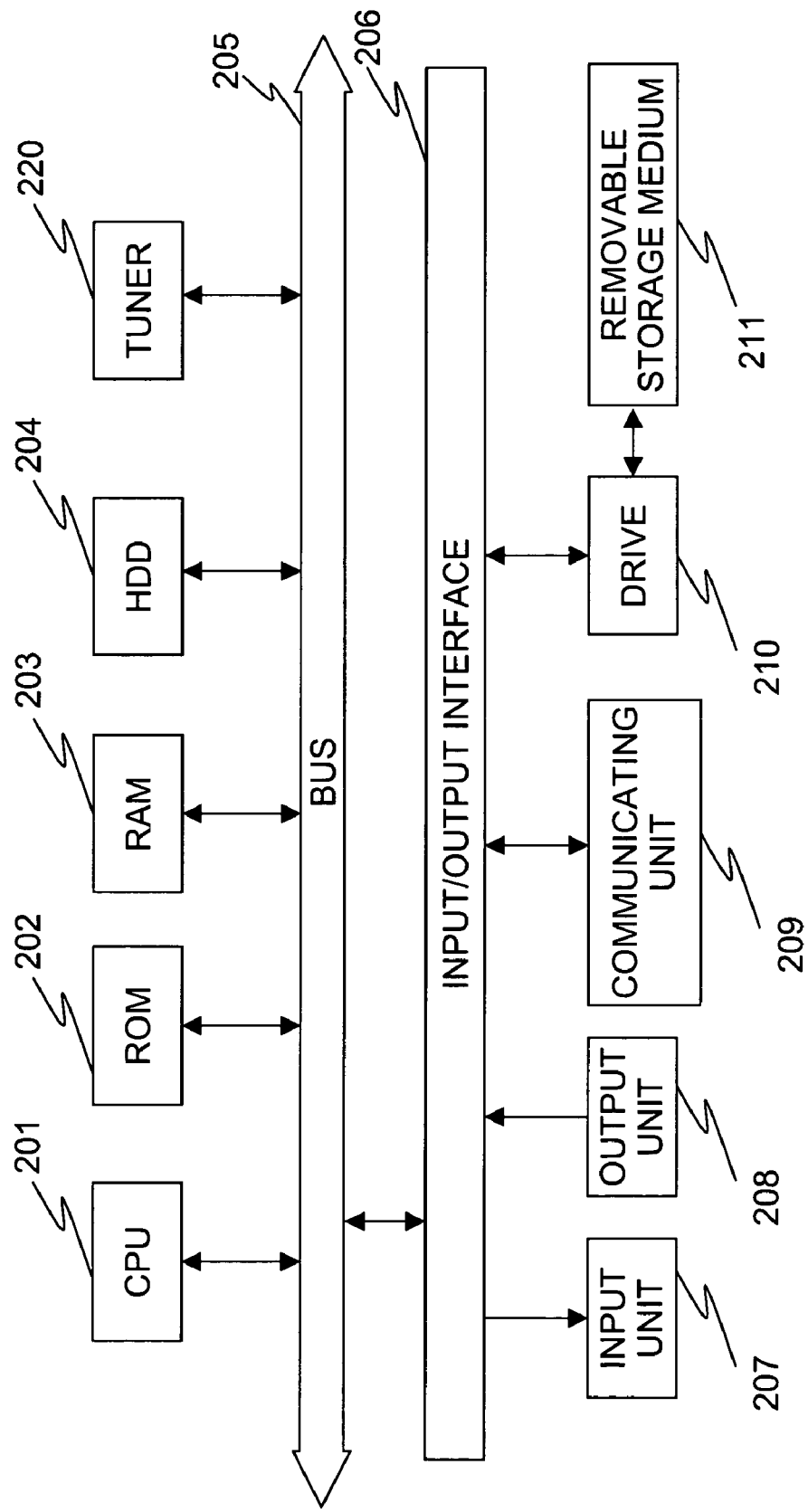
FIG. 2 is a diagram describing a configuration example of network connection equipment.

The configuration illustrated in FIG. 2 is an example of a server and personal computer (PC) as one example of a network connection device illustrated in FIG. 1, but the network connection device is not limited to a PC, and as illustrated in FIG. 1, a portable communication terminal such as a portable telephone, a PDA or the like, and another electronic device or information processing device such as a playback device, display, and so forth can comprise the network connection device. Accordingly, a hardware configuration specific to each individual device can be used, and processing according to such hardware is executed.

[Object Management and Metadata]

Next, the object management configuration which includes the content of the server which manages the content provided to the client, and the metadata, will be described. The server retains content such as image data such as still images and moving images and audio data such as music, which is stored in the storage unit thereof, and further, information relating to the tuner for executing live streaming data, for example, channel information as attribute information (metadata), corresponding to the various content.

The content such as image data such as still images and moving images, and audio data such as music, and live streaming data received via a tuner are collectively called AV content. On the server, the AV content is managed on the CDS (content directory service) within the server by a content management directory which has a hierarchical configuration.

Figure 3:
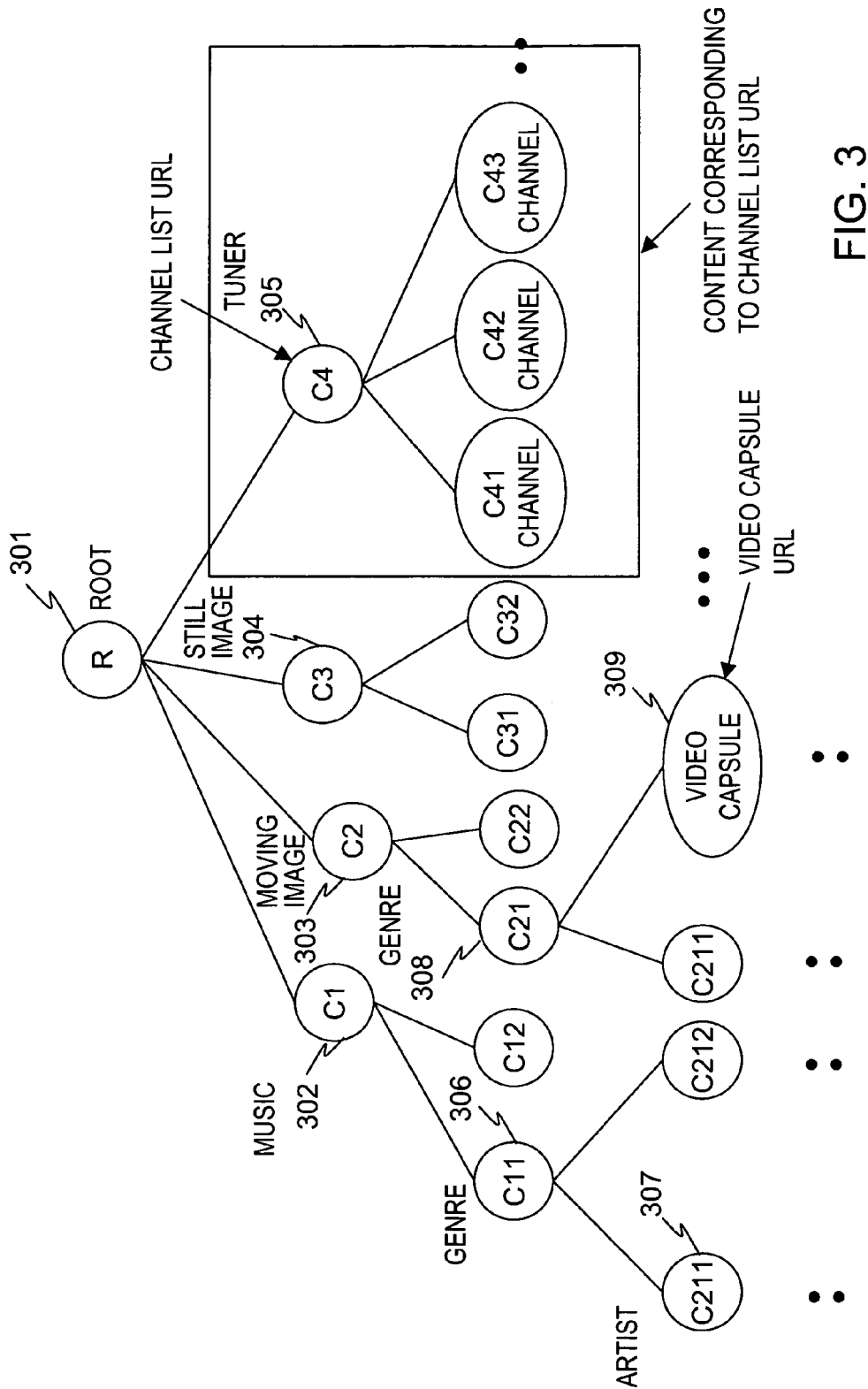
FIG. 3 is a diagram describing a content management directory configuration on a server.

A configuration example of a content management directory managed in a CDS (content directory service) on the server is illustrated in FIG. 3. A hierarchical configuration can be illustrated as a branch diagram, as illustrated in FIG. 3. Each of the various circles shown in FIG. 3 are the various objects. This hierarchical configuration illustrates a logical management configuration corresponding to the content which is stored in the storage unit and managed by the server and the live streaming content.

The individual elements of the content management directory, that is to say, each of the folders storing individual AV content or multiple AV contents, or metadata storage folders are called Objects. Now, Object is an aggregate name for the data unit processed by the server, and various objects exist other than the folders storing individual AV content or multiple AV contents, or metadata storage folders.

The smallest unit of AV content, that is to say, one piece of music data, one piece of moving image data, one piece of still image data, and so forth, is called an item. In the case of live streaming data, one channel is defined as one item.

Also, an upper-level object of an item regulated as an aggregate of items is called a Container, and the unit of the aggregate can be set variously as an aggregate based on the physical storage position of each object, as an aggregate based on the logical relationship of each object, an aggregate based on category, and so forth.

For example, an example of a container wherein a channel is an item can be set as a container wherein channel items of only terrestrial waves are aggregated, or a container wherein satellite broadcast channels only are aggregated. These examples will be further described in later stages.

Objects can be classified into classes based on the type thereof, such as music (Audio), video (Video), or photographs (Photo) and so forth, and class-labeling is performed. The client can for example specify a specific class, and execute a request for a "search" wherein only the objects belonging to the specific classification are targeted. Also, an object such as a specific folder can be specified, a "browse" request for only the information relating to such folder can be requested, and the acquiring processing of information relating to a specific folder can be performed. On the server, the classes are also managed in a hierarchical configuration, and a subclass under one class can be set.

The metadata is various management data which includes attribute information corresponding to content retained on the server, class definition information, information relating to the hierarchical configuration which comprises the content management directory and so forth. The metadata as attribute information of the content coordinated with the individual objects and defined include various information such as for example a content identifier (ID) such as a content URL, data size, resource information, title, artist name, copyright information, channel information and so forth. The individual information included in the metadata is called a property or property information. However, music (Audio), video (Video), photography (Photo), live streaming data, and the like have been predetermined by class of the above-described classes as to which metadata they have, formed of which type of properties.

In FIG. 3, the highest level is called a root container. In the levels below the root container, for example a music container 302, a moving image container 303, a still image container 304, and a tuner container 305 are set. Below the level of the music container 302 is a genre 305, and below the level of genre are objects set such as an artist 306.

Below the level of the moving image container 303 is a genre 308, and further below this level a video capsule 309 is set as an item corresponding to the content. For example the video capsule 309 has attribute information (metadata) corresponding to such video content, corresponding to the video content stored in the storage unit such as the hard disk and so forth within the server. The metadata includes a content identifier for the client to acquire content, that is to say, a URL (Uniform Resource Locator) of the content as the address information showing the location of the content. The client acquires a URL of the video capsule 309, that is to say, a video capsule URL from the content information acquiring-procedure, and by transmitting the content request specifying the video capsule URL to the server, the video content corresponding to the video capsule can be received from the server and played back.

On the other hand, a channel list URL is also set in the tuner container 305 as a URL corresponding to the container. In other words, a channel list URL is set as attribute information corresponding to the tuner-received content. The channel list URL is a URL which is set for the purpose of providing the client with acquiring and control authority of all of the content corresponding to the channel item which exists as a child of the tuner container 306.

According to a conventional system, a URL is set for each channel that is an item, and the client needed to perform switching of the URL according to the channel switching, but according to the present invention, a URL is set for the channel list as a aggregate of channels, and by the client transmitting the content acquiring request which specifies the channel list URL to the server, the client can obtain the channels which are listed on the channel list, that is to say, all of the content of the channel items set in the level lower than the tuner container on the content management directory can be acquired, that is to say, the control authority can be obtained. As a result, with the switching between channels which are listed on the channel list, there is no need to perform a content request based on a new URL. The details of this process will be described later.

A client attempting to execute a content search can acquire content information by requesting the server for a "search" which specifies the class corresponding to the hierarchy of the content management directory or the object aggregate, or a "browse" as a specification of a specific object. The client displays the content information on a display, based on the XML data described in the content information which is received from the server.

A display processing example of the content information list is illustrated in FIG. 4. With the example illustrated in FIG. 4, an example is illustrated wherein a content information list 357 having a data configuration of a content number, a title, an artist name, a channel, and a content URL are in list form is displayed on a display 350.

For example, the content information which is displayed based on the metadata corresponding to a video capsule, is the content of Content No. [0001], [0002] in FIG. 4, and the content information which is displayed based on the metadata corresponding to a tuner container is a channel list as in [0003], [0004], and becomes the channel information included in the channel list, and the channel list URL.

The content information herein is generated based on the property information as a configuration element of the metadata corresponding to the content which is managed by the server. The server acquires the property information within the metadata of the content which matches the conditions based on the "search" or "browse" request received from the client, generates XML data based on the acquired property information, and transmits this to the client.

The client receives the XML data based on the property information corresponding to the content extracted by the server, and generates display data such as that illustrated in FIG. 4, based on the received XML data, and displays this on the display of the client.

The user on the client side selects the content for playback from these lists, and by sending the selection content specification information, for example the content URL, to the server, the content, that is to say, various content such as the music or movie or photographs is sent from the server, and playback output is executed on the client side. When a content request is performed based on the channel list URL corresponding to the tuner container, the content corresponding to the channels listed in the channel list can be acquired together, that is to say the URL is not switched, and channel switching can be executed freely.

As described above, a content URL (Uniform resource Locator) as the address information to show content location is included in the content information which is sent to the client. As a condition that the user has specified (clicked) the content URL displayed on the client display or the link data, an HTTP (Hyper Text Transfer Protocol) GET method which is a content acquiring request is generated on the client device and sent to the server, and the server sends the content corresponding to the content URL to the client.

[Content Playback Processing by the Client]

Figure 5:
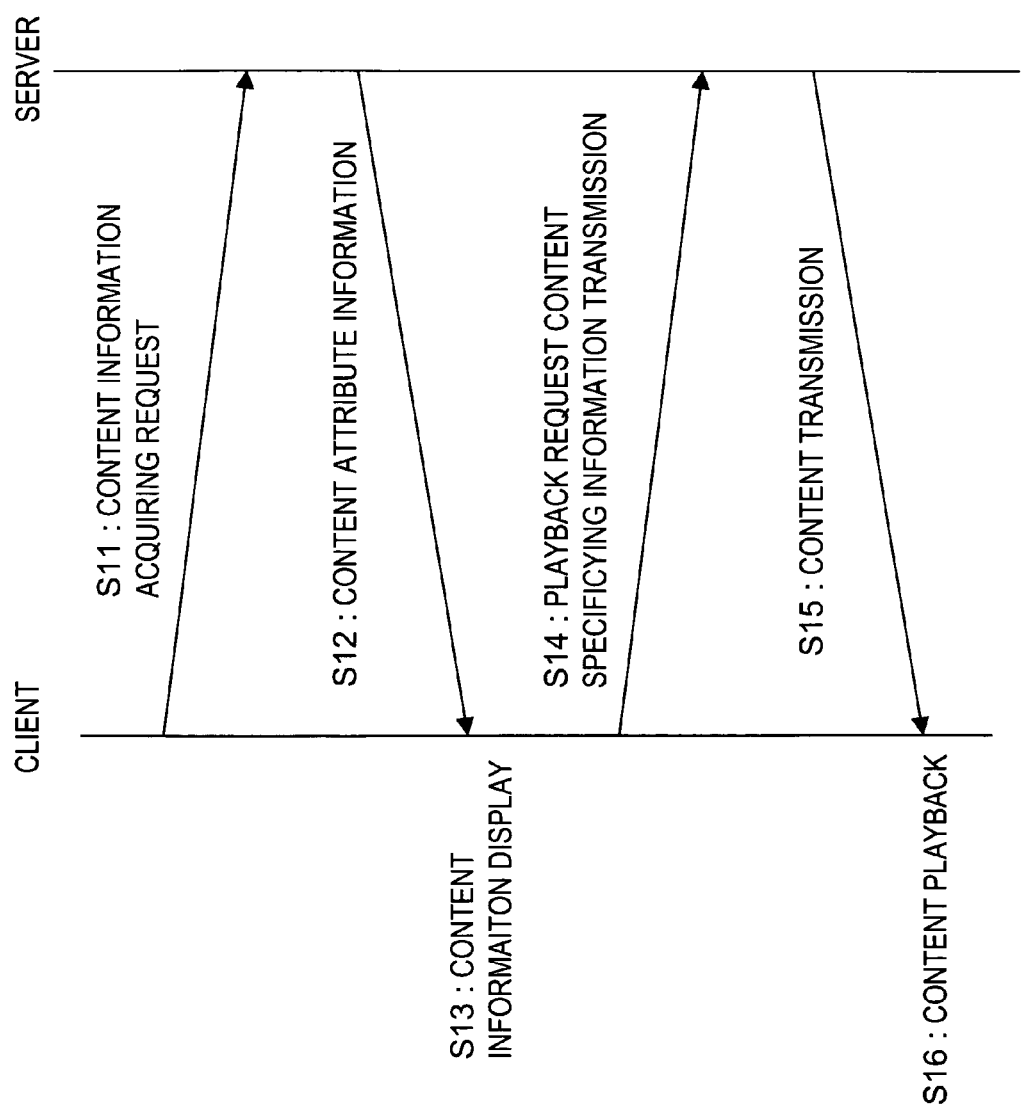
FIG. 5 is a diagram describing a processing sequence between the server and client within content data playback processing.

A client attempting to play back the content performs a content request to the server, and can receive the requested content from the server and play back the content. A general content playback procedure will be described with reference to FIG. 5. First, in Step S11, the client performs an acquiring request for content information which is retained on the server. In Step S12, the server generates XML (eXtensible Markup Language) data of the content information such as a content URL (Uniform resource Locator) list as the address information showing the content location, the content title and artist name and the like, based on the metadata corresponding to the content according to the client request, and sends this to the client.

The client displays the content information on a display, according to the received XML information in step S13. For example, in the case of music content, the song name, artist name, playback time and so forth which corresponds to multiple music retained on the server, is displayed as a list.

Next, in Step S14, with the client device, the client selects the song received from the server and to be played back, and specifies the content URL as the content specification information and sends this to the server. In Step S15, the server acquires the content from the storage means based on the received content specification information and sends this. In Step S16, the client plays back the content received from the server. However, in the case that compression processing such as ATRAC or MPEG has been performed on the content, sending or playback processing is performed after decoding processing is performed on the server or client side.

Normal content playback procedures are as described above. The client acquires various content attribution information, that is to say, the property information included in the metadata corresponding to the content retained on the server, and displays a UI such as a content list to the client based on the property information, and the content can be selected and requested to the server.

[Live Streaming Data Delivery Processing]

The content previously stored in the hard disk or the like of the server can be acquired and played back, when the client sends a content request specifying the URL correspond to the content to the server, as described above.

However, as described in the section on prior art, when the configuration is such that the various URLs are set to the data of the various channel of the live streaming data to be received via the tuner within the server, and content providing based on URL specification is performed, in the instance that the client switches channels, the HTTP-GET method wherein the URL corresponding to the channel after switching is set needs to be sent to the server. As a result, a disconnecting and reconnecting process may need to be performed on the connection between the server and the client based on the new and old URLs, which causes a problem wherein the burden on both sides is increased excessively, and communication interruption can occur with every instance of channel switching.

Thus, with the present invention, the configuration is such that a channel list is set which is an aggregate of multiple channels, and the channel list is considered to be one content, and so one content URL is set and managed as to the channel list. Below, a live streaming data delivery processing configuration based on the present configuration will be described.

Figure 6:
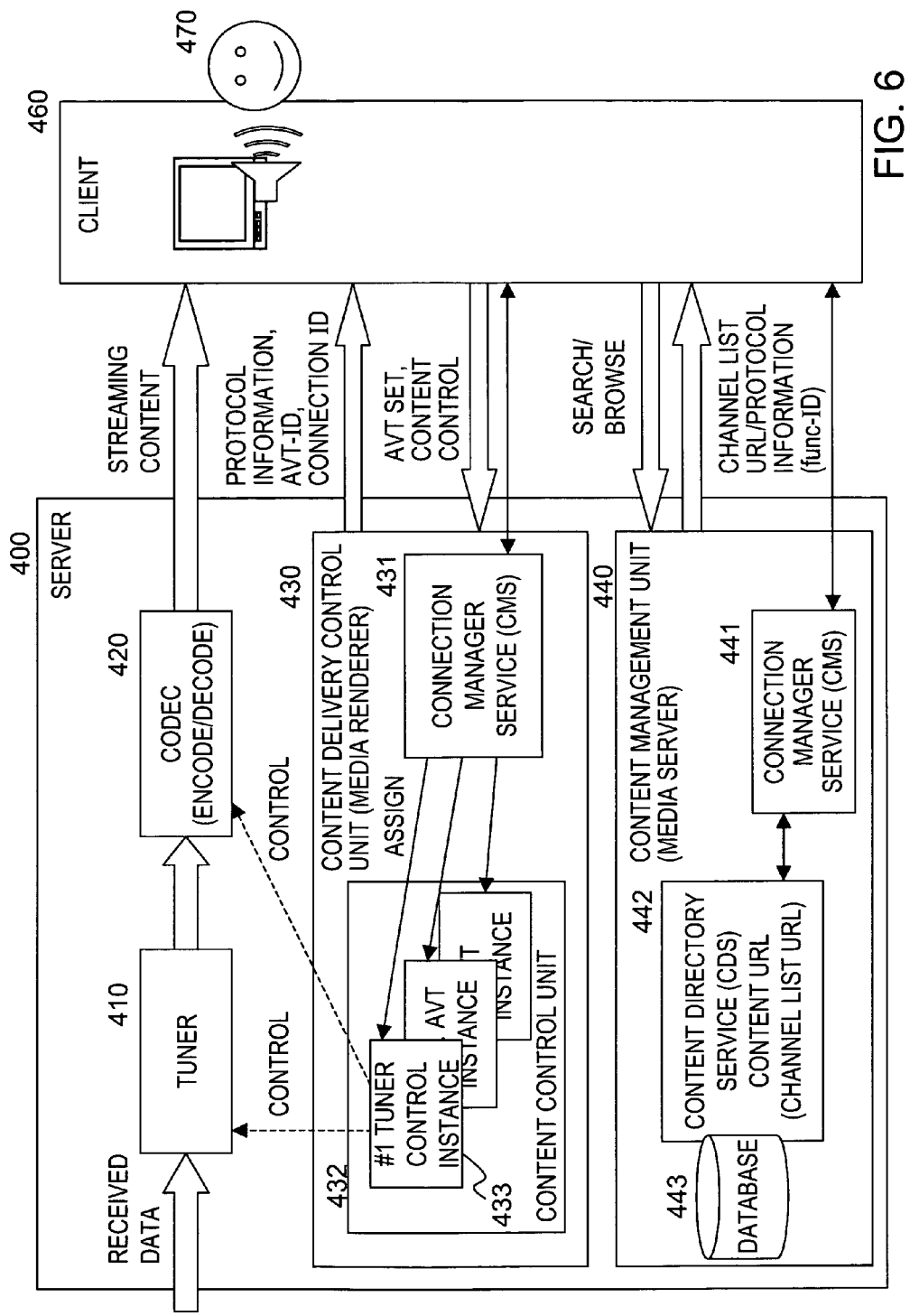
FIG. 6 is a diagram illustrating the configuration of a server executing streaming delivery processing of tuner-received data.

A configuration example of a server with a configuration which has a tuner functionality and delivers the data received by the tuner to the client is illustrated in FIG. 6.

The configuration illustrated in FIG. 6 will be described. A server 400 sends the request content from a client 460 to a client 460, and a user 470 views and listens to the content via a display, speaker, and the like, which is provided on a client 460 device. Also, in FIG. 6, only one client 460 is illustrated, but multiple clients can be connected to the server 400, and multiple clients can receive various content providing from the server 400.

The server sends content stored in the database 443 to be provided, and also sends data received externally via a tuner 410, for example terrestrial broadcasting data, satellite broadcasting data, cable television data, Internet delivery data and the like, and various data received externally to the client 460. The communication network between the server 400 and the client 460 is one of a wired or wireless network, as previously described referencing FIG. 1, and sends and receives a communication packet such as an Ethernet (registered trademark) frame via the network, for example. In other words, the client 460 executes a data processing request as to the server 400, by sending a frame wherein the processing request information is stored in the data portion of the Ethernet frame to the server 400. The server 400 executes data processing according to reception of the processing request frame, and stores the resulting data as the data processing results in the data portion of the communication packet as necessary, and sends this to each client 460.

The configuration of the server 400 will be described below. The tuner 410 is a receiving portion of the live streaming data which receives the received data from terrestrial broadcasting data, satellite broadcasting data, cable television data, Internet delivery data and the like, and various data received externally. The tuner 410 is controlled by an AVT instance (AV-Transport Instance) 433 as a control instance which executes content delivery control for each delivery content set in a content control unit 432 within a content delivery control unit 430. With the present specification, the control instance is a control program wherein the setting of a control object such as control hardware or the like is enabled, and also the setting of a control parameter according to a setting object is enabled, and the control of the control object including hardware to be controlled is executed according to this control program.

The content control unit 432 sets the AVT instances (AV-Transport Instance) #1 through #n 433 as content delivery control executing units for each delivery content. Each AVT instance 433 executes specified content delivery control. For example, a tuner control instance for live streaming of data received via the tuner only executes control of live streaming content of data received via the tuner. Specifically, instructions for content transmission starting, ending, or channel switching and so forth are received from the client 460, and executes the control for channel switching and so forth as to the tuner 410.

The AVT instance 433 set in the content control unit 432 can be other than a tuner control instance, and can be for example, a video capsule control instance which executes delivery control of a video capsule which is video content stored on a hard disk within the server, or a DVD control instance which executes delivery control of video data or audio data or the like stored on a DVD mounted to the server. Each of these AVT instances execute control of specified delivery content.

A URL corresponding to content to be controlled, that is to say, a content URL as a content identifier is set in each AVT instance. The content URL is a content identifier showing the location of the content. A video capsule URL set in a video capsule is set in a video capsule control instance. With the configuration of the present invention, a channel list URL corresponding to a tuner is set in a tuner control instance. The AVT instance 433 is tied relationally to the content to be controlled, based on the URL set in the AVT instance itself. Also, the AVT instance wherein a URL is set has an AVT instance ID as its own identifier. The details of the processing herein will be described later.

The content delivery control unit 430 sets multiple content to be received by the tuner corresponding to the multiple channels described in the channel list, as one unit of the control content, and assigns one AVT instance, and the AVT instance receives a control request corresponding to the channel list identifier to be received from the client, and executes control of the delivery content corresponding to the multiple channels described by the AVT instance in the channel list.

A connection manager service (CMS) 431 communicates the input protocol information of the live streaming control unit 430 to the client 460. Also, based on the protocol information presented by the client 460, the AVT instance 433 is assigned and notified to the client 460.

The connection manager service 431 executes assigning processing of the AVT instance 433, according to the content request from the client 460, and notifies the identifier of the assigned AVT instance, that is to say, the AVT instance ID to the client 460. In this case, a connection ID as a connection identifier between the server and client is also notified to the client 460. The connection manager service 431 registers this data in the connection management table. The connection management table will be described later.

After the above-described processing by the connection manager service 431, the above-described content URL and the AVT instance ID are set in the AVT instance 433, by the request from the client 460 to the AVT instance 433.

A URL corresponding to the content is set by the assigning processing of the AVT instance 433 by the connection manager service 431 and by the URL setting processing by the client 460, and when the AVT instance 433 which is in charge of the delivery control of the content identified by the URL receives a control command from the client 460, content control according to this command is executed. For the content delivery control processing between this client 460 and server, for example a SOAP (Simple Object Access Control) protocol is used. When the client 460 generates and sends the described data according to the XML data to the AVT instance 433, the control information from the client 460 is notified to each AVT instance 433, and the AVT instance 433 executes processing such as control based on the received information, for example content playback starting, ending and channel switching.

For example, when channel switching instruction information is input as control information from the client 460 to the control instance 433, the control information is input into the tuner 410 from the tuner control instance 433, and the tuner 410 is set so as to receive the data of a specified channel.

The delivery connection for the tuner-received content between the server and client is an HTTP (Hyper Text Transfer Protocol) connection which is set based on the channel list URL. With the configuration of the present invention, before and after the channel switching is executed as multiple tuner-received content switching which corresponds to the multiple channels described in the channel list, content delivery is executed wherein the HTTP connection which is set based on the channel list URL is continuously used.

The received data of the tuner 410 can be for example encoded data (ATRAC: adaptive transform acoustic coding, MPEG: moving picture experts group, and so forth) or can be live data. Between the server and client, delivery as specified coded data is desirable so as to increase the data sending efficiency. Encoded data is necessarily data capable of being processed at the client 460. A codec 420 converts the received data of the tuner 410 into a data format capable of being processed at the client 460. The codec 420 has data encoding and decoding functionality. The converted data which is generated with the codec 420 is sent to the client 460 and played back.

Which type of data conversion is performed with the codec 420 is determined by the control information from the AVT instance 433. The AVT instance 433 receives the request information from the client 460, and the control information from the AVT instance 433 is input into the codec 420, and the codec 420 executes data conversion based on the control information.

A content management unit (media server) 440 functions as a content holder. This content management unit (media server) 440 comprises a database 443 wherein the metadata of the content is stored, and a content directory service 442 which performs management of metadata corresponding to the content based on the content management directory previously described referencing FIG. 3, responds to processing requests from the client 460 such as content searching or browsing, and provides the content information.

The database 443 has stored not only the content information previously stored in the database within the server, but information relating to the data received via the tuner, for example management information such as channel information, is also stored as metadata corresponding to the tuner container, and in the case that the content directory service 442 receives a content information acquiring request relating to the tuner from the client 460, processing is executed which provides information to the client 460 such as a channel list URL corresponding to the channel list set as an aggregate of channel information which is receivable by the server and multiple channels.

The content directory service 442 maintains live streaming content URL, codec information, or protocol information as metadata for content used with live streaming in the database 443, and sends this information to the client 460 according to the request from the client 460.

The client 460 can discover whether or not the server is capable of live streaming content delivery from the protocol information from the content directory service 442. Information (function ID (funcID)) is set in the protocol information, which shows that the content delivery by the tuner control can be executed, and the client can discover that the streaming delivery of live data is enabled via the tuner, based on the function ID. The function ID is an ID set for each control for content processing such as tuner control, DVD control, hard disk control and so forth, and in the case there are two tuners, differing function IDs for each are set, for example funcID=a, funcID=b, and are also used as tuner identification information.

In the case that the client 460 desires the delivery of live streaming data received in the tuner, based on the content information from the content directory service 442, the information acquired from the received content information is sent to the connection manager 431 of the content delivery control unit 430. The detailed processing thereof will be described later.

After this, the AVT instance 433 is assigned in the content delivery control unit 430, and the client can execute various types of control such as control of the delivery content as to the AVT instance 433, for example a temporary stop of the content (STOP), channel switching (SEEK), and so forth.

A connection manager service (CMS) 441 within the content management unit 440 performs communication control service between the client 460 and the content management unit 440, such as transmitting the output protocol information of the content management 440 to the client 460. In the case of multiple clients 460 being connected with the server 400, a connection ID management is executed for each client 460, and identifies and handles the requests from each client 460.

The object management configuration relating to the metadata related to live streaming data with the content directory service 442 will be described referencing FIG. 7.

As previously described with reference to FIG. 3, the content-providing server manages metadata corresponding to various content in a hierarchical directory. FIG. 7 illustrates the management configuration of the metadata relating to the live streaming data managed in the content directory service 442.

A tuner container 482 is set in the level lower than the root container 481. The setting mode of the tuner container set in the directory differs according to the number of channels or the setting mode of the channel list URL. These modes will be described in detail later. The individual channels 482, 484, 485 are set as items set as children of the tuner container 482.

The containers and items each are corresponded with metadata which is content attribute information, and the content information based on this metadata is provided by the server according to the content information requests such as searching or browsing from the client 460.

Channel list URLs, protocol information, and so forth are stored as metadata in the tuner container 482. Information such as a channel name (such as Tokyo Television or ABC Television) for example, is stored in the channel items 483, 484, and 485.

In the case of a tuner capable of receiving only terrestrial channels 1 through 12 for example, the channel list URL set as metadata of the tuner container 482 is set as a URL for acquiring one channel list wherein the twelve channels of channels 1 through 12 is made into a list. In the case of a tuner capable of receiving broadcast data of terrestrial and satellite broadcasting channels such as BS and CS (1 through n channels), the URL is set as a URL for acquiring one channel list wherein the n channels of channels 1 through n is made into a list.

Channel lists can be set wherein divisions are made by category, such as a terrestrial channel list, a channel list for BS, a channel list for CS, and so forth, and a channel list URL differing for each can be set.

These channel list URLs can be acquired by the client 460 by content information acquiring processing using a search or browse as to the content directory service (CDS) 442 from the client 460.

By performing content acquiring based on the acquired channel list URL, the client 460 can execute the switching control between for example channels 1 through 12 set in the channel list, based on the one URL. In other words, the client 460 can obtain the control authority of all of the streaming data together which has been listed in a channel list, from the content acquiring by the channel list URL. Specific control will be described later.

With the configuration of the present invention, as described above, the URL setting is not for individual channels, but rather a content URL is set for a channel list which is an aggregate of channels, to enable control of multiple channels together. Accordingly, the control authority of the streaming data corresponding to the channels listed in the channel list can be provided together to the client 460.

In the case that the client 460 has control authority based on a channel list, there is no need to set a HTTP connection based on a new URL, even in the case of performing processing for switching between the channels on the list. By simply sending the control command for channel switching and so forth to the content delivery control unit 432, channel switching is enabled, and accordingly, processing becomes unnecessary for resetting the connection between the server and client based on the switching of new and old URLs.

Figure 7:
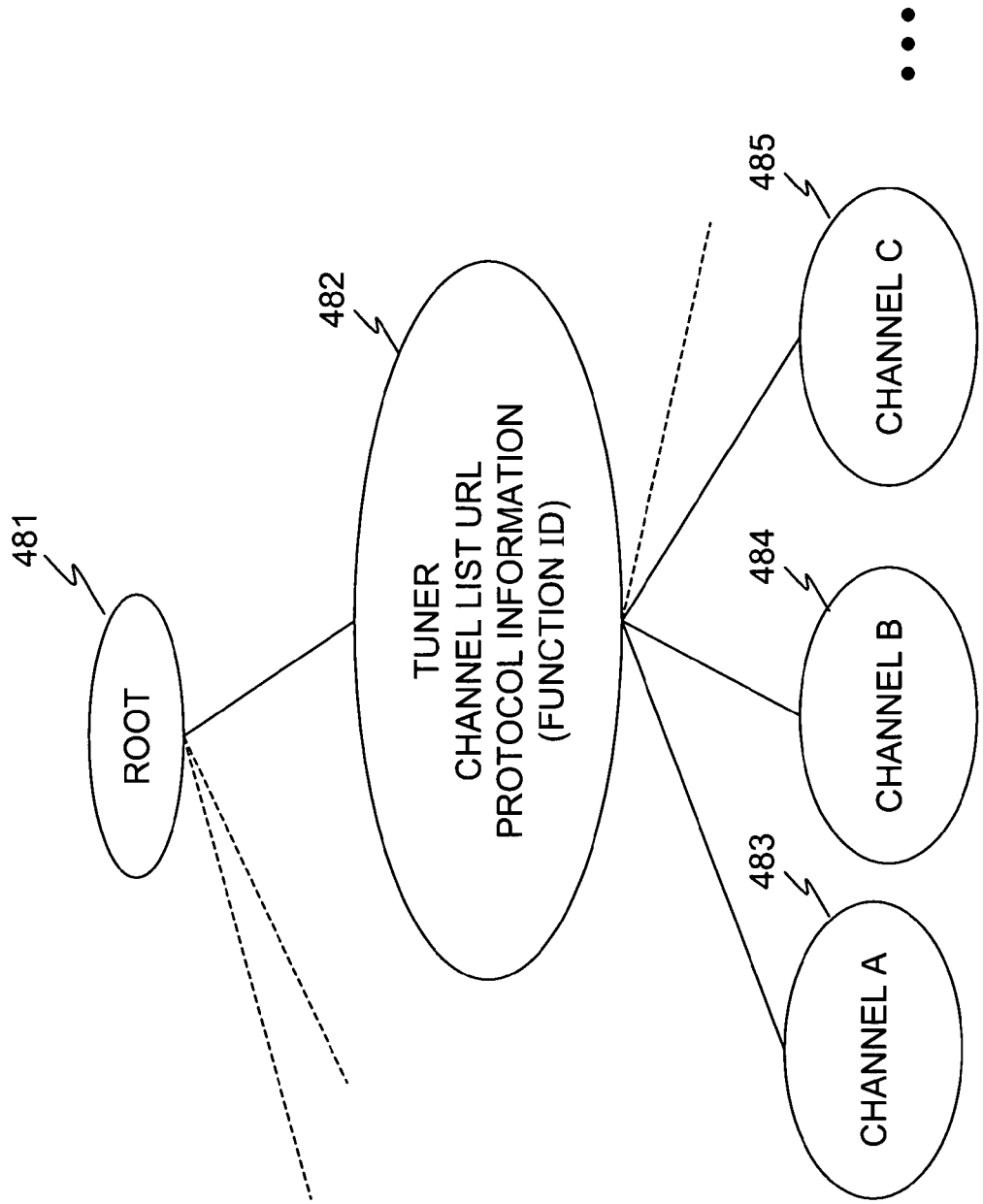
FIG. 7 is a diagram describing a tuner container and a channel item within a content management directory configuration on a server.

As illustrated in FIG. 7, various channels set in the channel list URL retained by the tuner container 482, for example terrestrial channels 1 through 12 are each set as child items as the children of the tuner container 482. The various channel information is set as metadata into each item.

Figure 8:
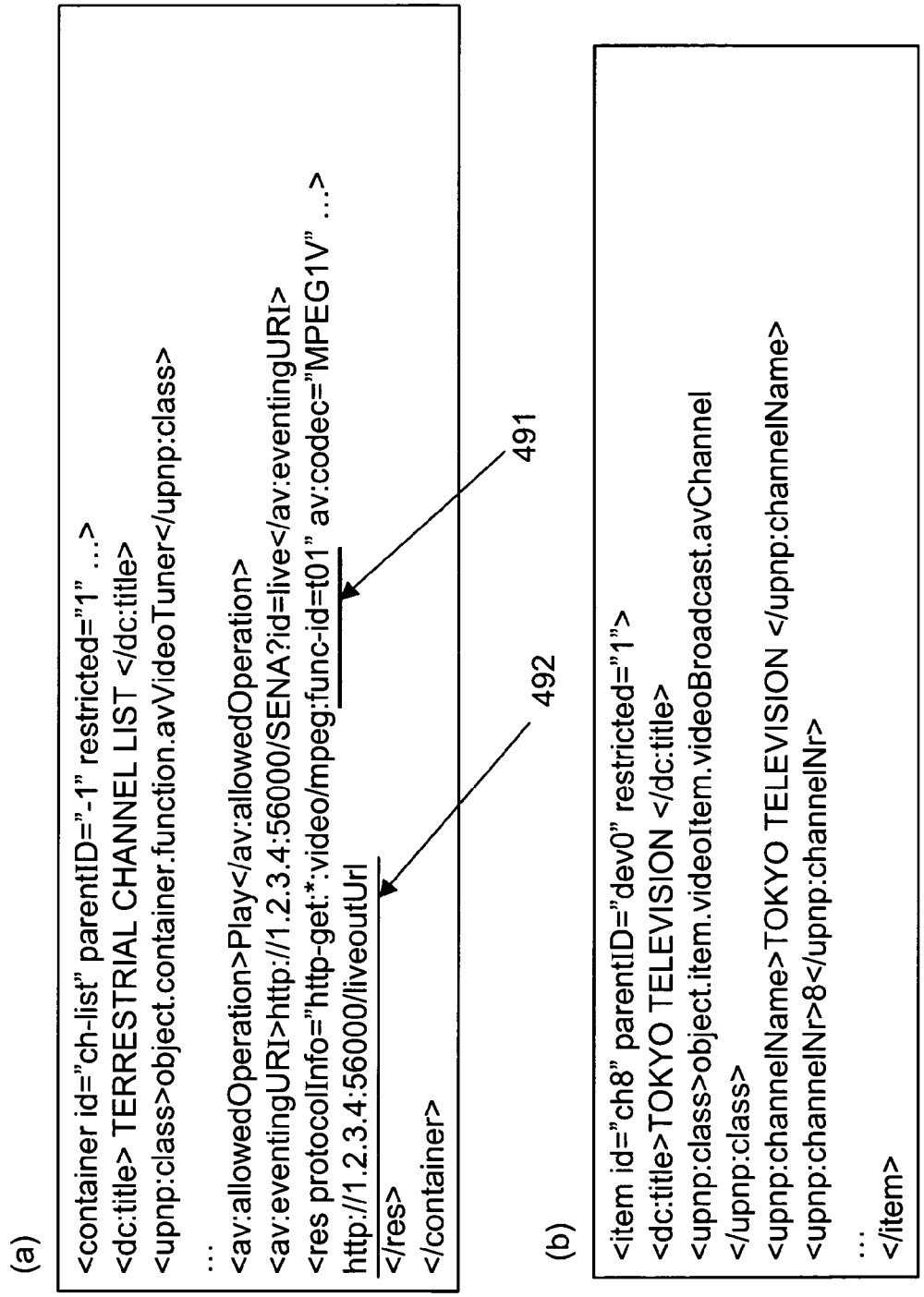
FIG. 8 is a diagram describing content information corresponding to the tuner container and the channel item.

FIG. 8 illustrates content information (metadata) corresponding to the tuner container and channel items. The data shown in FIG. 8 is an XML data example to be sent to the client 460 according to the content information request from the client 460 to the content directory service (CDS) 442.

FIG. 8(a) is information based on the metadata corresponding to the tuner container, and has information illustrated as in the following.

```
<container id="ch-list" parentID="-1" restricted="1"...>
<dc:title> terrestrial channel list </dc:title>
<upnp:class>object.container.function.avVideoTuner</upnp:class>...
<av:allowedOperation>Play</av:allowedOperation>
<av:eventingURI>http://1.2.3.4:56000/SENA?id=live</av:eventingURI>
<res       protocolInfo="http-get:*:video/mpeg:func-id=t01"av:codec="MPEG1V"...>
http://1.2.3.4:56000/liveoutUrl
</res>
</container>
```

From the upper level, content information of the tuner container such as container ID, title, data relating to the class, and also allowed processing [allowedoperation], the event notification URL [eventinguRI], and protocol information [protocolinfo] and so forth are stored. Event notification is a URL set for executing processing for the purpose of notifying the client 460 in the case that an event has generated which corresponds to delivery content such as switching between stereo and monaural or switching of a bilingual broadcast, and the client 460 can receive various event notification concurrent with the content delivery, by sending an event notification request specifying an event notification URL to the server.

The function ID [func-id=t01] in the protocol information [protocolinfo] illustrated in the data portion 491 in FIG. 8 illustrates that this content is content for streaming data, that is to say, it illustrates that content delivery is executed by the control using the tuner. As described above, the function ID is an ID which is set for each control for the purpose of content delivery, such as tuner control, DVD control, and the like, and if there are two tuners a different function ID is set for each, for example a different function ID funcID=a, funcID=b is set. [http://1.2.3.4:56000/liveoutUrl] illustrated in the data portion 492 in FIG. 8 is the channel list URL.

FIG. 8(b) is information based on the metadata corresponding to the channel item, and has the information shown below.

```
<dc:title>Tokyo Television</dc:title>
<upnp:class>object.item.vidoItem.vidoBraodcast.avChannel
</upnp:class>
<upnp:channelName>Tokyo Television</upnp:channelName>
<upnp:channelNr>8</upnp:channelNr>
...
</item>
```

From the upper level, the title, class, channel name, and channel number are described. The client 460 can discover what range of channel control authority can be acquired by the content request based on the channel list URL set in the tuner container, by acquiring content information corresponding to the tuner container and the channel item.

The client 460 displays the channel information list on a display of the client 460, based on the XML data formed from the content information illustrated in FIG. 8.

Figure 9:
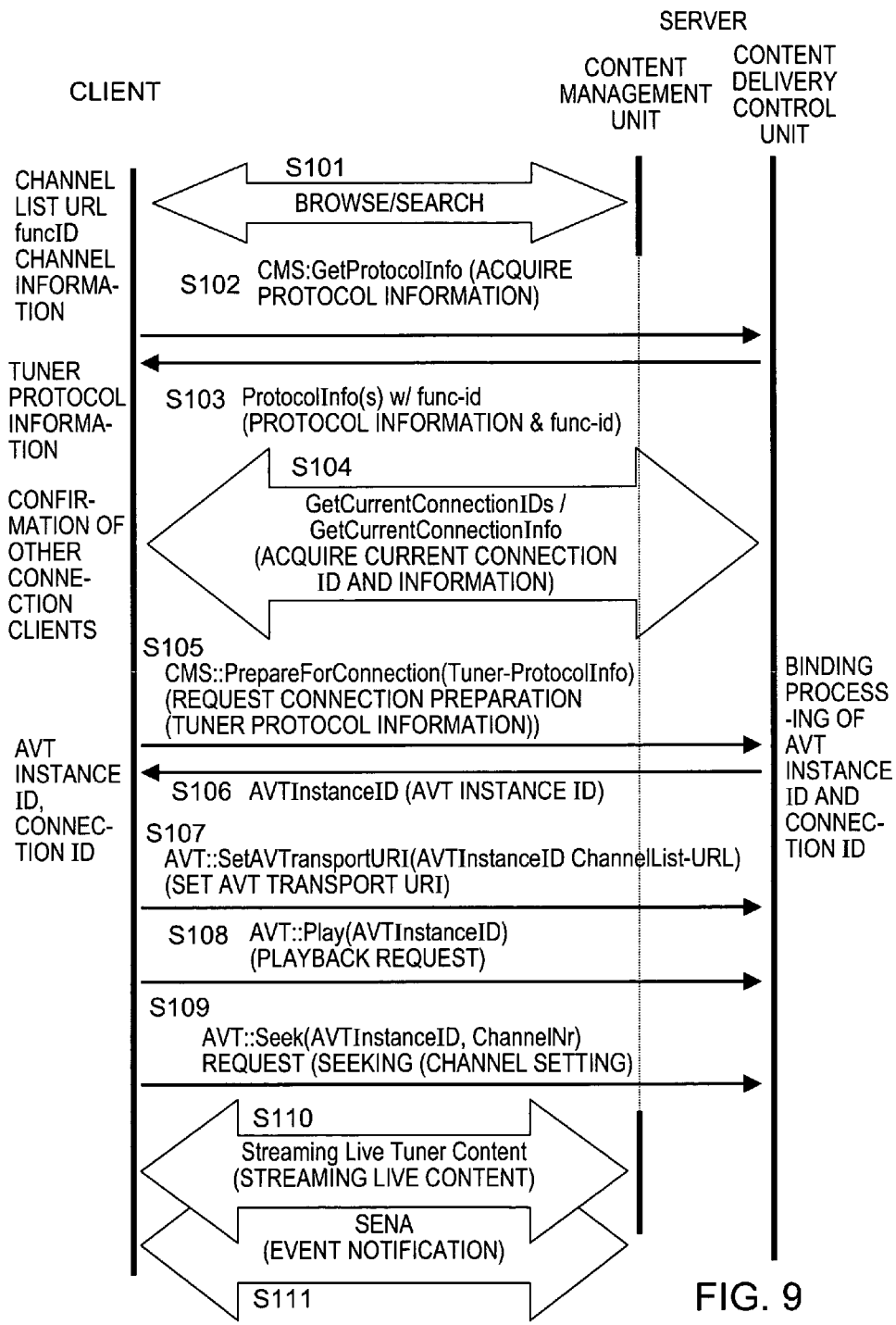
FIG. 9 is a diagram describing the processing sequence between the server and client which executes streaming delivery processing of the tuner-received data.

Next, the details of a streaming data delivery process sequence based on a channel list URL executed between the server and client will be described, referencing FIG. 9.

First, the client 460 acquires content information by the browsing or searching processing in Step S101, for the purpose of researching the content which the server is retaining and is capable of providing to the client 460. The client 460 attempting to execute a content search can acquire content information by requesting a "search" specifying the hierarchy of the content management directory or the class corresponding to an object aggregate, or a "browse" as a specified object specification to the server. The browse or search is executed as to the content directory service 442 of the content management unit 440 (see FIG. 6), and the content directory service 442 generates the XML data based on the metadata corresponding to each object from the database 443 wherein the metadata is stored, and provides this as content information to the client 460.

For example, in the case that content information relating to the tuner container is acquired, the information based on the content information corresponding to the tuner container illustrated in FIG. 8(a) and the content information for each channel shown in FIG. 8(b) is sent to the client 460. The information shown in FIG. 8(b) is content information corresponding to one channel, and in the case that the client 460 requests information of all of the channels as the tuner container and the child item, the information shown in FIG. 8(b) of the number corresponding to the number of channels set as the child item of the tuner container is sent to the client 460.

The client 460 displays content information on a display, based on the XML data wherein the content information received from the server is described. This is the type of display information as described previously with reference to FIG. 4.

The client 460 acquires
a channel list URL,
a function ID (funcID), and
channel information,
based on the content information corresponding to the tuner container and channel item shown in FIGS. 8(a) and 8(b).

Next, the client 460 sends a protocol information acquiring request to the connection manager service 431 of the content delivery control unit 430 in Step S102. This is the processing to request protocol information capable of being input into the content delivery control unit 430, that is to say, a list of protocol information capable of processing with the content delivery control unit 430.

In Step S103, the connection manager service 431 sends the protocol information list to the client 460. This protocol information list includes various protocol information capable of processing with the content delivery control unit 430, such as MPEG as a video data protocol or ATRAC for audio data, and the like.

The protocol information list that the connection manager service 431 of the server capable of delivering received data from the tuner 410 sends to the client 460 includes information showing that delivery of live streaming data can be obtained. Specifically, the protocol information [internal: 1.2.3.4:application/x-av-tuner-content:func-id=t01]is included. That is to say, that wherein the schema cell (first column) is [internal] is included. This protocol information shows that the logical connection with the internal content management unit (media server) 440 is enabled by the connection preparation (PrepareForConnection) described below.

A function ID is included in this protocol information also. As described above, the function ID is an ID set for each control for content delivery, such as tuner control, DVD control, and the like, and from the browsing or searching processing by the client in Step S101, is also included in the content information acquired from the content directory service 442. Here, the function ID [func-id=t10] is set as a function ID corresponding to content delivery using the tuner 410.

Next, in Step S104, the client 460 acquires the information relating to the other clients currently connected to the server 400 from the connection manager service 431. The connection manager service 431 retains a connection management table as illustrated in FIG. 10 which correlates to the protocol information corresponding to content wherein a connection ID corresponding to a client connected to the server is delivered to a client identifier and each client, and executes connection management. According to the acquiring request of the connection information form the client 460, this information is provided to the client 460. This processing will be described later. Also, this connection information notification processing is executed for the purpose of the client 460 confirming the connection status of other clients 460, and can be omitted.

In Step S105, the client 460 sends the connection preparation request (PrepareForConnection) to the connection manager service 431. In the case that the client 460 desires delivery of live streaming data using a tuner, protocol information should be sent which has a function ID which matches the function ID (funcID) included in the content information corresponding to the tuner container as the content information previously received from the content directory service (CDS) 442.

With the transmission of the connection preparation (PrepareForConnection) in Step S105, the client 460 sends the protocol information [internal:1.2.3.4:application/x-av-tuner-content:func-id=t01] relating to the live streaming received from the connection manager service 431 in the above-described protocol information acquiring (S103).

The connection manager service 431 receiving the connection preparation request (PrepareForConnection) from the client 460 determines this to be a request of streaming delivery of received data from the tuner, based on the protocol information (internal:1.2.3.4:application/x-av-tuner-content: func-id=t01) included in the connection preparation request, and sets (assigns) one of the AVT instance 433 within the content control unit 432 as a tuner control instance, and performs binding, that is to say, correlating of the connection ID of the client 460 with the connection preparation request (PrepareForConnection) and the identifier of the AVT instance (AVT instance ID) set (assigned) as the tuner control instance.

As described above, the connection manager service 431 has corresponding data of the connection management table illustrated in FIG. 10, that is to say, the connection ID and AVT instance ID for each connected client 460 and the protocol information, and manages this as the connection management information.

In Step S106, the connection manger service 431 notifies the AVT instance ID which is an identifier of the AVT instance assigned to the client 460, and the connection ID information which is set as to the connection between the client 460 and the server. The client 460 stores this information in memory.

In Step S107, the client 460 issues a URI (Uniform Resource Identifier) setting request to the assigned AVT instance, as processing for performing content delivery control by the assigned AVT instance from the connection manager service 431.

The URI set for the AVT instance includes the AVT instance ID notified from the connection manager service 431 and the channel list URL which is included in the content information corresponding to the tuner container acquired in the processing of Step S102.

The AVT instance can identify the client and the content to be controlled for the AVT instance itself, based on the AVT instance ID specified by the client 460, and the channel list URL. In other words, the client which specifies the AVT instance ID and sends various types of control commands is a client corresponding to the AVT instance ID, and the channel list URL becomes the content to be controlled.

The channel list URL is content corresponding to the tuner container, and the AVT instance wherein the channel list URL is set, is set as an instance for executing control of the tuner 410.

Next, starting with Step S108, the client 460 can execute the control requests of various contents as to the AVT instance. In Step S108, a playback (Play) request is issued to the AVT instance. This control request uses for example a SOAP (Simple Object Access Control) protocol. Based on SOAP, the client 460 generates description data according to the XML data and sends this to the AVT instance 433.

The AVT instance 433 executes processing for control based on the information received from the client 460, such as content playback starting, ending, channel switching and the like, for example. The AVT instance 433 specifies content to be controlled based on the content URL which has been set, and controls the specified content to be controlled. In this case, the content URL is a channel list URL, and the channel URL is content information corresponding to the tuner container, and the AVT instance 433 executes control of the tuner 410.

When AVT instance 433 receives a playback (Play) request of Step S108, the AVT instance 433 controls the tuner 410, and starts sending the tuner-received data to the client 460.

In Step S109, a channel setting (Seek) request is issued as to the AVT instance. This request includes the AVT instance ID and a channel number. When the AVT instance 433 receives the channel setting (Seek) request, the AVT instance 433 controls the tuner 410, and sets the tuner channel and sends the received data to the client 460.

Step S110 illustrates the delivery of the live streaming data executed continuously hereafter. Step S111 illustrates that the event notification processing (SENA) is executed concurrently with the content delivery. As described above, an event is information relating to the delivery content such as the switching between stereo/monaural, for example, and is processing for the server to notify various event information, based on the event notification requests based on the event URL from the client 460.

Figure 11:
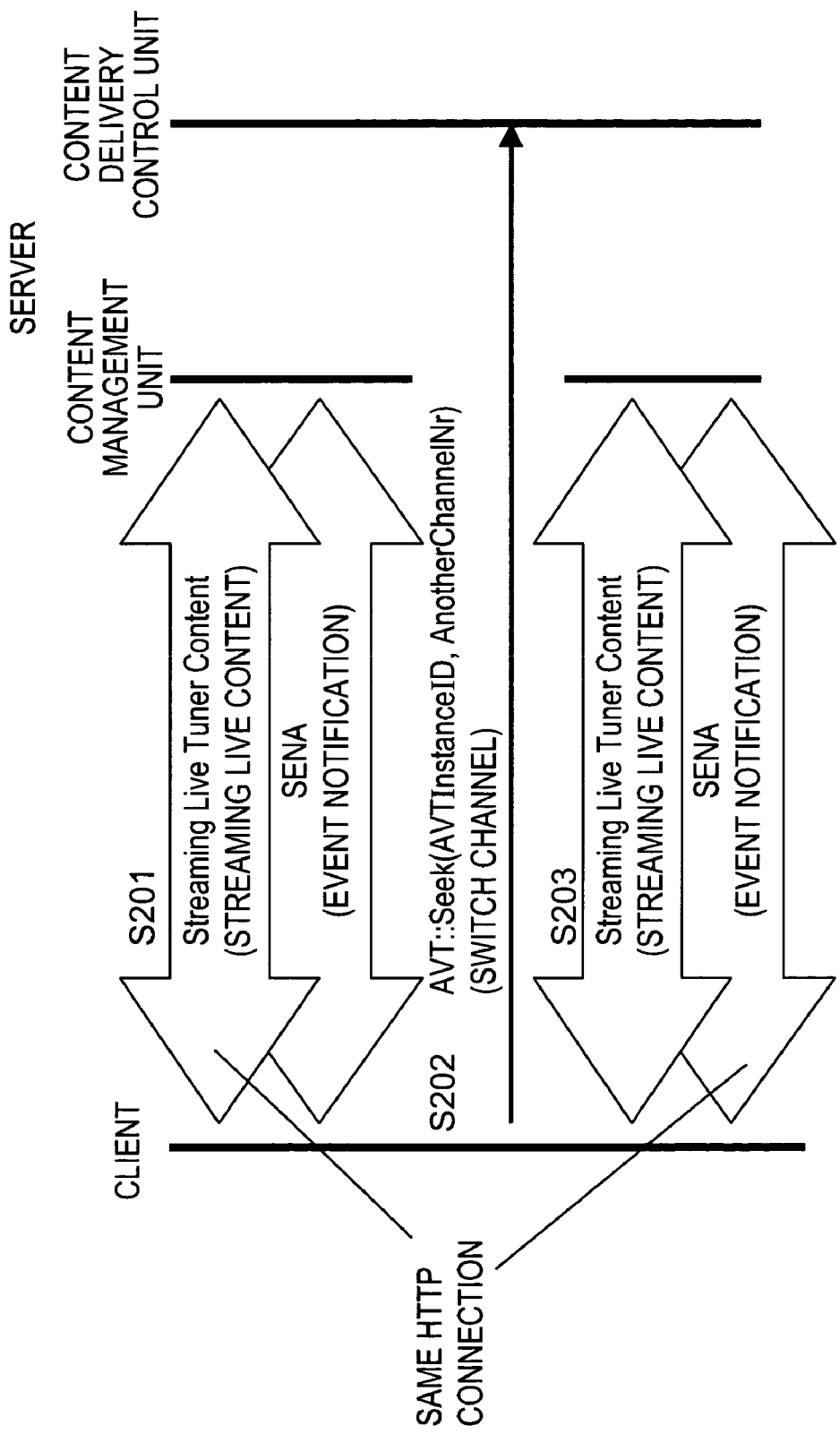
FIG. 11 is a diagram describing the channel switching processing in the processing sequence between the server and client which executes streaming delivery processing of the tuner-received data.

The channel switching processing sequence will be described with reference to FIG. 11. The channel switching processing is executed during delivery of the streaming data based on the channel list URL. In Step S201, we will say that delivery of the streaming data and event notification are being executed.

In Step S202, the client 460 issues a channel switching (Seek) request to the AVT instance. This control request uses a SOAP (Simple Object Access Control) protocol for example, as described above. The client 460 generates description data according to the XML data and sends this to the AVT instance 433. This request includes an AVT instance ID and a switched channel number. When the AVT instance 433 receives the channel setting (Seek) request, the AVT instance 433 controls the tuner 410, switches the tuner channel, and sends the received data to the client 460.

After this, in Step S203, delivery of the streaming data corresponding to the channel after switching and the event notification are executed.

The HTTP connection between the server and client before and after this channel switching is the same URL, that is to say, an HTTP connection based on the same channel list URL, and therefore channel switching is executed while the connection is maintained between the server and client.

Thus, when a channel in a channel list is being switched, a channel switching request (AVT Seek action) is performed as to the AVT instance. In this case, not only the client 460 performing the channel switching request (AVT seek action), but the client using the same live streaming can change the content without disconnecting the HTTP connection.

In the case that the image or audio data to be sent from the server to the client is coded data such as MPEG for example, when switching of the sent data is executed unconditionally based on the timing of the channel switching received from the client, inconsistencies can be generated in the coded data packet which is sent. When such inconsistent coded data is decoded on the client side, content playback errors can be generated from decoding errors.

For example with an MPEG-2 system, multiple PES (Packetized Elementary Stream) packets which are individual data streams such as video or audio are bound together, and further a pack (Pack) wherein control information is stored in the header is considered as one processing unit. Accordingly, if, during the sending of one portion of the PES packet comprising the pack (Pack), channel switching is executed and the sent data is changed, omissions can occur in the pack (Pack) which is one processing unit in the case of decoding with the client, and playback errors are generated.

Accordingly, from the changes of the sent data based on the channel switching request from the client, the content delivery control unit 430 of the server determines whether or not the consistency of the sent coded data can be retained, and in the case that consistency is determined to be not retained, the connecting connection for the data stream delivery between the server and client, that is to say, the HTTP connection based on the channel list URL is disconnected. The server further notifies the client via the event notification connection that the connecting connection for the data stream delivery has been disconnected.

In the event that the client receives a connection disconnection notification from the server, processing for setting the HTTP connection based on the channel list URL, that is to say, the HTTP-GET method, based on the channel list URL is sent again to the server. The setting state of the AVT instance (tuner control instance 433) is maintained, and therefore, setting processing for a new assignment, URI setting and so forth, of the tuner control instance 433 can be omitted.

Alternatively, rather than the server executing channel switching unconditionally based on the channel switching timing received from the client, the configuration can be such that after the channel switching request is received from the client, the server can wait for the timing wherein the consistency of the coded data to be sent to the client can be maintained, and the switching of the data to be sent to the client at the timing wherein consistency can be maintained is executed. The control of this switching timing is performed by detecting the data encoding status of the codec 420, inputting the detected information to the tuner control instance 433, and executing the channel switching of the tuner 410 under the timing control of the tuner control instance 433.

By executing such control of channel switching timing on the server side, decoding errors on the client side can be prevented from occurring, and data playback before channel switching and after channel switching on the client side can be executed correctly.

Figure 12:
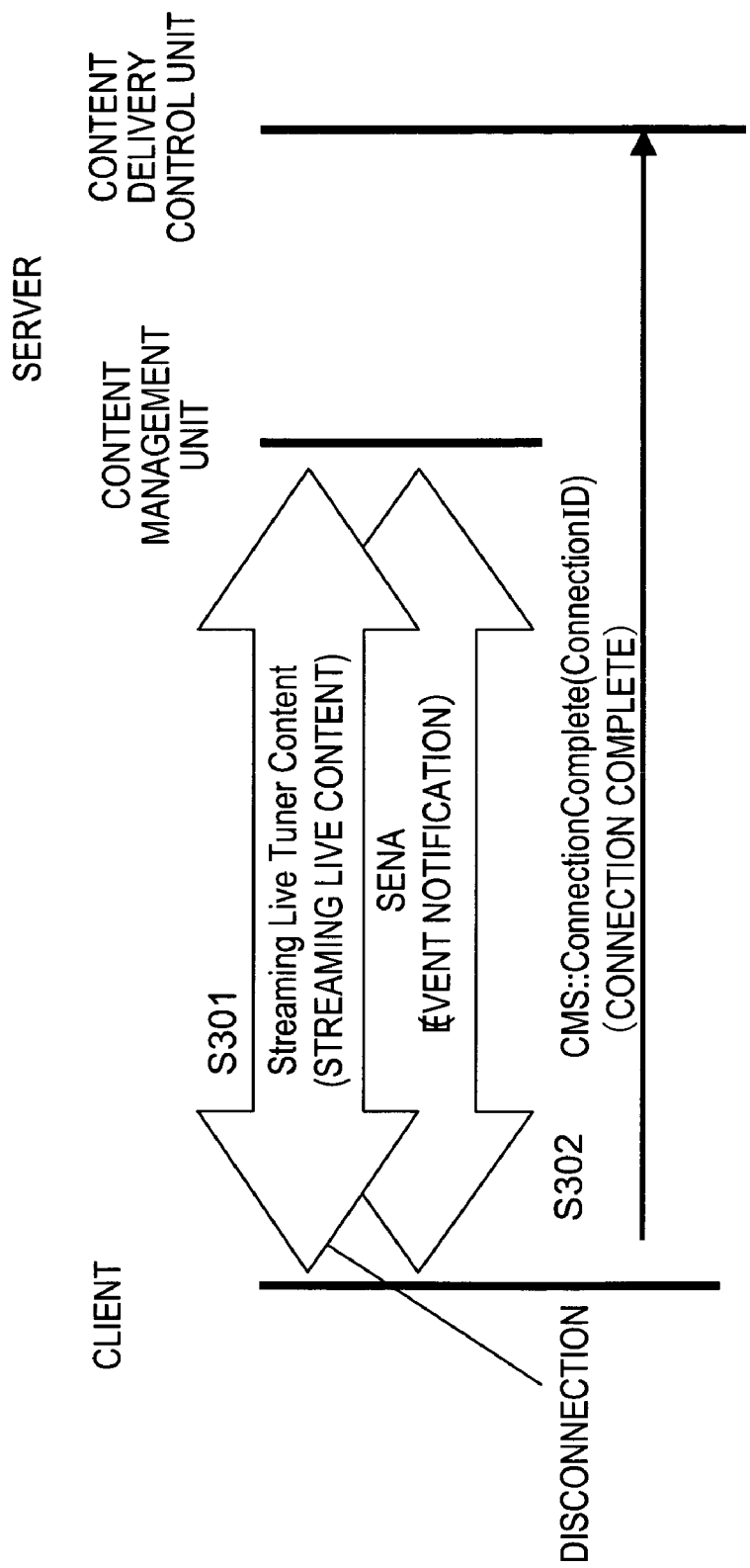
FIG. 12 is a diagram describing the connection ending processing in the processing sequence between the server and client which executes streaming delivery processing of the tuner-received data.

Next, the processing in the case of ending delivery processing of the live streaming data will be described with reference to the sequence diagram in FIG. 12. In Step S301, delivery of streaming data and event notification are executed.

The client 460 attempting to end the delivery processing of the live streaming data sends a connection ending request wherein a connection ID is stored to the connecting manager service 431 in Step S302. The connection ID is that which is received from the connection manager service 431 in Step S106 in the sequence diagram in FIG. 9. The connection manager service 431 performs disconnecting of the connection between the server and client, according to the request from the client 460, and further, deletes the corresponding entry from the connection management table described with reference to FIG. 10.

The client 460 can discover the existence of other clients which are using the same AVT instance, by the inquiry processing in Step S104. By performing this check in advance, the client can discover which function ID (func-id) to select in order to be able to use an available AVT instance. Performing this check enables processing that considers other clients.

For example, in the case that all AVT instances are being used, a message "Other users may be viewing or listening. Okay to proceed?" can be sent from the server to the client 460 at the time of changing channels, and by generating and displaying a message display UI with the client 460, in a network wherein multiple clients are connected, unnecessary control of the connections of other clients, for example changing channels, can be prevented.

The details of the connection information acquiring processing in Step S104 are as follows. First, a current connecting connection ID request (GetCurrentConnectionIDs) is performed as to the connection manager service 431 of the content delivery control unit 430. As a return value, a list of connection IDs (ConnectionID) which are currently active are returned. When a connection information request (GetCurrentConnectionIDs) is performed using the individual connection IDs, the protocol information (ProtocolInfo) assigned by the connection IDs therein can be discovered. In the case that the function ID (func-id) described in the additional information (AdditionalInfo) of this protocol information is the same as the function ID used by oneself, this indicates that the same internal resource (such as the tuner) is being used.

As described above, the client 460 receives an assignment of an AVT instance as to the connection manager service (CMS) 431 of the content delivery control unit 430, and by setting the channel list URL corresponding to the tuner container in the AVT instance, the live streaming based on this URL can be started.

In the content delivery control unit 430, in the case of there being limits to the number of AVT instances that can be set, the connection manager service (CMS) 431 of the content delivery control unit 430 controls the setting of the AVT instances by executing the following processing.

In the state wherein the limited number of AVT instances have already been assigned, when the connection manager service (CMS) 431 is requested from a client for a new AVT instance, the oldest connection has priority. In other words, an AVT instance which is set based on an older connection will not be switched based on a new request.

However, this is only in the case wherein there is a limited number of AVT instances, and in the case of requesting the same AVT instance even if another client is being provided service, the same AVT instance ID can be newly provided with a different connection ID. In this case, multiple clients can execute control based on one AVT instance.

Specifically, two or more clients can execute control of the AVT instance wherein one channel list URL is set, and a control command, for example channel switching processing, from either client can be validly executed under the control of the one AVT instance.

The control delivery control unit 430 has the two of the AVT instance-#0 and the AVT instance-#1, and processing in the case of a server which can only operate one AVT at one time is executed for example as the following a through f.

a. First, request from client 1 to assign the AVT-#0
b. Assign the AVT instance ID-#0 to the connection ID-1
c. Next, request from client 2 to assign the AVT-#0
d. Assign the AVT instance ID-#0 to the connection ID-2
e. Next, request from client 1 to assign the AVT-#1
f. Return an error to client 1

By executing such processing, the AVT instance setting number can be limited.

As described above, the channel list URL can be obtained from the content directory service (CDS) 442. When the tuner is in the playing state, that is to say, in the content delivery state as to the client, all of the clients (limited to when the server is corresponding to multiple clients) having already performed content requests to this channel list URL based on HTTP-GET can obtain streaming of the tuner simultaneously with the channel list URL being set in the AVT instance.

In other words, in the case of desiring to simply monitor the streaming used by other clients, the setting of the AVT instance is not executed, and by only issuing an HTTP-GET method wherein the URL for streaming, that is to say, the channel list RUL acquired from the content directory service (CDS) 442 is set, the streaming of the tuner can be obtained.

While the content delivery control unit 430 of the server 400 executes the content delivery control of specified multiple channels received by the tuner 410 based on the channel list URL as a channel list identifier under the control of the AVT instance, in the case of receiving the HTTP-GET method as a content request wherein the same channel list URL is specified from other clients, this request client does not perform setting of the AVT instance, but rather executes delivery of the specified tuner-received content delivery based on the channel list URL from the HTTP connection based on the channel list URL.

[Server with Multiple Tuners]

Figure 13:
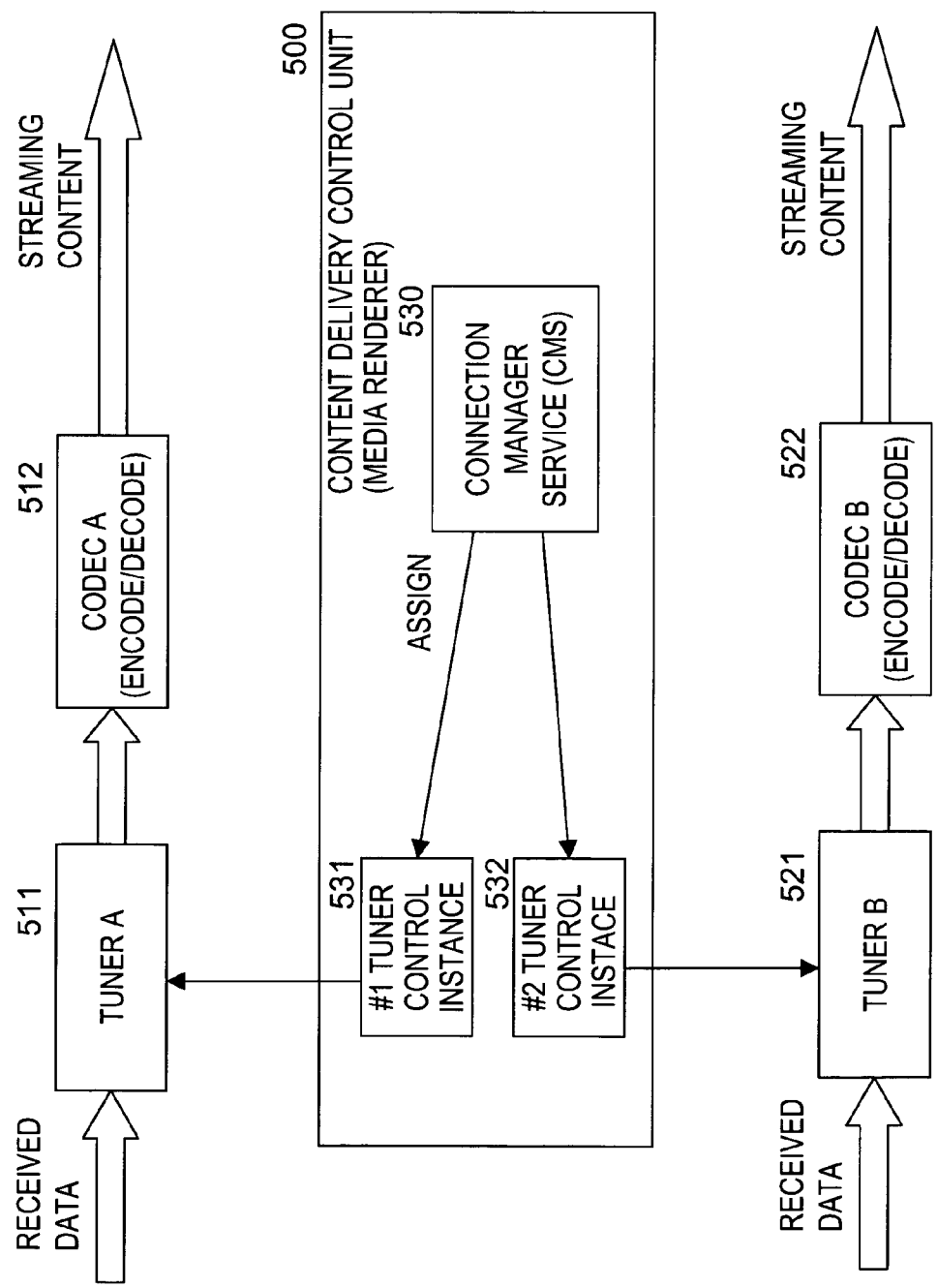
FIG. 13 is a diagram describing streaming delivery processing of tuner-received data from the server which has multiple tuners.
Figure 14:
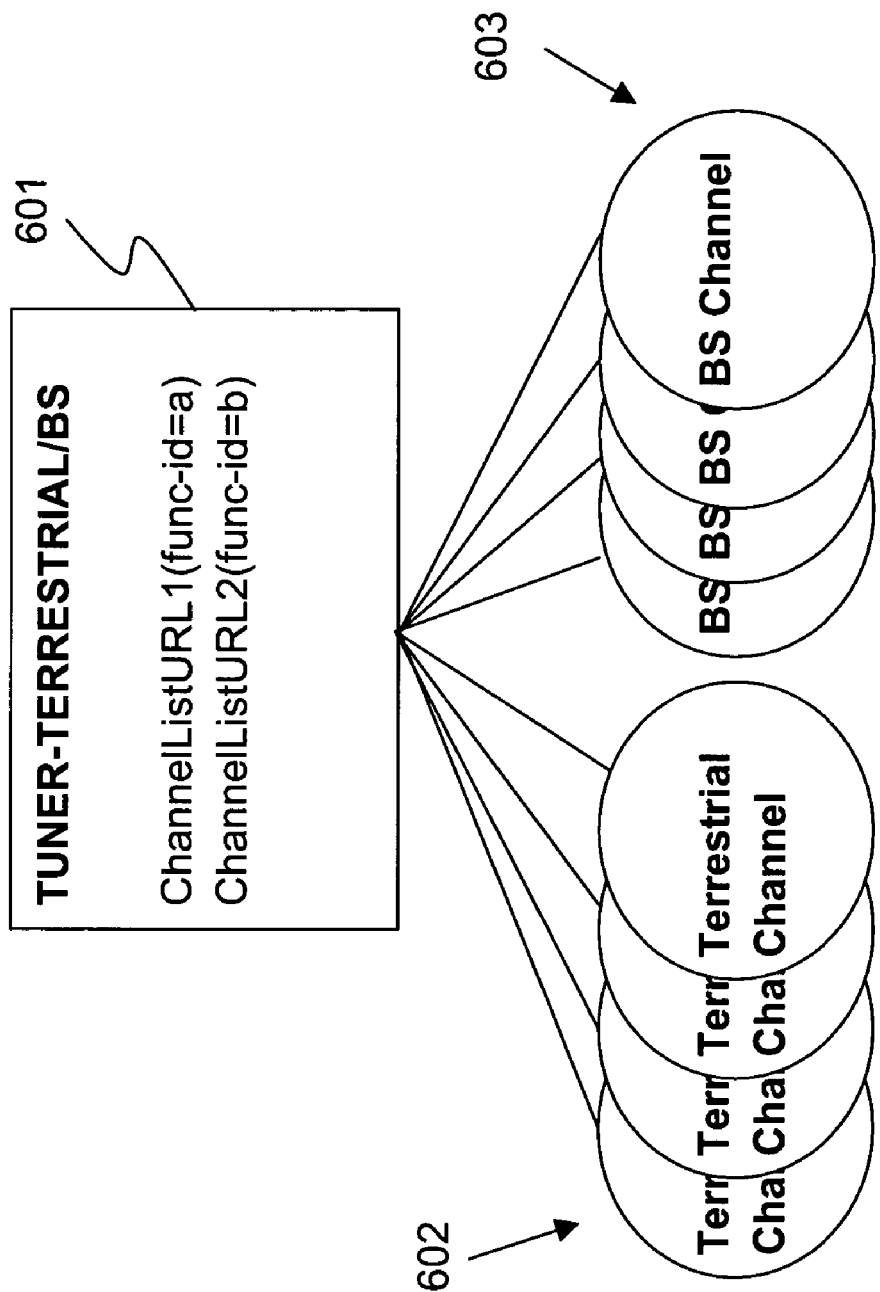
FIG. 14 is a diagram describing a corresponding example between a tuner container and a channel list URL.

The above-described example is an example wherein the server has only one tuner, but a configuration of a server may be made with multiple tuners. In this case, a channel list URL is coordinated and correspond to each tuner, and further, differing AVT instances are set and control is executed. FIG. 13 illustrates a processing configuration example of a server with two tuners.

In this case, one streaming content is sent to the client via a tuner A511 and a codec A512, and further another streaming content is sent to the client via a tuner B521 and a codec B522.

A connection manager service 530 of a content delivery control unit 500 individually assigns an AVT instance for executing each tuner control. A tuner control instance 531 executes control of the tuner A511, and a tuner control instance 532 executes control of the tuner B521.

In this case, the channel list URL set in the tuner control instance 531 is a channel list URL (A) corresponding to a tuner A container, and the channel list URL set in the tuner control instance 532 is a channel list URL (B) corresponding to a tuner B container.

The client receiving the content via each tuner has an AVT instance ID corresponding to the tuner control instance 531 or the tuner control instance 532, and control wherein each AVT instance ID is specified is enabled, and independent control of each is enabled.

Now, correlation of the tuner and the channel list is determined by the channel list URL set as the metadata which is set corresponding to the tuner container, as described above. In the above-described example, an example was described wherein one channel list URL correlates to one tuner, but in the case of multiple tuners, the correlation between the tuners and the channel list URLs can be set in various ways.

In the case that there are two tuners, in the case that each tuner is capable of receiving both terrestrial and BS broadcasting, one tuner container is set, and two channel list URLs can be set as metadata. A terrestrial channel item 602 and a BS channel item 603 as a child item are set in a tuner container 601.

Two channel list URLs of a channel list URL 1 (funcID=a) and a channel list URL2 (funcID=b) are set as the metadata of the tuner container 601.

In the case of such a configuration, the client can discover two channel list URLs and the channel information thereof as the content information of the tuner container 601. In the case that the client desires to view or listen to terrestrial broadcasting, a channel list corresponding to terrestrial broadcasting, for example the channel list URL1 (funcID=a) is selected, and the setting processing of the AVT instance in Step S107 in the processing sequence illustrated in FIG. 9 should be executed. In the case that the client desires to view or listen to BS broadcasting, a channel list corresponding to BS broadcasting, for example the channel list URL2 (funcID=b) is selected, and the setting processing of the AVT instance in Step S107 in the processing sequence illustrated in FIG. 9 should be executed.

In the case of such a configuration, the protocol information to be sent from the connection manager 431 of the content delivery control unit 430 in Step S103, is the two sets of protocol information relating to the streaming data content transmitted via the two tuners, [internal:1.2.3.4:application/x-av-tuner-content:func-id=a] and [internal:1.2.3.4:application/x-av-tuner-content:func-id=b], corresponding to the function ID of the above-described two channel list URLs, which are each notified to the client.

Figure 15:
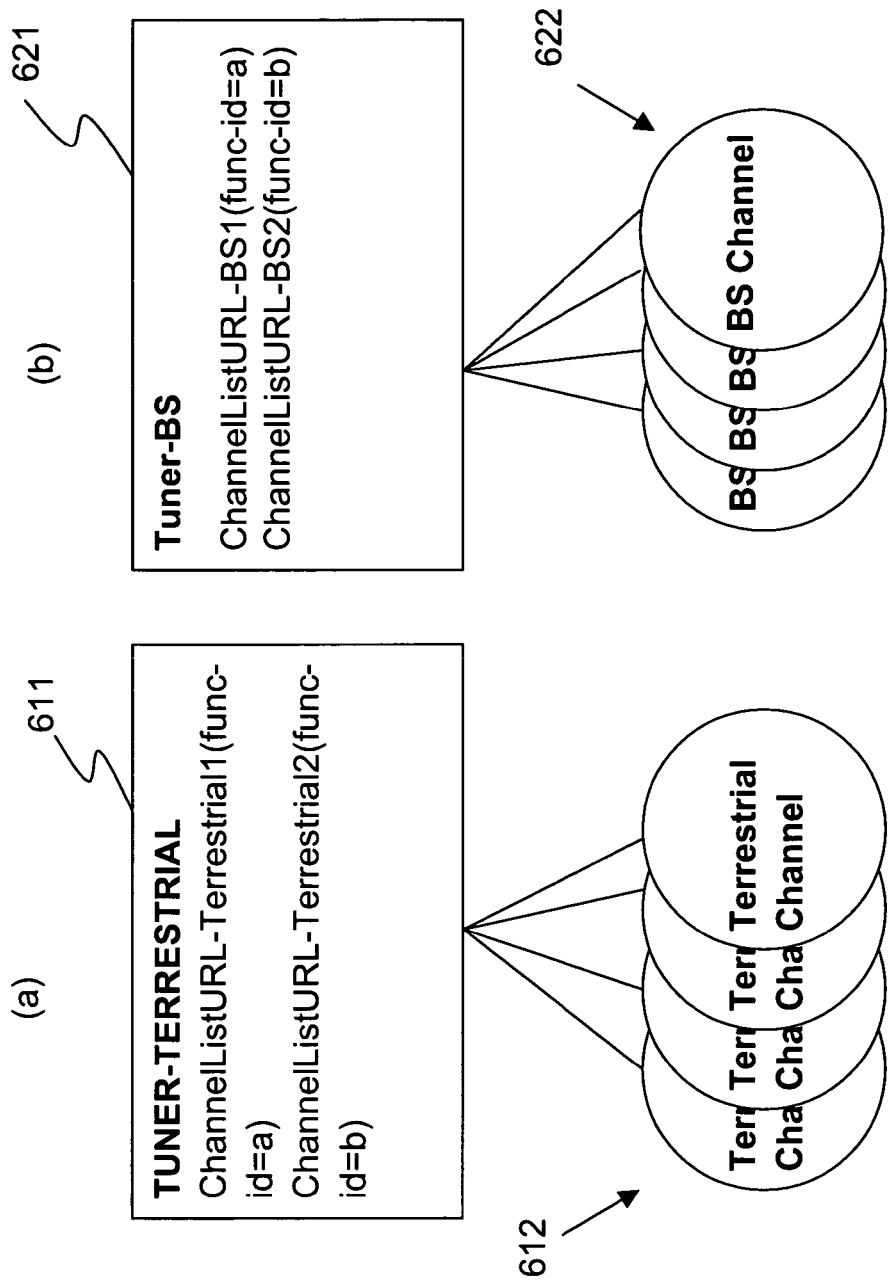
FIG. 15 is a diagram describing a corresponding example between a tuner container and a channel list URL.

Also, in the case that there are two tuners which receive both terrestrial and BS broadcasting, in the case that they are separated such that one is used exclusively for terrestrial and one is used exclusively for BS, each tuner containers 611 and 621 are set, as illustrated in FIG. 15. The terrestrial tuner container 611 has multiple terrestrial channel items 612 set. The BS tuner container 621 has multiple BS channel items 622 set.

The channel list URL set in each tuner container can be set as one, but in the example illustrated in FIG. 15, two channel list URLs are set for each of the two tuner containers.

With such a configuration, in the case that one client is using one tuner to view or listen to a terrestrial channel, another client can use the other tuner to view or listen to another terrestrial channel, or the same can be said for two BS channels, or one terrestrial and one BS channel can be combined.

Specifically, in the case of viewing or listening to two terrestrial broadcasts via two tuners, each of the channel list URL-Terrestrial1 (funcID=a) and the channel list URL-Terrestrial2 (funcID=b), which are in the terrestrial container 611, are each set in different AVT instances, and by each performing different tuner control, the two terrestrial broadcasts are sent to each client.

In the case of viewing or listening to two BS channels via two tuners, each of the channel list URL-BS1 (funcID=a) and the channel list URL-BS2 (funcID=b), which are in the BS container 621, are each set in different AVT instances, and by each performing different tuner control, the two BS broadcasts are sent to each client.

In the case of terrestrial and BS, by performing control with the combination of a channel list URL-Terrestrial1 (funcID=a) in the terrestrial container 611 and a channel list URL-BS2 (funcID=b) in the BS container 621, or the combination of a channel list URL-Terrestrial2 (funcID=b) in the terrestrial container 611 and a channel list URL-BS1 (funcID=a) in the BS container 621, the terrestrial and BS content is provided to the client via the different tuners.

Figure 16:
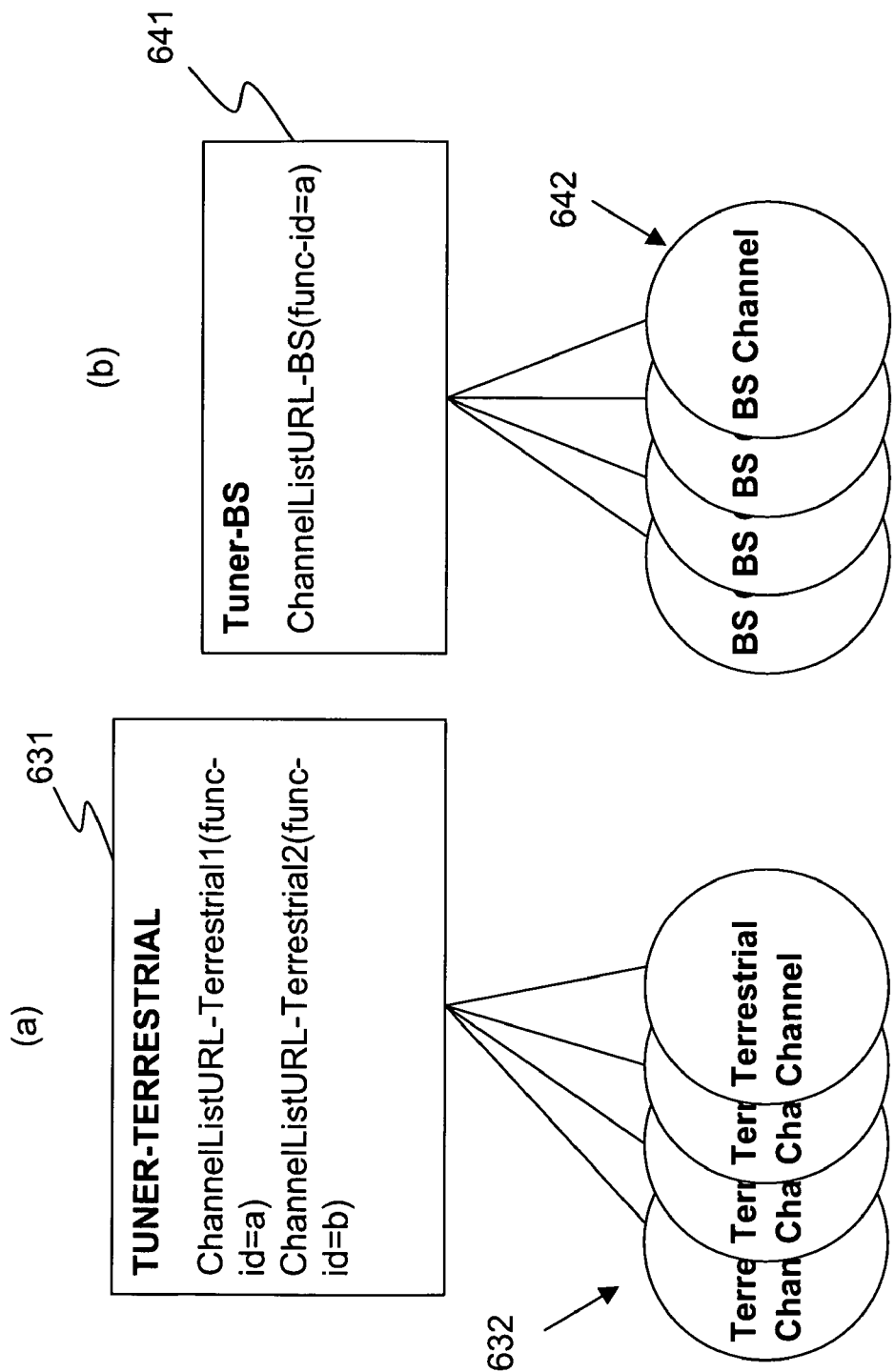
FIG. 16 is a diagram describing a corresponding example between a tuner container and a channel list URL.

Also, of the two tuners, in the case that one is a tuner exclusively for terrestrial broadcasting and the other is a tuner that can be used for both terrestrial and BS broadcasting, a channel list URL setting as illustrated in FIG. 16 can be realized.

As illustrated in FIG. 16, the various tuner containers 631 and 641 are set. The terrestrial tuner container 631 has multiple terrestrial channel items 632 set. The BS tuner container 641 has multiple BS channel items 642 set.

Two channel list URLs are set in the terrestrial tuner container 631, and the two channel list URLs can be used simultaneously, and only with the terrestrial broadcasting, simultaneous streaming delivery is can be made using two tuners.

Specifically, in the case of viewing or listening to two terrestrial broadcasts via two tuners, each of the channel list URL-Terrestrial1 (funcID=a) and the channel list URL-Terrestrial2 (funcID=b), which are in the terrestrial container 631, are each set in different AVT instances, and by each performing different tuner control, the two terrestrial broadcasts are sent to each client.

In the case of terrestrial broadcast and BS, by performing control with the combination of a channel list URL-Terrestrial2 (funcID=b) in the terrestrial container 611 and a channel list URL-BS1 (funcID=a) in the BS container 621, the terrestrial and BS broadcast content is provided to the client via the different tuners.

[Processing Flow of the Server and Client]

Figure 17:
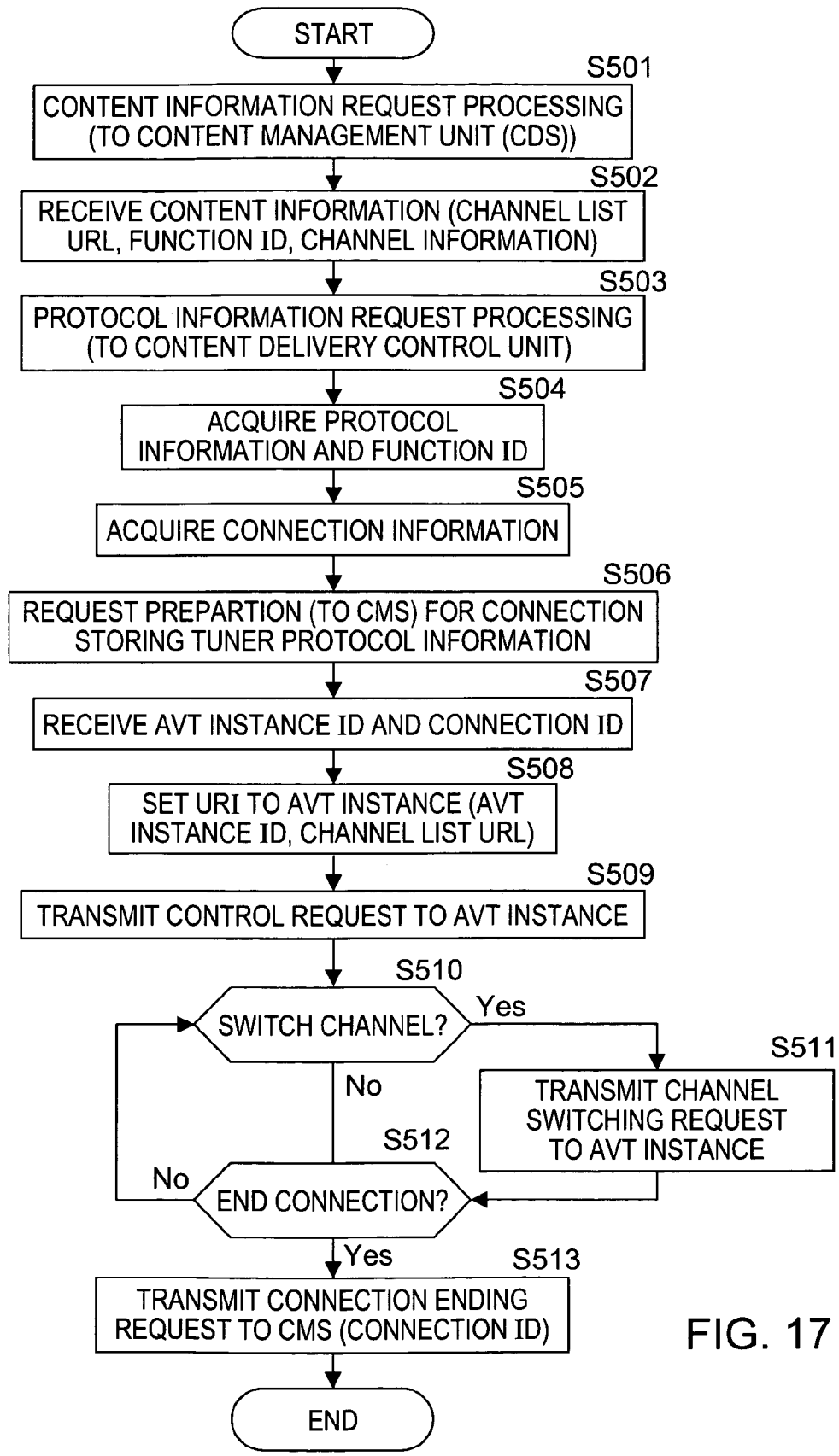
FIG. 17 is a flowchart describing the process of the server which executes streaming delivery processing of the tuner-received data.
Figure 18:
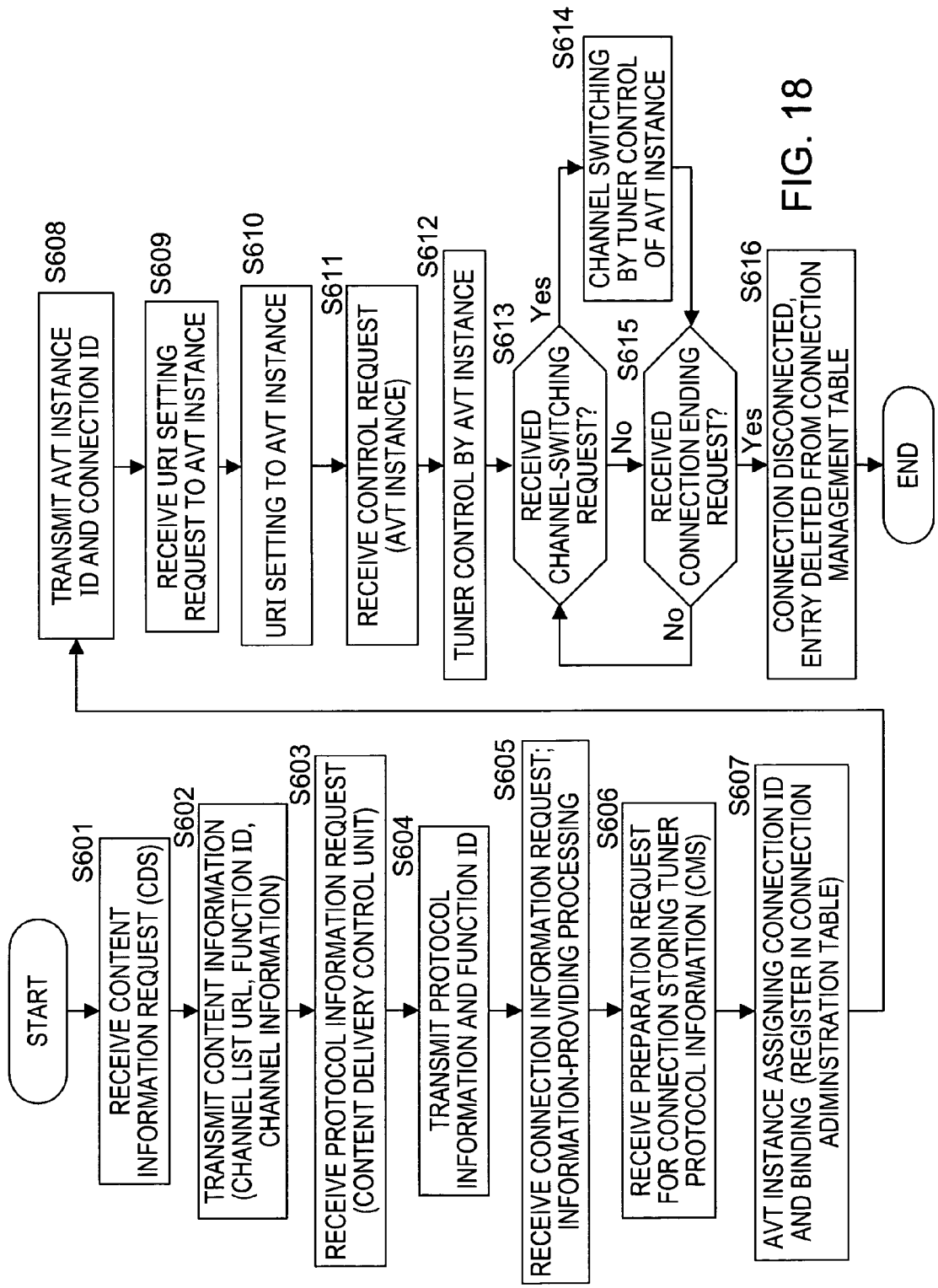
FIG. 18 is a flowchart describing the process of the client which executes streaming delivery processing of the tuner-received data.

The processing procedures of each of the server and client in the live streaming processing of the tuner-received data will be described with reference to FIG. 17 and FIG. 18. First, the processing with the client will be described with reference to the processing flow in FIG. 17.

The client device executes an acquiring request for content information by browsing or searching processing in Step S501. This is executed as to the content directory service 442 of the content management unit 440 (see FIG. 6).

In Step S502, the content information is received. Here, this process is for acquiring the content information of the tuner container and the channel item for executing the delivery of streaming data via the tuner, and acquires information based on the content information corresponding to the tuner container illustrated in FIG. 8(*a*) and the content information for each channel illustrated in FIG. 8(*b*). By this process, the channel list URL, the function ID, and the channel information are acquired.

Next, the client sends a protocol information acquiring request as to the connection manager service 431 of the content delivery control unit 430 in Step S503. In Step S504, a protocol information list is received from the connection manager service 431. A protocol information [internal: 1.2.3.4:application/x-av-tuner-content:func-id=t01] which illustrates that the delivery of live streaming data is available is included in the protocol information list.

Next, in Step S505, the client acquires information relating to other clients currently connected to the server 400, from the connection manager service 431. In Step S506, the client sends a connection preparation request (PrepareForConnection) as to the connection manager service 431. In the case that the client desires delivery of live streaming data using a tuner, protocol information having a function ID which matches the function ID (funcID) in the content information corresponding to the tuner container received from the content directory service (CDS) 442 in Step S502 is sent.

In Step S507, the client receives a connection ID and an AVT instance identifier (AVT instance ID) which is set (assigned) as a tuner control instance.

In Step S508, the client issues a URI (Uniform Resource Identifier) setting request as to the assigned AVT instance. The URI to be set as to the AVT instance includes the AVT instance ID notified from the connection manager service 431, and the channel list URL which is included in the content information corresponding to the tuner container acquired in Step S502.

The processing to this point is the setting processing for the purpose of having tuner control by the AVT instance enabled. Hereafter, the client issuing control requests as to the AVT instance enables various controls such as content transmission, stopping, and channel switching.

In Step S509, the client executes a content control request as to the AVT instance. For example, this is a playback (Play) request or a channel switching (Seek) request. The client generates the description data according to the XML data and sends the various types of control information to the AVT instance 433.

In Step S510, in the case that the user on the client side determines that channel switching should be performed, the client issues a channel switching (Seek) request as to the AVT instance in Step S511. An AVT instance ID and a switching channel number are stored in this control request. In Step S512, in the case of determining to end the connection, the connection ending request wherein the connection ID is stored is sent to the connection manager service 431. The connection ID is that which is received from the connection manager service 431 in Step S507.

Next, the processing on the server side will be described with reference to the processing flow in FIG. 18. In step S601, the content directory service 442 of the content management unit 440 (see FIG. 6) receives the content information acquiring request from the client. Here it is assumed that there has been an acquiring request for the content information of the tuner container and the channel item.

In Step S602, the content directory service 442 sends the content information of the tuner container and the channel item to the client. This information is the content information corresponding to the tuner container illustrated in FIG. 8(*a*) and the content information for each channel illustrated in FIG. 8(*b*), and includes the channel list URL, the function ID (funcID), and the channel information.

In Step S603, the connection manager service 431 of the content delivery control unit 430 of the server receives a protocol information acquiring request from the client. In Step S604, the connection manager service 431 sends a protocol information list to the client. The protocol information list which the connection manager service 431 sends to the client includes protocol information which is the information [internal:1.2.3.4:application/x-av-tuner-content:func-id=t01] illustrating that delivery of live streaming data is available.

Next, in Step S605, the connection manager service 431 provides information to the client, relating to the other clients currently connected to the server 400. The connection manager service 431 provides connection information based on the connection management table illustrated in FIG. 10.

In Step S606, the connection manager service 431 receives a connection preparation request (PrepareForConnection) from the client. In the case that the client desires delivery of live streaming data using a tuner, the function ID (funcID) which is included in the content information corresponding to the tuner container as the content information previously sent by the content directory service (CDS) 442 is included in the connection preparation request.

The connection manager service 431 which receives the connection preparation request from the client determines that this is a request for streaming delivery of the received data from the tuner, based on the protocol information [internal:1.2.3.4:application/x-av-tuner-content:func-id=t01] included in the connection preparation request, and in Step S607, sets (assigns) one of the AVT instances 433 within the content control unit 432 as a tuner control instance, and performs binding processing, in other words, the correlation thereof, between the AVT instance identifier (AVT instance ID), and the connection ID as to the client which sent the connection preparation request, and performs entry setting as to the connection management table illustrated in FIG. 10, and notifies this connection ID and the AVT instance ID to the client in Step S608.

In Step S609, when the AVT instance receives a URI (Uniform Resource Identifier) setting request from the client, in Step S610 the AVT instance ID and the channel list URL are set in the AVT instance as the AVT instance URIs.

The AVT instance can identify the client and the content to be controlled for itself, based on the AVT instance ID specified by the client and the channel list URL. In other words, a client which specifies the AVT instance ID and sends various control commands is acknowledged as the client corresponding to the AVT instance, and the tuner made to correlate by the channel list URL is the object of control. The channel list URL is the corresponding content of the tuner container, and the AVT instance setting the channel list URL is set as the instance which executes control of the tuner 410.

Next, in Step S611, when the AVT instance receives the content control request, in Step S612 the AVT instance 433 executes tuner control based on the received information from the client, for example processing such as content playback starting, ending, channel switching and so forth. The AVT instance 433 specified the content to be controlled based on the set content URL, and controls the specified content to be controlled. In this case, the content URL is a channel list URL, and the channel list URL is content information corresponding to the tuner container, and the AVT instance 433 executes control of the tuner 410.

In Step S613, in the case that a channel switching (Seek) request is determined to be received, the AVT instance 433 controls the tuner 410 in Step S614, and switches the channel of the tuner. The HTTP connection between the server and client before and after the channel switching is the same URL, that is to say, an HTTP connection based on the same channel list URL, and therefore between the server and client, the channel switching is executed while maintaining the connection.

In Step S615, in the case that the connection manager service 431 is determined to have received a connection ending request wherein a connection ID is stored, the connection between the server and client is disconnected in Step S616 according to the request from the client, and further, the corresponding entry is deleted from the connection management table which is described with reference to FIG. 10.

Also, as described above, in the case that the image or audio data sent from the server to the client is, for example, coded data such as MPEG or the like, if the sending data switching is executed unconditionally based on the timing of the channel switching received from the client, inconsistencies can occur in the coded data packet which is sent. For example, if, during the sending of one portion of the PES (Packetized Elementary Stream) packet which is a packet with the pack (Pack) configuration regulated in the MPEG-2 system, channel switching is executed and the sent data is changed, omissions can occur in the pack (Pack) which is one processing unit in the case of decoding with the client, and playback errors occur.

Accordingly, in the case that the server determines to have received a channel switching (Seek) request in step S613, from the changes of the sent data based on the channel switching request from the client, the server determines whether or not the consistency of the sent coded data can be retained, and in the case that consistency is determined to be not retained, the connecting connection for the data stream delivery between the server and client before executing channel switching by the control of the tuner 410 of the AVT instance 433 in Step S614, that is to say, the HTTP connection based on the channel list URL is disconnected, and the server further notifies the client via the event notification connection that the connecting connection for the data stream delivery has been disconnected, and after this, channel switching is executed by the control of the tuner 410 of the AVT instance 433 in step S614.

In the case that the client receives a connection disconnection notification from the server, processing for setting the HTTP connection based on the channel list URL, that is to say, the HTTP-GET method, based on the channel list URL, is sent again to the server. The setting state of the AVT instance (tuner control instance 433) is maintained, and therefore, setting processing for a new assignment, URI setting and so forth, of the tuner control instance 433 can be omitted.

As described above, the server can be configured so as to detect the data encoding situation of the codec 420, input the detected information into the tuner control instance 433, and execute the channel switching of the tuner 410 under the timing control of the tuner control instance 433, and in this case, after receiving the channel switching (Seek) request in Step S613, based on the detected information of the data encoding situation of the codec 420, the tuner control instance 433 executes channel switching by the control of the tuner 410 of the AVT instance (tuner control instance 433) in Step S614, with the timing wherein consistency of coded data sent to the client can be retained.

By executing such control of channel switching timing on the server side, decoding errors on the client side can be prevented, and playback of data before channel switching and of data after channel switching can be executed normally on the client side.

[Live Image Recording Processing]

Next, the image recording process of content received by the tuner on the server, that is to say, processing for recording the tuner-received content on the storage means such as a hard disk within the server, will be described.

Figure 19:
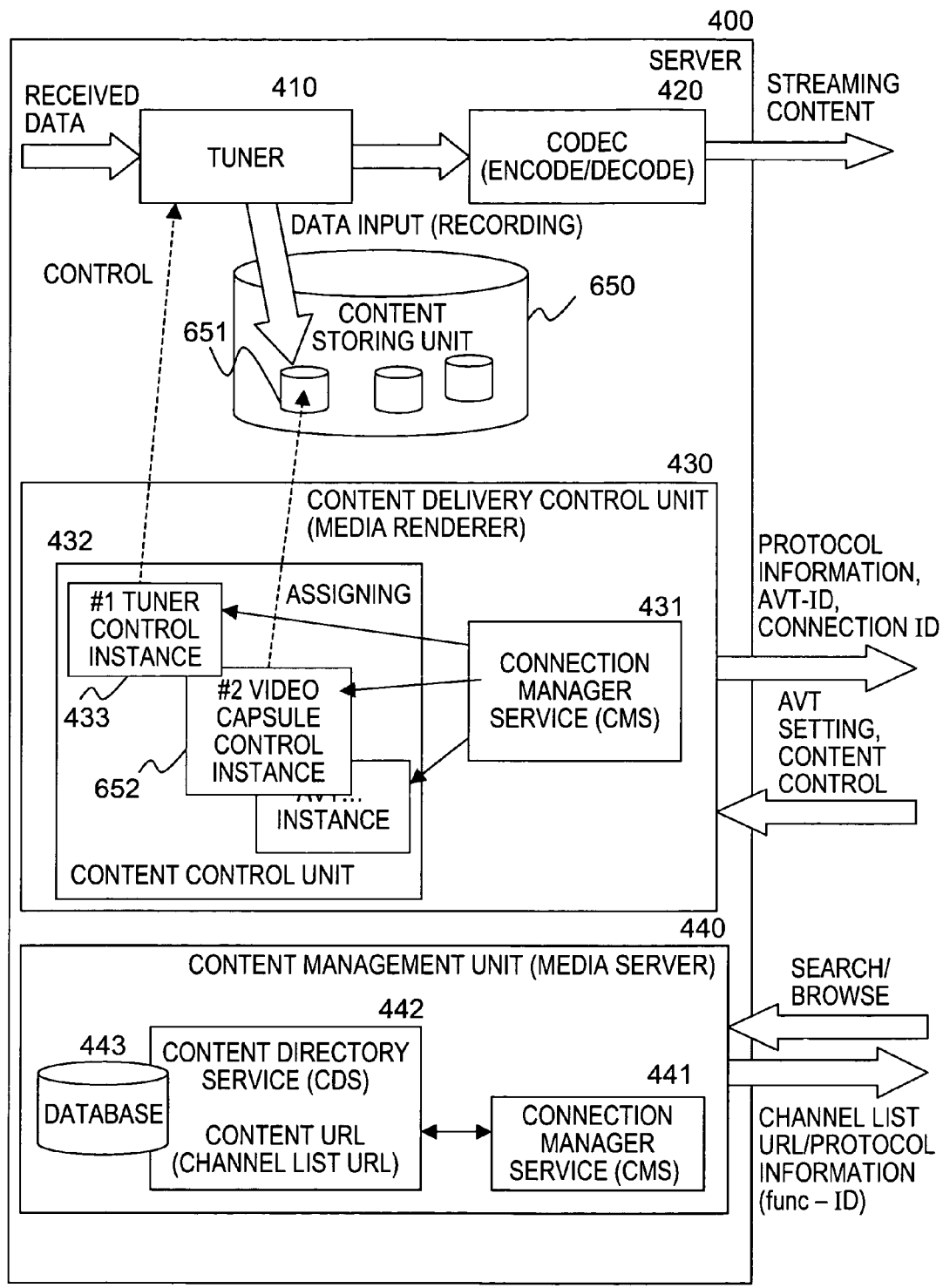
FIG. 19 is a diagram describing the configuration of the server which executes streaming delivery processing of the tuner-received data and live content recording.

FIG. 19 illustrates a server configuration example of a server having tuner functionality, having a configuration for delivering the data received from the tuner to the client, and having a processing configuration for executing content storing in the content storage unit such as a hard disk or the like within the server.

The essential portions in the configuration illustrated in FIG. 19 is similar to the configuration described previously with reference to FIG. 6, and the server 400 comprises a tuner 410, a codec 420, a content delivery control unit (media renderer) 430, and a content management unit (media server) 440.

The present configuration example differs in that it executes control as to a content storage unit 650, a video capsule 651 within the content storage unit, an AVT instance newly set in the content control unit 432 within the content delivery control unit 430, that is to say, various data storage units such as an HDD, a DVD a CD drive and the like, and has a video capsule control instance 652 as a storage unit control instance functioning as a storage unit control processing unit which performs content image recording processing control.

In FIG. 19, the configuration portions which are the same as that in FIG. 6 have the same reference numerals, and since these basically execute similar processing as those described with reference to FIG. 6, the description thereof will be omitted. Hereafter, FIG. 19 will be referenced, and the processing will be described for image recording of the received content of the tuner 410 to the video capsule 650 as an object set for live data storage which is set in the content storage unit 650 of the hard disk or the like while providing live content received from the tuner 410 to the client.

In the description, an example will be described wherein the content storage unit is a hard disk and the recording content is image data, but the content storage unit is not limited to a hard disk, and can be a storage means capable of writing data, such as a DVD, a CD-R, or a flash memory, and also the recording content is not limited to image data, and can be audio data, text data, or a program, and the data form is not of concern.

Also, a video capsule is illustrated as an example of a content storage object performing content recording, but the video capsule is to illustrate one example of a content storage object, and any content storage object can be used, such as an audio data capsule and so forth. Hereafter, an example will be described wherein the content storage unit is a hard disk, the recording content is image data, and the content storage object is a video capsule.

In order to perform recording images into the video capsule 651, a video capsule control instance 652 is set as an AVT instance for executing control of the content storage unit 650. Under the control of the video capsule control instance 652, a stream for recorded images flows and is recorded as to the video capsule 651 within the content storage unit 650 such as a hard disk from the tuner 410.

With such an image recording processing, two contents need to be handled. In other words, there is a recorded image source (recorded image source) content and an image recording target (image recording sink) content. In this case, the tuner-received content becomes the recorded source content, and the video capsule storage content becomes the image recording target content.

The tuner-received content is specified by a channel list URL, as can be understood from the above-described description. The image recording target content is specified by the video capsule URL. In the case that no video capsule URL exists, a video capsule is generated by the object generating processing, and processing for setting a video capsule URL as the content URL as to the generated video capsule becomes necessary.

During image recording, the recorded image source (recorded image source) content is in a playback state, and the image recording target (image recording sink) content transitions to a image recording state. A tuner control instance 433 and a video capsule control instance 652 are used as a content control unit for executing management and control of such transition states. The tuner control instance 433 is an recorded image source control instance (recorded image source AVT instance), and the video capsule control instance 652 is an image recording sink control instance (image recording sink AVT instance). A channel list URL and a video capsule URL are set into these control instances. The setting processing is processing similar to the URI setting processing of the AVT in Step S107 previously described in the processing sequence in FIG. 9. The processing sequence of the present example will be described at a later stage with reference to FIG. 20.

The regions for storing the tuner-received content is secured in advance, and in the case that a region having a content URL already exists, this content URL is set in the AVT instance and used as the control instance of the image recording target content, and the tuner-received content can be recorded in the storage region set in advance.

However, in the case that a region storing the tuner-received content is not secured in advance, the client issues an object generating request (CreateObject) as to the content directory service 442 of the server 400, and generates a storage object (video capsule) of the tuner-received content.

In the case of issuing the object generating request (CreateObject), the generated object (video capsule) is illustrated to be for live image recording by the metadata, and is created. By this processing, even in the case of a new video capsule in a state of no content being stored, the server assigns a URL which shows the content to the property (res property) of the object (video capsule). Details thereof will be described later.

The acquiring of an AVT instance which is necessary for live image recording, that is to say, the acquiring of a video capsule control instance 652, and the setting processing thereof, is executed by similar procedures as the above-described setting of the tuner control instance 433. The server which supports image recording assigns at least two AVT instances, considering those for image recording and those for playing back. Two connection IDs are set for each AVT instance.

In the state wherein two connection IDs are set, two AVT instances, that is to say, content URLs for an image recording source and an image recording target, in other words a channel list URL and a video capsule URL, are each set as to the tuner control instance 433 and the video capsule control instance 652. This setting processing is executed as processing according to the procedures for AV transport URI setting (AVT:SetAVTransportURI) in Step S107 illustrated in the diagram.

Further, URI-specifying processing (AVT:X_SetAVTRecordInputURI action) of the recorded image source content is executed as to the AVT instance which handles the image recording target content, that is to say, the video capsule control instance 652. The specifying processing of the URI of the recorded image source content is issued as to the video capsule control instance 652 as a control request from the client wherein is stored an AVT instance identifier which handles image recording target content, that is to say a video capsule control instance ID, and a recorded image source content URL, that is to say a channel list URL.

Thus, when the image recording target AVT (video capsule control instance 652) performs image recording processing (X_Record action), what is to be recorded is determined.

When a playback request (AVT:Play action) is sent to the recorded image source content, that is to say, the tuner-received content corresponding to the channel list URL, the client can obtain streaming from the recorded image content URL. This is equivalent to the previously-described playback request in Step S108 in the sequence diagram in FIG. 9.

When the client sends an image recording starting request (AVT:X_Record action) as to the image recording target content, that is to say, the video capsule control instance 652 wherein a video capsule URL is set, image recording is started under the control of the video capsule control instance 652.

Also, when the client sends a pause request (AVT::Pause action) as to the image recording target content, that is to say, the video capsule control instance 652 wherein a video capsule URL is set, image recording pausing can be performed. For example this can be used for cutting commercials and so forth.

In the case of switching recorded image source content, if in the range of a channel listed in the channel list corresponding to the recorded image source content URL such as channel changing, that is to say, the channel list URL, then even if the channel is changed, image recording can be continued without interruption. Time shift playback can perform streaming as to the image recording target content URL, rather than the recorded image source content URL. The details of time shift playback will be described later.

A method for adding a new video capsule and setting this as the image recording target content will be described. To create a new object, the client issues an object generating request (CreateObject) as to the content directory service 442 of the server 400. Thus, a storage object (video capsule) of the tuner-received content is generated.

As the metadata to correspond to the stored object (video capsule) of the tuner-received content, the settings of [recording status (recordStatus)], [image recording ending date and time], and [recording quality level] are available. Specification of this information from the client is optional. In the case of specifying these, then processing according to the specification information under the control of the video capsule control instance 652 is performed, and in the case there is no specification, processing is executed according to control information previously set as a default.

With the object (video capsule) generating processing, in the case that the content directory service 442 of the server requests the creation of an object wherein the [recording status (recordStatus)] is unrecorded (NotYet), the server determines this to be an object for live recording, and even if there is actually no content, a content URL (video capsule URL) is set in the newly generated object (video capsule).

With the object (video capsule) generating processing, the server performs setting of, for example, the following metadata corresponding a video capsule for live image recording.

[recording status (recordStatus)]=unrecorded (NotYet)
[recording quality level]=setting or default value
[resource (res)]=in the case of not supporting time shift playback, an internal connection URL which starts with file:, and in the case of supporting time shift playback, a URL for use both with internal connection and streaming which starts with http.

[Protocol Information]
Schema: http-get if supporting time shift playback, and internal if otherwise,
Network: * if http-get, IP address if internal,
MIME-Type: in the case of being specified by the client and accepted, the value thereof, if not specified, then * or a default value,
Additional information (AdditionalInfo:func-id=<value to express HDD>)
[recording quality level (recordQualityLevel)=setting or default value.

A function ID for showing that content processing by the control of the content storage unit 650 is performed is set in the additional information in the protocol information. In this case, the content storage unit 650 is a hard disk, and shows that this accompanies the control of the HDD. The function ID is to show the control object for content processing as described above, and in the case of corresponding to DVD storage content, a function ID showing a DVD, and in the case of performing tuner control, a function ID showing a tuner is set in the property information of the content.

An example of the metadata created with the object generating request (CreateObject) is shown below.

```
<item id=" vc103" parentID=" cab32" restricted=" 1">
<dc:title>file for next image recording</dc:title>
<upnp:class>object.item.videoItem.sonyVideoCapsule</upnp:cla
ss>
<av:recordQualityLevel>4</av:recordQualityLevel>
<av:recordStatus>NotYet</av:recordStatus>
...
<res protocolInfo=" internal:1.2.3.4:video/mpeg:func-id=hdd"
av:codec=" MPEG2V" duration=" 00:00:00.000" ...>
file:/cabinet32/recording-001
</res>
</item>
```

The client can change the setting values herein by object updating (UpdateObject).

For example, a property can be added for automatically ending an image recording, and the recording ending date and time can be added as property information. An example is shown below.

```
<item id=" vc103" parentID=" cab32" restricted=" 1">
<dc:title>file for next image recording</dc:title>
<upnp:class>object.item.videoItem.sonyVideoCapsule</upnp:cla
ss>
<av:recordQualityLevel>4</av:recordQualityLevel>
<av:recordStatus>NotYet</av:recordStatus>
<av:recordEndDateTime>2003-03-
14T22:00:000</av:recordEndDateTime>
...
<res protocolInfo=" internal:1.2.3.4:video/mpeg:func-id=hdd"
av:codec=" MPEG2V" duration=" 00:00:00.000" ...>
file:/cabinet32/recording-001
</res>
</item>
```

With the above-described example,

```
<av:recordEndDateTime>2003-03-
14T22:00:000</av:recordEndDateTime>
``` is the added recording ending date and time data.

Next, time shift playback will be described. Time shift playback is processing for streaming playback of a portion farther in the past than the point in time of the content of the image recording in progress. Time shift playback can be made by performing streaming from the image recording target URL (video capsule URL) instead of the recorded image source URL (channel list URL) as is the case with live streaming. This time shift playback performs content delivery processing operation similar to that of a normal video capsule. However, the available range for seeking, that is to say, the ranges capable of temporally fast-forwarding or rewinding playback of the delivery content, changes constantly. The client can discover the range changes of this seeking from then event notification of the server.

From the event notification, the seeking range at the current point in time and the current time at the server can be found. The client can constantly understand the seeking range hereafter by matching this with the time at which the client received the event notification. Also, the ending or pausing of the image recording main unit, regardless of whether or not there is time shift playback, is notified from the image recording target AVT (video capsule control instance 652) by the event notification.

The processing sequence in the case of performing live streaming of the tuner-received content and the live image recording together will be described with reference to FIG. 20.

First, the client acquires content information from a browsing or searching process in Step S701, in order to research contents which are retained by the server and can be provided to the client. The client attempting to execute a search can acquire the content information by requesting the server a "search" which specifies a class corresponding to the content management directory hierarchy or the object aggregate, or a "browse" as a specification of a specific object. The browse or search is executed as to the content directory service 442 of the content management unit 440, and XML data, based on the metadata corresponding to each object from the database 443 wherein the content directory service 442 has stored the metadata, is generated and provided as content information to the client.

Regarding the content information relating to the tuner container, the content information corresponding to the tuner container illustrated in FIG. 8(*a*) and the information based on the content information for each channel illustrated in FIG. 8(*b*) are sent to the client.

The client displays the content information on a display, based on the XML data described in the content information received from the server. This is the display information such as that described previously with reference to FIG. 4.

The client acquires
 a channel list URL,
 a function ID (funcID), and
 channel information,
based on the content information corresponding to the tuner container and the channel item illustrated in FIGS. 8(*a*) and 8(*b*).

At this point, the information of the video capsule for image recording is acquired, and the video capsule URL included in the video capsule information can be selected as the image recording video capsule URL of the tuner-received data, but in the case that the video capsule is not set, the generating processing of the video capsule is performed in Step S702.

The client sends an object generating request to the content directory service 442, and newly creates a video capsule. At this time, the settings [recording status (recordStatus)], [recording ending date and time], and [recording quality level] can be set as metadata. However, specification of this information by the client is optional. The setting for [recording status (recordStatus)] is set as unrecorded (NotYet).

With the object (video capsule) generating processing, in the case that the content directory service 442 of the server is requested to create an object wherein the [recording status (recordStatus)] is unrecorded (NotYet), the server determines this to be an object for live image recording, and even if there is actually no content, a content URL (video capsule URL) is set in the newly generated object (video capsule).

Next, the client sends a protocol information acquiring request as to the connection manager service 431 of the content delivery control unit 430 inn step S703. This is processing for requesting protocol information which can be input into the content delivery control unit 430, that is to say, a protocol information list that can be processed by the content delivery control unit 430.

In Step S704, the connection manger service 431 sends the protocol information list to the client. This protocol information list includes various protocol information that can be processed by the content delivery control unit 430, such as MPEG as the protocol for video data or ATRAC for audio data, for example.

The protocol information list which the connection manager service 431 of the server capable of delivery of the tuner 410 received data sends to the client includes information which shows that live streaming data delivery is available. Specifically, the protocol information [internal:1.2.3.4:application/x-av-tuner-content:func-id=t01] is included. In other words, a function ID (func-id=t01) is included, which shows that the schema cell (first column) is [internal], and that it is content for executing tuner control processing. This protocol information shows that the logical connection with the internal content management unit (media server) 440 is can be made by the connection preparation (PrepareForConnection) described below.

Further, the protocol information list which the connection manager service 431 sends to the client includes the information which shows that image recording of live streaming data is available. Specifically, the protocol information [internal: 1.2.3.4:video/mpeg:func-id:hdd] is included. In other words, a function ID (func-id=hdd) is included, which shows that the schema cell (first column) is [internal], and that it is the content executing the hard disk control processing. This protocol information shows that the logical connection with the internal content management unit (media server) 440 is available by the connection preparation (PrepareForConnection) described below.

As described above, the function ID is an ID which is set for each control object for the purpose of content delivery, such as tuner control, DVD control, hard disk control and the like, and is also included in the content information which the client acquires from the content directory service 442 by the browsing or searching process in Step S101. Here, the function ID [func-id=t01] is set as the function ID corresponding to the content delivery using the tuner 410.

Next, in Step S705, the client acquires information relating to the other clients currently connected to the server 400, from the connection manager service 431. The connection manager service 431 retains a connection management table as illustrated in FIG. 10 which correlates to the protocol information corresponding to content wherein a connection ID corresponding to a client connected to the server is delivered to a client identifier and each client, and executes connection management. According to the acquiring request of the connection information from the client, this information is provided to the client. This processing will be described later. Also, this connection information notification processing is executed for the purpose of the client confirming the connection status of other clients, and can be omitted.

In Step S706, the client sends a connection preparation request (PrepareForConnection) as to the connection manager service 431. In the case that the client desires delivery processing of the live streaming data using a tuner, and recording processing of the live streaming data, the protocol information [internal:1.2.3.4:application/x-av-tuner-content: func-id=t01] corresponding to the tuner-received processing content and the protocol information [internal:1.2.3.4:video/ mpeg:func-id=hdd] corresponding to the hard disk recording processing content is sent.

The connection manager service 431 receiving the connection preparation request (PrepareForConnection) from the client determines this to be a request of streaming delivery of received data from the tuner, based on the protocol information [internal:1.2.3.4:application/x-av-tuner-content:func-id=t01] corresponding to the tuner included in the connection preparation request, and sets (assigns) one of the AVT instances 433 within the content control unit 432 as a tuner control instance, and performs binding processing, that is to say, correlating of the connection ID between the client 460 which sent the connection preparation request (PrepareForConnection) and the tuner control instance, and the AVT instance identifier (AVT instance ID) set (assigned) as the tuner control instance.

Further, the connection manager service 431 determines this to be a recording request for the received data from the tuner, based on the protocol information [internal:1.2.3.4: video/mpeg:func-id=hdd] corresponding to the hard disk included in the connection preparation request, and sets (assigns) one of the AVT instances 652 within the content control unit 432 as a video capsule control instance, and performs binding processing, that is to say, correlating of the connection ID between the client 460 which sent the connection preparation request (PrepareForConnection) and the video capsule control instance, and the AVT instance identifier (AVT instance ID) set (assigned) as the video capsule control instance.

The connection manager service 431 performs entry setting in the connection management table, as illustrated in FIG. 21. In other words, for the same client A, the protocol information 681 corresponding to the streaming delivery of the tuner-received data and the protocol information 682 corresponding to the recording processing of the tuner-received data each have entries that are set, which correspond to the connection ID and AVT instance ID thereof.

In Step S707, the connection manager service 431 notifies the client of the two AVT instance IDs of the tuner control instance 433 and the video capsule control instance 652 which are the two assigned AVT instance identifiers, and the two connection ID information which are set as to the connection between the client and server. The client stores this information into the memory.

In Step S708, the client issues a URI (Uniform Resource Identifier) setting request as to the assigned AVT instances, as the processing for performing content delivery control and recording processing by the two AVT instances assigned by the connection manager service 431.

The URI which is set as to the tuner control instance includes the channel list URL which is included in the content information corresponding to the tuner control instance ID notified from the connection manager service 431 and the tuner container acquired during the processing in Step S703.

Also, the URI which is set as to the video capsule control instance includes the video capsule control instance ID notified from the connection manager service 431, and the video capsule URL acquired during the processing in Step S703.

The tuner control instance 433 can identify the client and the control object content of itself, based on the AVT instance ID specified from the client and the channel list URL. On the other hand, the video capsule control instance 652 can identify the client and the control object content of the video capsule control instance 652 itself, based on the AVT instance ID specified from the client and the video capsule URL.

The channel list URL is content corresponding to the tuner container, and the AVT instance wherein the channel list URL is set, is set as the instance for executing control of the tuner 410. The video capsule URL is content corresponding to the video capsule object, and the AVT instance wherein the video capsule URL is set, is set as the instance for executing control of the video capsule 651.

Further, in Step S708, the URI specifying processing (AVT:X_SetAVTRecordInputURI action) of the recorded image source content is executed as to the AVT instance which handles the image recording target content, that is to say, the video capsule control instance 652. The URI specifying processing of the recorded image source content is executed from the client as to the video capsule control instance 652 as a control request wherein the AVT instance identifier which handles the image recording target content, that is to say, the video capsule control instance ID, and the recorded image source URL, that is to say, the channel list URL, are stored. Thus, when the image recording target AVT (video capsule control instance 652) performs image recording processing (X_Record action), which image is to be recorded is decided.

So far, the setting processing of each AVT instance is completed, and the client can perform various control requests as to each AVT instance. In Step S709, a playback (Play) request is issued as to the tuner control instance 433. This control request uses, for example, a SOAP (Simple Object Access Control) protocol. Based on the SOAP, the client generates description data according to the XML data, and sends this to the tuner control instance 433.

The AVT instance 433 executes control based on the received information from the client, such as content playback starting, ending, and channel switching processing, for example. The AVT instance 433 specifies the control object content based on the content URL which has been set, and controls the specified control object content thereof. In this case, the content URL is the channel list URL, and the channel list URL is the content information as to the tuner container, and the tuner control instance 433 executes control of the tuner 410.

When the tuner control instance 433 receives the playback (Play) request in Step S709, the tuner control instance 433 controls the tuner 410, and starts sending the tuner-received data to the client.

In Step S710, a channel setting (Seek) request is issued as to the AVT instance. This request includes the AVT instance ID and the channel number. When the tuner control instance 433 receives the channel setting (Seek) request, the tuner control instance 433 controls the tuner 410, and sets the tuner channel and sends the received data to the client.

Further, in Step S711, when the client sends an image recording starting request (AVT:X-Record action) as to the video capsule control instance 652, the image recording is started under the control of the video capsule control instance 652.

Also, the metadata of the video capsule has the setting information of [image recording ending date and time] and [recording quality level] as described above, and the video capsule control instance 652 performs recording processing according to the setting information.

In Step S712, the live streaming delivery is executed under the control of the tuner control instance 433, and in Step S713, the live content recording is executed as to the video capsule 651 of the content storage unit 650 under the control of the video capsule control instance. Step S714 illustrates that the event notification processing (SENA) is executed concurrently with the content delivery. As described above, the event is information relating to the delivery content such as the switching between stereo and monaural for example, and is the processing wherein the server notifies various event information based on the event notification request based on the event URL from the client.

Also, when the client sends a pause request (AVT::Pause action) as to the image recording target content, that is to say, the video capsule control instance 652 wherein a video capsule URL is set, image recording pausing can be performed. For example, this can be used for cutting commercials and so forth.

In the case of switching recorded image source content, if in the range of a channel listed in the channel list corresponding to the recorded image source content URL such as channel changing, that is to say, the channel list URL, then only by issuing a channel change request to the tuner control instance 433, image recording can be continued without interruption. Time shift playback can be realized by a streaming request as to the video capsule control instance 652 which corresponds to the image recording target content URL, rather than the recorded image source content URL.

[Server and Client Processing Flow with Live Image Recording]

Figure 22:
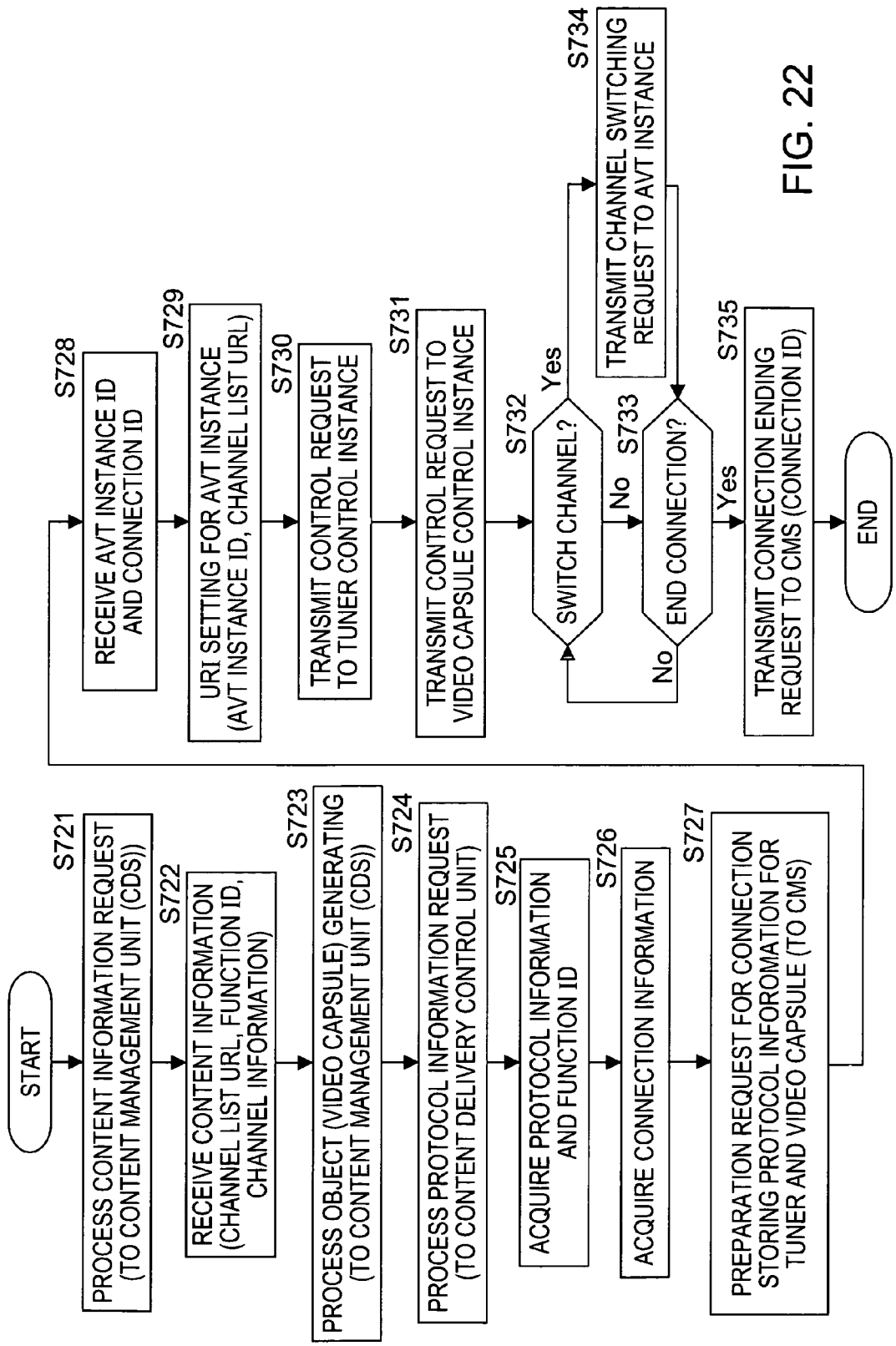
FIG. 22 is a flowchart describing the process of the server which executes streaming delivery processing of the tuner-received data and live content recording processing.
Figure 23:
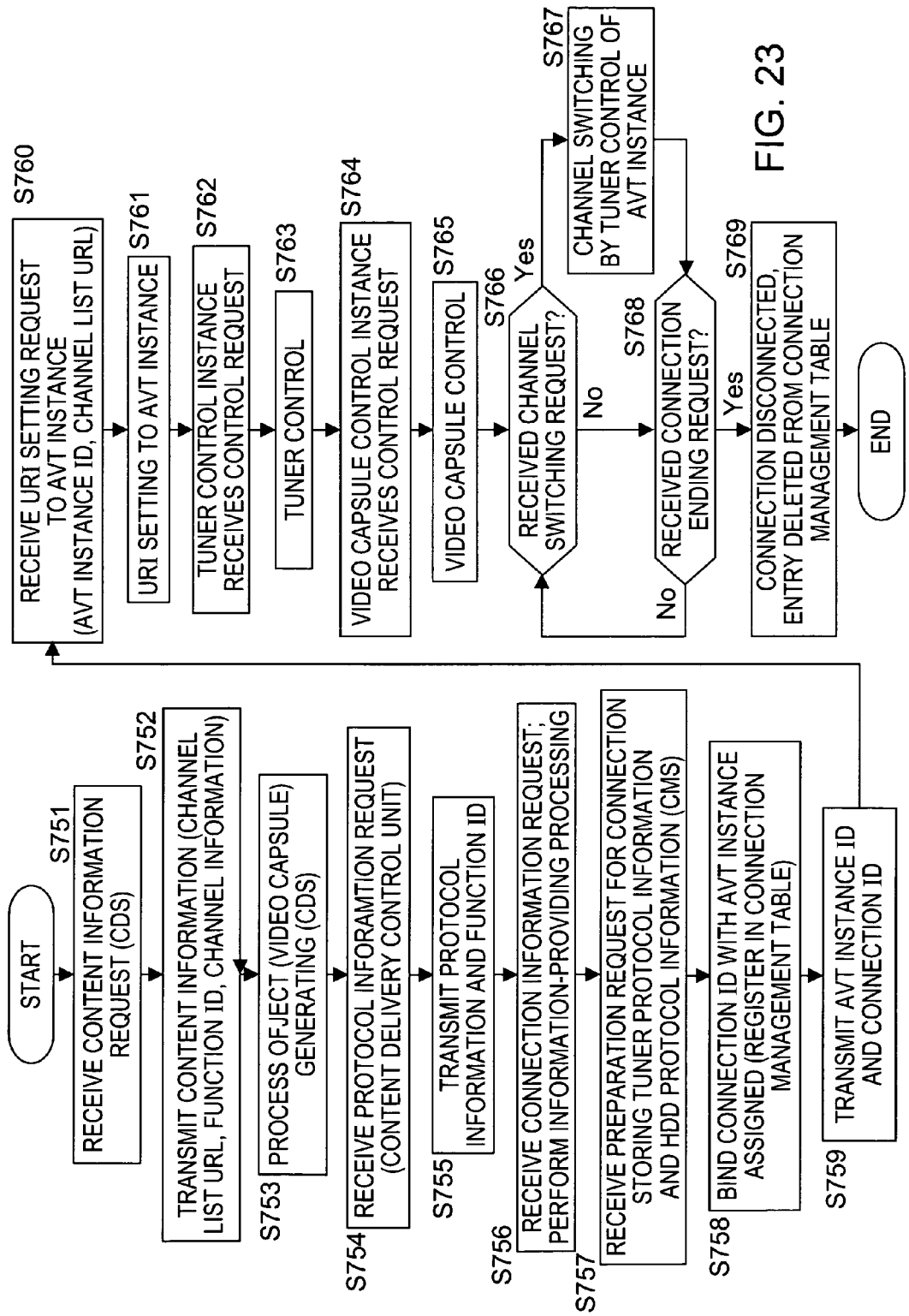
FIG. 23 is a flowchart describing the process of the client which executes streaming delivery processing of the tuner-received data and live content recording processing.

The processing procedures for each the server and client in the case of performing live streaming processing of the tuner-received data and live image recording processing will be described with reference to the flow charts in FIG. 22 and FIG. 23. First, the client processing will be described with reference to the processing flow in FIG. 22.

The client device executes an acquiring request for content information in Step S721 from the browsing or searching process. This is executed as to the content directory service 442 of the content management unit 440 (see FIG. 19).

In Step S722, the content information is received. Here, this is for acquiring the content information for the tuner container and channel item for executing the delivery of the streaming data via the tuner, and acquires the content information corresponding to the tuner container shown in FIG. 8(a) and the information based on the content information for each channel shown in FIG. 8(b). From this processing, the channel list URL, the function ID, and the channel information are acquired.

In Step S723, the generating processing of the video capsule is performed. In the case that the video capsule or other storage regions are already set, the object generating in Step S723 can be omitted. In the case of performing object generating, the client sends the object generating request to the content directory service 442, and newly creates a video capsule. At this time, the settings of [recording status (recordStatus)]=unrecorded (NotYet), [recording ending date and time], and [recording quality level] as metadata are available.

Next, the client sends a protocol information acquiring request to the connection manager service 431 of the content delivery control unit 430 in Step S724. This is processing for requesting protocol information which can be input into the content delivery control unit 430, that is to say, a protocol information list that can be processed by the content delivery control unit 430.

In Step S725, the client receives the protocol information which includes a function ID. The protocol information showing live streaming by tuner control [internal:1.2.3.4:application/x-av-tuner-content:func-id=t01] and the protocol information showing live streaming data image recording [internal:1.2.3.4:video/mpeg:func-id=hdd] is included.

Next, in Step S726, the client acquires information relating to other clients which are currently connected to the server 400 from the connection manager service 431. This is information based on the connection management table (see FIGS. 10 and 21) which is retained by the server.

In Step S727, the client sends a connection preparation request (PrepareForConnection) to the connection manager service 431. In the case that the client desires delivery processing of live streaming data using the tuner and recording processing of the live streaming data, the protocol information corresponding to the tuner-received processing content [internal:1.2.3.4:application/x-av-tuner-content:func-id=t01] and the protocol information corresponding to the hard disk recording processing content [internal:1.2.3.4:video/mpeg:func-id=hdd] is sent.

In Step S728, the client receives the two AVT instance IDs of the tuner control instance 433 and the video capsule control instance 652 which are the two assigned AVT instance identifiers, and the two sets of the connection ID information which are set as to the connection between the client and server, assigned from the connection manager service 431. The client stores this information into the memory.

In Step S729, the client issues a URI (Uniform Resource Identifier) setting request as to the assigned AVT instances, as the processing for performing content delivery control and recording processing by the two AVT instances assigned by the connection manager service 431. The URI which is set as to the tuner control instance includes the tuner control instance ID which is notified from the connection manager service 431 and the channel list URL, and the URI which is set as to the video capsule control instance includes the video capsule control instance ID and the video capsule URL.

Further, in Step S729, the URI specifying processing (AVT:X_SetAVTRecordInputURI action) of the recorded image source content is executed as to the AVT instance which handles the image recording target content, that is to say, the video capsule control instance 652. The URI specifying processing of the recorded image source content is executed from the client as to the video capsule control instance 652 as a control request wherein the AVT instance identifier which handles the image recording target content, that is to say, the video capsule control instance ID, and the recorded image source URL, that is to say, the channel list URL, are stored. Thus, when the image recording target AVT (video capsule control instance 652) performs image recording processing (X_Record action), which image is to be recorded is decided.

So far, the setting processing of each AVT instance is completed. In Step S730, a streaming data delivery starting request is sent to the tuner control instance 433. Further, in Step S731, the client sends an image recording starting request (AVT:X_Record action) to the video capsule control instance 652. By this processing, image recording is started under the control of the video capsule control instance 652.

In the case that the user on the client side decides to perform channel switching in step S732, the client issues a channel switching (Seek) request as to the tuner control instance 433 in Step S734. An AVT instance ID and a switching channel number is stored in the control request. In Step S733, in the case that the connection is decided to be ended, a connection ending request wherein a connection ID corresponding to the tuner control instance 433 is stored is sent to the connection manager service 431. The connection ID is that which is received from the connection manager service 431 in Step S725. However, even after the delivery of the streaming data is ended, data recording will continue recording processing until such time as the recording ending time which is previously set as the metadata in the video capsule.

Next, the processing procedures on the server side will be described with reference to the processing flow in FIG. 23. In Step S751, the content directory service 442 of the content management unit 440 (see FIG. 19) receives a content information acquiring request from the client. Here, let us say that an acquiring request for content information of the tuner container and the channel item is sent from the client.

In Step S752, the content directory service 442 sends the content information of the tuner container and the channel item to the client. This is the content information corresponding to the tuner container shown in FIG. 8(a) and the content information for each channel shown in FIG. 8(b), and includes a channel list URL, a function ID (funcID), and channel information.

In Step S753, generating processing of a video capsule is performed, based on the request from the client. With the object (video capsule) generating processing, in the case that the content directory service 442 of the server requests the creation of an object wherein the [recording status (recordStatus)] is unrecorded (NotYet), the server determines this to be an object for live image recording, and even if there is actually no content, a content URL (video capsule URL) is set in the newly generated object (video capsule).

In Step S754, when the connection manager service 431 of the content delivery control unit 430 receives a protocol information acquiring request from the client, the connection manager service 431 sends a protocol information list to the client in Step S755. This protocol information list includes the protocol information showing live streaming by the tuner control [internal:1.2.3.4:application/x-av-tuner-content:func-id=t01] and the protocol information showing live streaming data image recording [internal:1.2.3.4:video/mpeg:func-id=hdd].

Next, in Step S756, according to the client request, the connection manger service 431 provides information relating to the other clients currently connected to the server 400. This is information based on the connection management table (see FIGS. 10 and 21).

In Step S757, the connection manager service 431 receives a connection preparation request (PrepareForConnection) from the client. In the case that the client desires delivery processing of the live streaming data using a tuner and the recording processing of the live streaming data, the protocol information corresponding to the tuner-received processing content [internal:1.2.3.4:application/x-av-tuner-content:func-id=t01] and the protocol information corresponding to the hard disk recording processing content [internal:1.2.3.4:video/mpeg:func-id=hdd] are received.

The connection manager service 431 which receives the connection preparation request (PrepareForConnection) from the client determines this to be a request for streaming delivery of the data received by the tuner, based on the protocol information [internal:1.2.3.4:application/x-av-tuner-content:func-id=t01] corresponding to the tuner included in the connection preparation request, and sets (assigns) one of the AVT instances 433 within the content control unit 432 as a tuner control instance, and performs binding processing, that is to say, correlating of the connection ID between the client 460 which sent the connection preparation request (PrepareForConnection) and the tuner control instance, and the AVT instance identifier (AVT instance ID) which is set (assigned) as the tuner control instance.

Further, the connection manager service 431 determines this to be a recording request for the data received by the tuner, based on the protocol information corresponding to the hard disk included in the connection preparation request [internal:1.2.3.4:video/mpeg:func-id=hdd], and sets (assigns) one of the AVT instances 652 within the content control unit 432 as a video capsule control instance, and performs binding processing, that is to say, correlating of the connection ID between the client 460 which sent the connection preparation request (PrepareForConnection) and the video capsule control instance, and the AVT instance identifier (AVT instance ID) which is set (assigned) as the video capsule control instance. As a result, an entry is generated in the connection management table show in FIG. 21.

In Step S759, the connection manager service 431 notifies the client of the two AVT instance IDs of the tuner control instance 433 and the video capsule control instance 652 which are the two assigned AVT instance identifiers, and the two sets of the connection ID information which are set as to the connection between the client and server.

In Step S760, the tuner control instance 433 and the video capsule control instance 652 each receive a URI (Uniform Resource Identifier) setting request from the client.

In Step S761, the tuner control instance ID which is notified from the connection manager service 431 and the channel list URL are set in the tuner control instance, and the video capsule control instance ID and the video capsule URL are set in the video capsule control instance. Further, in Step S761, URI specifying processing of the [internal:1.2.3.4:application/x-av-tuner-content:func-id=t01] source content (AVT:X_SetAVTRecordInputURI action) is executed as to the video capsule control instance 652. The video capsule control instance 652 receives the AVT instance identifier which handles the recorded image target content, that is to say, the video capsule control instance ID, and the image recording source URL, that is to say, the channel list URL from the client, and sets these. Thus, when the image recording target AVT (video capsule control instance 652) performs image recording processing (X_Record action), which image is to be recorded is decided.

So far, the setting processing of each AVT instance is completed, and the client can perform various control requests as to each AVT instance. In Step S762, a the tuner control instance 433 receives a control request, for example for playback starting from the client, and in Step S763, streaming delivery of the content is started by the control of the tuner 410. The tuner control instance 433 executes control based on the received information from the client, such as content playback starting, ending, and channel switching processing, for example.

Further, in Step S764, the video capsule control instance 652 receives a control request, for example an image recording starting request (AVT:X_Record action) from the client, and in Step S765, control of the content storage unit 650 is executed under the control of the video capsule control instance 652, and the tuner-received content is input in the video capsule 651, and image recording is started.

In Step S766, in the case that a channel switching (Seek) request is determined to have been received, the tuner control instance 433 controls the tuner 410 in Step S767, and the tuner channel is switched. The HTTP connection between the server and client before and after this channel switching is the same URL, that is to say, an HTTP connection based on the same channel list URL, and therefore channel switching can be executed while maintaining a connection between the server and client.

Also, the content recording process is executed with no relationship to the channel switching, and the content corresponding to the channel after switching is continuously input to the video capsule, and the recording is continuously executed.

In Step S768, when the connection manager service 431 is determined to have received a connection ending request wherein a connection ID corresponding to the tuner control instance is stored, the connection between the server and client is disconnected in Step S769, according to the request from the client, and further, the entry corresponding to the tuner control instance is deleted from the connection management table which has been described with reference to FIG. 21. Even after the delivery of the streaming data is ended, the data recording continues the recording processing until such time as is the recording ending time as set as the metadata of the video capsule.

Also, the content recording processing can also be ended by the client explicitly issuing a recording ending command to the video capsule control instance 652. Even in the case that this processing is performed, the control of the tuner control instance 433 is independently executed.

Thus, with the present configuration, a tuner control instance for executing streaming delivery control of the tuner-received content under the control of the tuner, and a video capsule control instance for executing recording processing of the tuner-received content under the control of the content storage unit such as a hard disk, are independently set, and a channel list URL and a video capsule URL are set as content URLs capable of specifying the processing control object for each, and further, a control instance ID which is a control instance (AVT instance) identifier is set, and the configuration is such that the requests from the client can be received individually, whereby independent processing according to the client requests is enabled.

[Server-Driven Live Image Recording Processing]

With the above-described live image recording processing, the setting processing of the recording target (recording sink) content identifier (video capsule URL) and the notification processing of the recording source (source) content identifier (channel list URL) as to the video capsule control instance 652 have been executed by outputting a client request as to the video capsule control instance 652 illustrated in FIG. 19.

Figure 20:
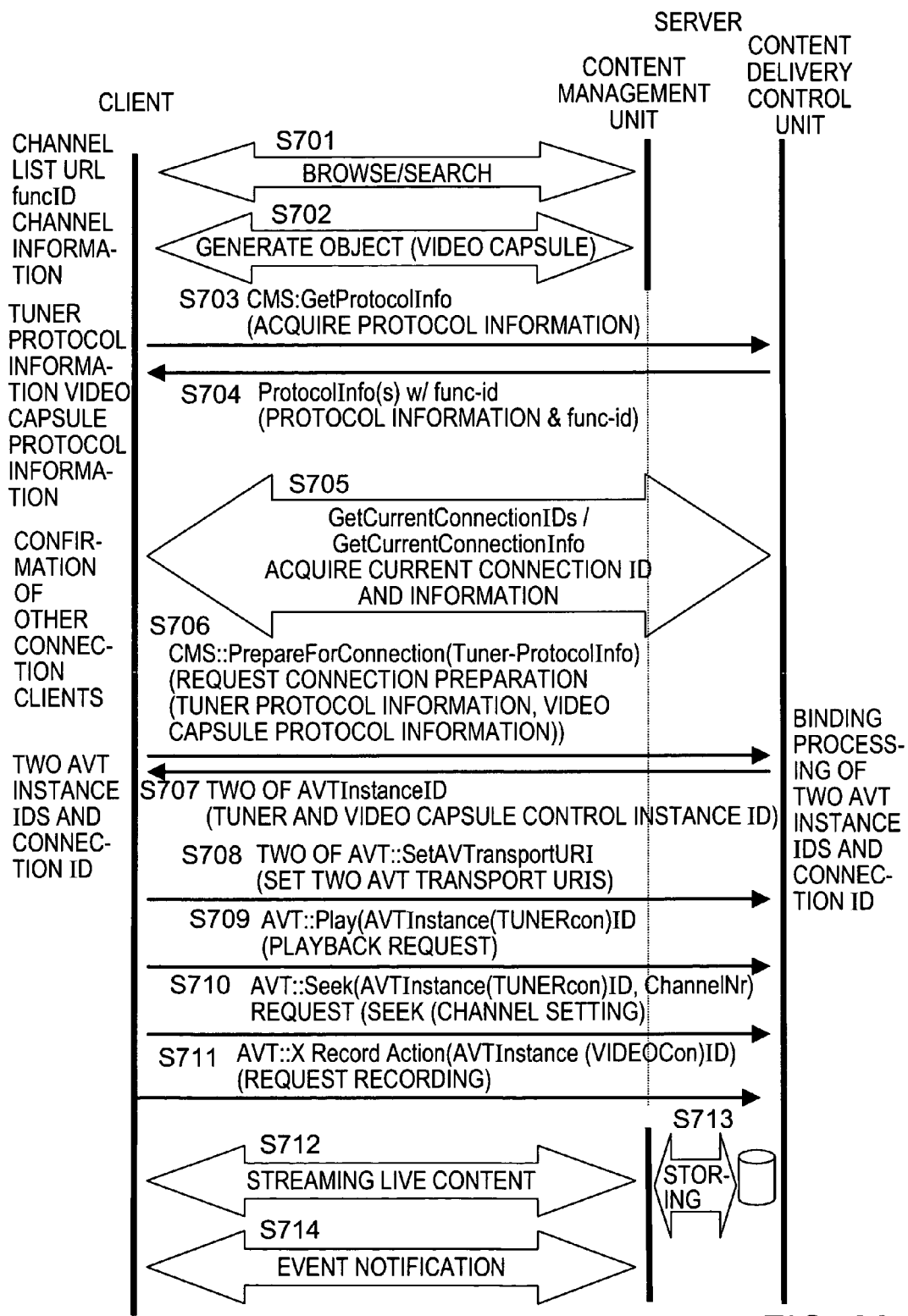
FIG. 20 is a diagram describing the processing sequence between the server and client which executes streaming delivery processing of the tuner-received data and live content recording processing.

In other words, in Step S706 illustrated in the sequence diagram in FIG. 20, the client sends a connection preparation request (PrepareForConnection) as to the connection manager service 431, and sends the protocol information corresponding to the tuner-received content [internal:1.2.3.4:application/x-av-tuner-content:func-id=t01] and the protocol corresponding to the hard disk recording processing content [internal:1.2.3.4:video/mpeg:func-id=hdd], and in Step S707, receives from the server the two control instance (AVT instance) IDs which are the tuner control instance 433 and the video capsule control instance 652, and the two connection ID information which are set as to the connection between the client and server, and in Step S708, the client issues a URI (Uniform Resource Identifier) setting request as to the two control instances (AVT instance), and thus has been executing setup processing for the control instances.

The configuration example described below is a processing example wherein, during the executing of the live streaming, the client simply issues a generating request for a content storage object (video capsule) as to the server, the server then executes various types of settings internally, and content recording is started. The server configuration is similar to that illustrated in FIG. 19, and in the description below, the reference numerals illustrated in FIG. 19 will be used, with reference to FIG. 19.

The server 400 executes the content storage object (video capsule) generating, based on the client request, and also executes control instance of the generated content storage object, that is to say, the assigning processing of the video capsule control instance 652 and the URL setting processing, within the server. By this processing, the video capsule storage processing of the live streaming content which is executed under the control of the tuner control instance 433 can be performed without intervening in the control instance setting processing by the client.

With this processing mode, the client has no need to perform requests for URL setting processing as to the video capsule control instance 652, and the processing burden of the client is lessened.

With FIG. 24, a sequence of one string of a live image recording content will be described. This processing is the processing in the case that the content-receiving is executed by the tuner in the server. For example, between the server and client, live streaming is to be executed under the control of the tuner control instance 433 (see FIG. 19) wherein a string of processing for the purpose of live streaming which was described previously with reference to FIG. 9 is executed, and the channel list URL is set.

In the case that the client is to record (live image recording) live streaming content, in Step S770, a generating request of the video capsule which is a content storage object is performed. The client issues an object generating request (CreatObjectAnywhere) of the content storage object for live image recording as to the content directory service 442 of the server 400 (see FIG. 19), and generates a storage object (video capsule) of the tuner-received content.

The server 400 generates a video capsule for live image recording with the content directory service 442 of the content management unit 440, according to the client request.

At the time when the object generating request (CreateObjectAnywhere) of the content storage object for live image recording is issued, the client can request setting for the metadata of the content storage object (video capsule) to the server. In the case there is a request from the client, the server sets a value based on the request, and in the case there is no request, the server sets a predetermined default value as the metadata of the content storage object (video capsule).

The metadata that can be set in the content storage object (video capsule) for live image recording will be described with reference to FIG. 25. For the metadata settings, [recording status (recordStatus)], [recording starting date and time (recordstart DateTime)], [recording ending date and time (recordEnd DateTime)], [recording quality level (recordQuality Level)], [input function ID (recordInputFuncID)], [recording method (recording Method)], [resource (res)], and [resource protocol information (res@protocolInfo)] are available. Also, the client does not need to set all of these metadata, but for example, the specification of [recording starting date and time (recordStart DateTime)] is optional, and even in the case that there is no specification, in the case of a generating request for the content storage object (video capsule) for live recording, the server executes the assigning, the setting, and the image recording starting of the video capsule control instance 652, in that order. Only in the case of specification information existing is processing performed according to the specification information under the control of the AVT setting and control command output unit 691 and the video capsule control instance 652.

The server 400 determines whether or not the request is a generating request of the content storage object (video capsule) for live image recording, based on the setting value for [recording status (recordStatus)] which is set by the client during generating processing of the content storage object (video capsule). In the case that the setting value of [recording status (recordStatus)] is set as [Recording], which shows that this is for live image recording, the server determines that the request is a generating request of the content storage object (video capsule) for live image recording, and executes generating of a content storage object (video capsule), setting for the video capsule URL, assigning of the video capsule control instance 652, and the URI setting processing, and starts the recording processing of the tuner-received content as to the generated content storage object (video capsule), based on the content recording starting date and time information [000-00-00T00:00:00.000Z for live image recording] which is set as the metadata.

The content management unit 442 of the server sets the content storage object URL (video capsule URL) as the metadata as to the generated object, with the condition that the setting information [recording status (recordStatus)]=[Recording], which shows that the content storage object for reserving content storage is included in the content storage object generating request from the client. In other words, the server determines this to be an object for live image recording, based on the setting information [recording status (recordStatus)]=[Recording], and sets a content URL (video capsule URL) in the newly generated object (video capsule), even if there is actually no content.

[Recording starting date and time] sets the content recording starting date and time information. With live image recording, 000-00-00T00:00:00.000Z is specified. This means that recording can start without waiting.

[Recording ending date and time] sets the content recording ending date and time information, and when the time reaches this time on the server, the image recording is ended if the video capsule is in image recording status. In the case there is no setting information, the server ends image recording after a request from the client, or after a previously set greatest continuous recording time has passed, or if a problem occurs within the server.

[recording quality level] is selected from multiple levels, for example 3 through 5, which are set in advance as recording quality level values.

[input function ID] shows a function ID illustrating a functionality for handling the content which becomes the recorded image source. For example, a function ID is set which corresponds to the tuner. However, the specification of the client is optional. In the case of live image recording, the content received within the server is the input content, and in the case that there is a tuner control instance which has already finished setting, the channel list URL which is set in that tuner control instance is the input source content, and the function ID corresponding to the tuner which is the control object of the tuner control instance which controls the input source content is set by the server.

[recording method] is information showing an image recording method, and is setting information such as triple mode or high image quality mode. Specification of the client is optional, and the client needs to set a value that can be set so as to correspond to the content storage unit 650 within the server.

[resource (res)] is resource information of the recording content (recording sink content). The video capsule URL (video capsule URL) for live image recording which is generated by the server is set by the server.

[resource protocol information] is protocol information corresponding to the recording content (recording sink content) resource. A function ID (for example, func-id=<HDD), which shows that processing of the content storage unit will be performed, is set as additional information (AdditionalInfo).

Thus, a function ID which shows that the content processing by control of the content storage unit 650 is performed is set in the protocol information. In this case, the content storage unit 650 is a hard disk, and shows that the control of the HDD is accompanied. The function ID shows the control object at the time of content processing, as described above, and in the case of corresponding to the DVD storage content, a function ID showing the DVD is set, and in the case of performing tuner control, a function ID showing the tuner is set in the content property information.

The client can check which values can be set for the various metadata items with the following method. The [recording ending date and time], [recording quality level], [input function ID], and [recording method] can be surveyed by acquiring the class schema information which represents the video capsule, from the content directory service 442. At this time, the values which can be set can be obtained by checking the allowed value (Allowedvalue) of each metadata. Also, in the case that updating is allowed, updating by the object updating (UpdateObject) processing is enabled.

Also, the client can discover the meaning of the value of the function ID (func-id) by the protocol information which can be acquired from the content directory service 442.

Figure 24:
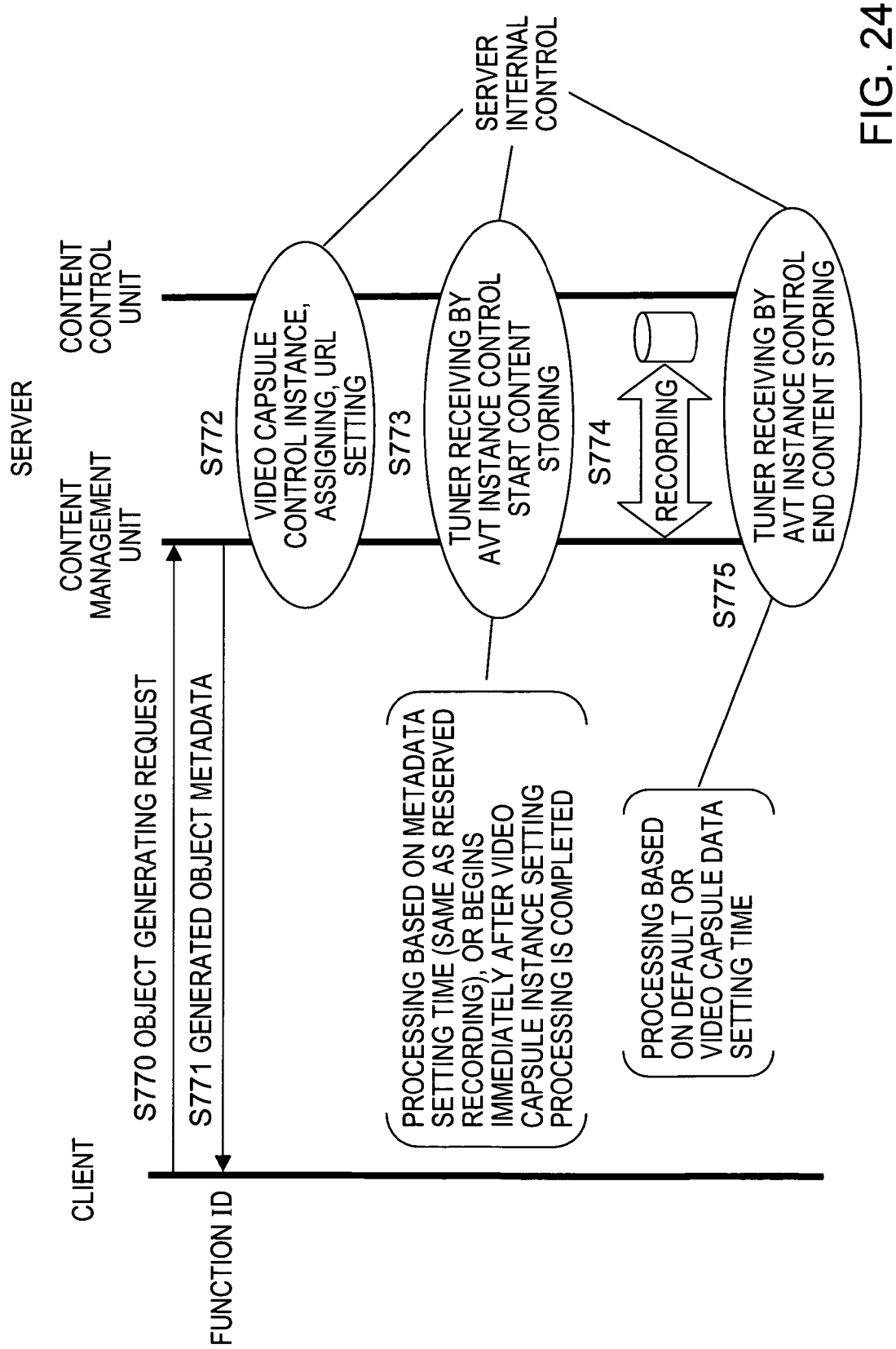
FIG. 24 is a sequence diagram describing the processing of the server and client when executing the live content recording processing.

Returning to the sequence diagram in FIG. 24, the processing sequence for live image recording will continue to be described. The content directory service 442 of the server executes the generating processing in Step S770 for the video capsule which is the content storage object.

The server 400 generates a video capsule for live image recording in the content directory service 442 of the content management unit 440, according to a client request. The server sets the content storage object URL (video capsule URL) as the metadata as to the generated object, with the condition that the setting information [recording status (recordStatus)]=[Recording], which shows that the content storage object for reserving content storage is included in the content storage object generating request from the client, and further, sets the various above-described metadata.

In Step S771, the server sends the metadata corresponding to the generated content storage object URL (video capsule URL) to the client. The meta information to be sent to the client includes resource protocol information which includes a video capsule URL and a function ID for example [func-id=hdd] as the resource information.

Next, in Step S772, the server sets the video capsule control instance 652 (see FIG. 19), based on the metadata of the generated video capsule. At this time, the tuner control instance 433 has already been set. The processing of this Step S772 and the processing of the Steps S773 through S775 to be described below are executed as internal processing within the server, and communication processing between the client and server is not necessary.

With the processing in Step S772, the video capsule control instance 652 is assigned, and the image recording target content URL, that is to say, the video capsule URL is set as to this control instance. Further, setting of the recorded image source content URI is executed as to the video capsule control instance 652. These processes are executed based on the setting information of the video capsule metadata. Thus, when the image recording target AVT (video capsule control instance 652) performs image recording processing, the image to be recorded is determined.

In Step S773, with the condition that the time has reached the [recording starting date and time] set in the metadata of the video capsule, the storage processing of the video capsule 651 of the tuner-received content is started under the control of the video capsule control instance 652, and in Step S774, content recording is executed as to the video capsule 651 of the content storage unit 650.

The [recording starting date and time] set in the metadata of the video capsule is specified as 0000-00-00T00:00:00.000Z for live image recording, as described above, this means that the recording is started without waiting, and after the server generates the content storage object (video capsule) for live image recording, and assigns and sets the video capsule control instance 652, immediately follows by executing the starting of the image recording under the control of the video capsule control instance 652.

In Step S775, with the condition that the time has reached the [recording ending date and time] set in the metadata of the video capsule, or based on a recording ending request received from the client, the storage processing of the video capsule 651 of the tuner-received content is ended under the control of the video capsule control instance 652. In the case that there is no setting metadata and also no recording processing request from the client, the recording processing is ended with the condition that for example a predetermined continuous recording time has been reached.

Also, a temporary stopping processing of the content recording processing, that is to say, a pausing processing can also be executed. The content pausing processing sequence will be described with reference to FIG. 26. In Step S781, the client first sends a connection preparation request (PrepareForConnection) to the connection manager service 431 of the server 400 wherein is specified a function ID, for example [func-id=hdd], in the video capsule metadata received from the server in the previous Step S771 in FIG. 24. This connection preparation request (PrepareForConnection) is the connection preparation request (PrepareForConnection) relating to the connection between the client and the video capsule control instance 652.

The connection manager service 431 that receives the connection preparation request (PrepareForConnection) from the client notifies the client with the identifier (AVT instance ID) for the video capsule control instance 652 and the connection ID for the client 460 that sent the connection preparation request (PrepareForConnection) and the video capsule control instance 652, based on the function ID [func-id=hdd] corresponding to the hard disk included in the connection preparation request. The connection manager service 431 further performs binding processing, that is to say, correlating of the connection ID and the identifier (AVT instance ID) for the video capsule control instance. Entry setting is performed for the connection management table, as described earlier with reference to FIGS. 10 and 21.

In Step S782, when the client specifies an identifier (AVT instance ID) for the video capsule control instance, and sends a pause request (AVT::Pause action) to the video capsule control instance 652, the video capsule control instance 652 performs image recording pausing, based on the request.

Further, in Step S783, when the client specifies an identifier (AVT instance ID) for the video capsule control instance, and sends a recording starting request (AVT::Record) to the video capsule control instance 652, the video capsule control instance 652 restarts content recording, based on the request.

Next, the ending processing of the live recording processing based on the client request will be described with reference to FIG. 27. In Step S791, when the client specifies the identifier (AVT instance ID) of the video capsule control instance, and sends a recording stopping request (AVT:: RecordStop) is sent to the video capsule control instance 652, the video capsule control instance 652 stops content recording, based on the request.

Further, the client which is attempting to end the connection with the video capsule control instance sends a connection ending request, wherein a connection ID corresponding to the connection with the video capsule control instance is stored, to the connection manager service 431 in step S792. The connection manager service 431 performs disconnecting of the connection between the client and the video capsule control instance, according to the client request, and further, deletes the corresponding entry from the connection management table which has been described with reference to FIG. 10.

As mentioned above, with the present configuration, the assigning process of the video capsule control instance 652 as the control instance of the content delivery control unit 431 based on the video capsule metadata, and the URI setting process as to the video capsule control instance 652, are executed within the server, and the various controls accompanying the storage processing of the live input content is accurately executed based on the metadata of the video capsule, without explicit control instance setting processing by the client.

Thus, with the present configuration, the video capsule control instance, which controls the content storage unit such as a hard disk and executes the recording processing of the tuner-received content, is set, and the server executes the setting processing of the channel list URL and video capsule URL as the content URLs specifying the recording source content and the recording target content to the video capsule control instance, and the content recording can be accurately executed according to the setting information of the metadata of the video capsule.

In the case that the client acquires and plays back the content of the video capsule wherein content is stored by the live image recording, the content corresponding to the video capsule URL, that is to say, the content of live image recording can be received and played back, by generating an HTTP (Hyper Text Transfer Protocol) GET method which is a content acquiring request based on the video capsule URL set in the live image recording video capsule, and sending this to the server.

Also, during executing of the live image recording, the client can perform content playback which is similar to the time shift playback in the above-described live streaming, by generating an HTTP (Hyper Text Transfer Protocol) GET method which is a content acquiring request based on the video capsule URL set in the video capsule, and sending this to the server.

[Server and Client Function Configuration]

The hardware configuration of the server and the client device are as described previously with reference to FIG. 2, and the above-described various processing, for example the processing which has been described with reference to the flow charts in FIGS. 17, 18, 22, and 23 are executed under the control of the CPU primarily, according to the program wherein the storage units of each of the server and client are stored. The function configuration of the server and the function configuration of the client which are necessary for executing the above-described processing will be described with reference to FIGS. 28 and 29.

Figure 28:
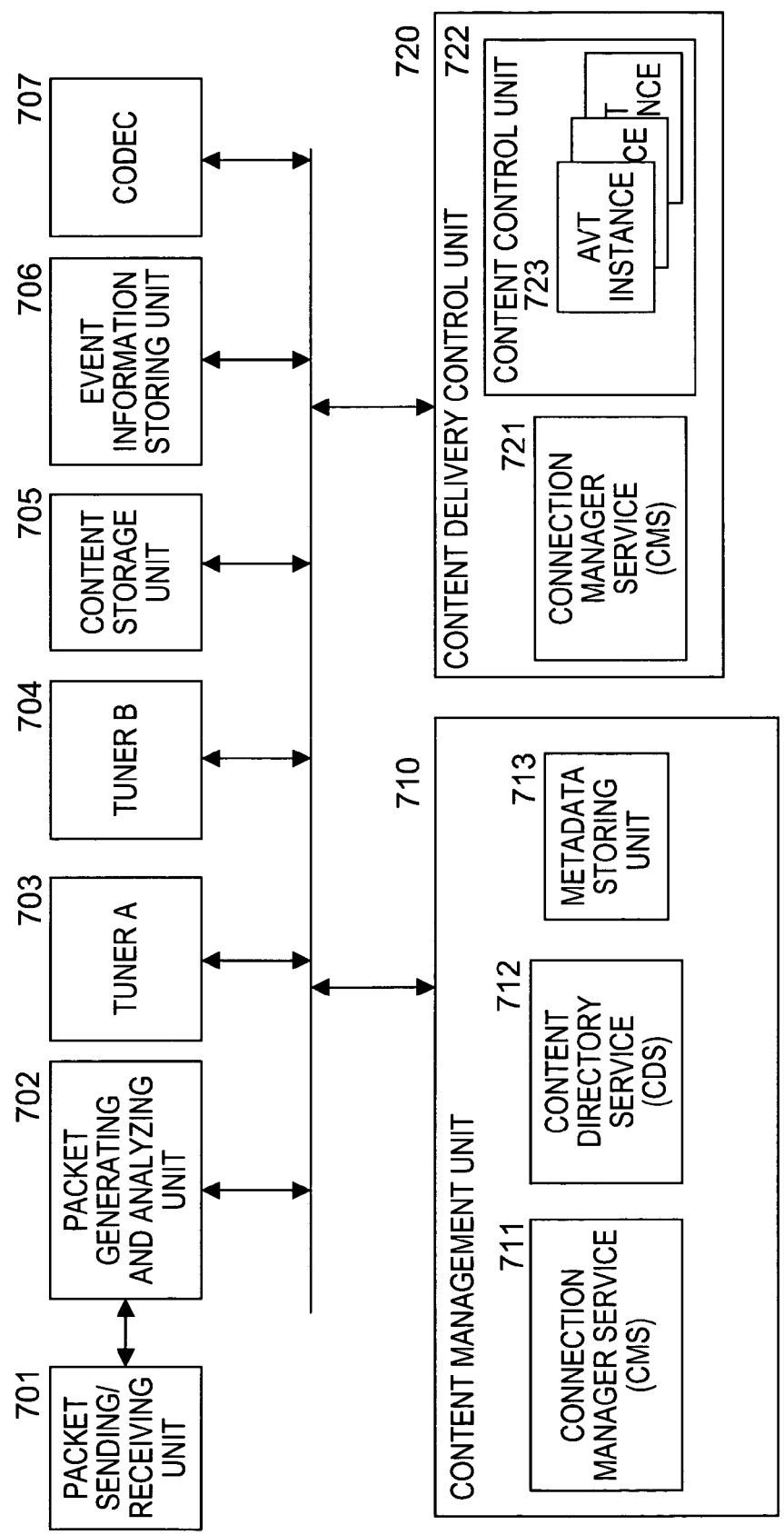
FIG. 28 is a block diagram describing the processing functionality of the server.

FIG. 28 is a block diagram illustrating the principal function configuration of the server. Basically this corresponds to the configuration illustrated in FIG. 6, but the configuration in FIG. 28 shows a configuration example with two tuners. A packet sending/receiving unit 701 receives a packet to the client and a packet from the client. A packet generating/analyzing unit 702 performs generating processing of the sending packet and analyzing processing of the receiving packet. This performs address setting of the packet, address recognition, data storage as to the data section, data acquiring processing from the data section and so forth.

A tuner A703 and a tuner B704 are tuners which receive data via terrestrial broadcasting, satellite broadcasting such as BS, CS, and so forth, and the Internet and other communication networks.

A content storage unit 705 stores the content retained by the server. Content storage objects, such as the above-described video capsules and so forth, are set. The various contents can be specified by a content URL such as a video capsule URL. An event information storage unit 706 stores the event information corresponding to the content. The various event information can be specified by the event URL.

A codec 707 converts the content retained by the server and the tuner-received content into the data mode corresponding to the request from the client. This executes conversion regarding such as file format, codec, resolution, and so forth. For example, data conversion is executed based on ATRAC3 and MPEG4.

The content management unit is a processing unit for executing content management, and a metadata storage unit 713 is a storage unit which stores the metadata as the attribute information corresponding to the content. As described above, property information configuring the metadata which corresponds to the various object of the container and so forth are stored in the metadata storage unit 713. For example, as the property information of the tuner container, the channel list URL is set. A video capsule URL is set as to the video capsule. A connection manager service 711 generates content information based on the metadata, according to the content information request form the client. The connection manager service 711 manages the connection with the client in the content management unit, and provides protocol information and so forth to the client which can be processed in the content management unit.

A content delivery control unit 720 executes control of the delivery content to the client, and comprises a connection manager service 721 and a content control unit 722. An AVT instance 723 corresponding to the delivery content is set in the content control unit 722, and the AVT instance corresponding to each content executes delivery control and recording control of specific content. The connection manager service 721 assigns an AVT instance, and sets a connection management table (see FIG. 10) which correlates and manages the connection ID, the AVT instance ID and the protocol information, and performs connection management.

Next, the function configuration of the client device will be described with reference to FIG. 29. A packet sending/receiving unit 801 receives a packet to the server and a packet from the server. A packet generating/analyzing unit 802 performs generating processing of the sending packet and analyzing processing of the received packet. This performs not only storage data analysis within the packet, but also includes address setting of the packet, address recognition, data storage as to the data section, data acquiring processing from the data section and so forth.

A storage unit 803 stores content information, content, channel information, channel list URLs, function IDs, event information, connection IDs, AVT instance IDs and the like which are included in the packets received from the server.

An output unit 804 includes a speaker and a display used for content playback processing. The display is also used in the output of the display information which has been previously described with reference to FIG. 4. An input unit 805 is data input means, such as a keyboard for executing user input, for example, for selection of the channel list as the content information displayed as the display information, or channel selection based on the channel information.

A content information analyzing unit 806 analyzes the XML data formed from the content information received from the server, and based on the analyzed data, generates display information including the content URLS and channel list URLs which have been described previously with reference to FIG. 4, or the linked data thereof, and executes processing to output this into a display which is the output unit.

A content playback control unit 807 executes playback control of the content received from the server. With the content playback processing, conversion processing of the content received from the server is executed, as needed, in a data conversion unit 808. For example, data decoding processing based on ATRAC3 or MPEG4 is executed.

Figure 29:
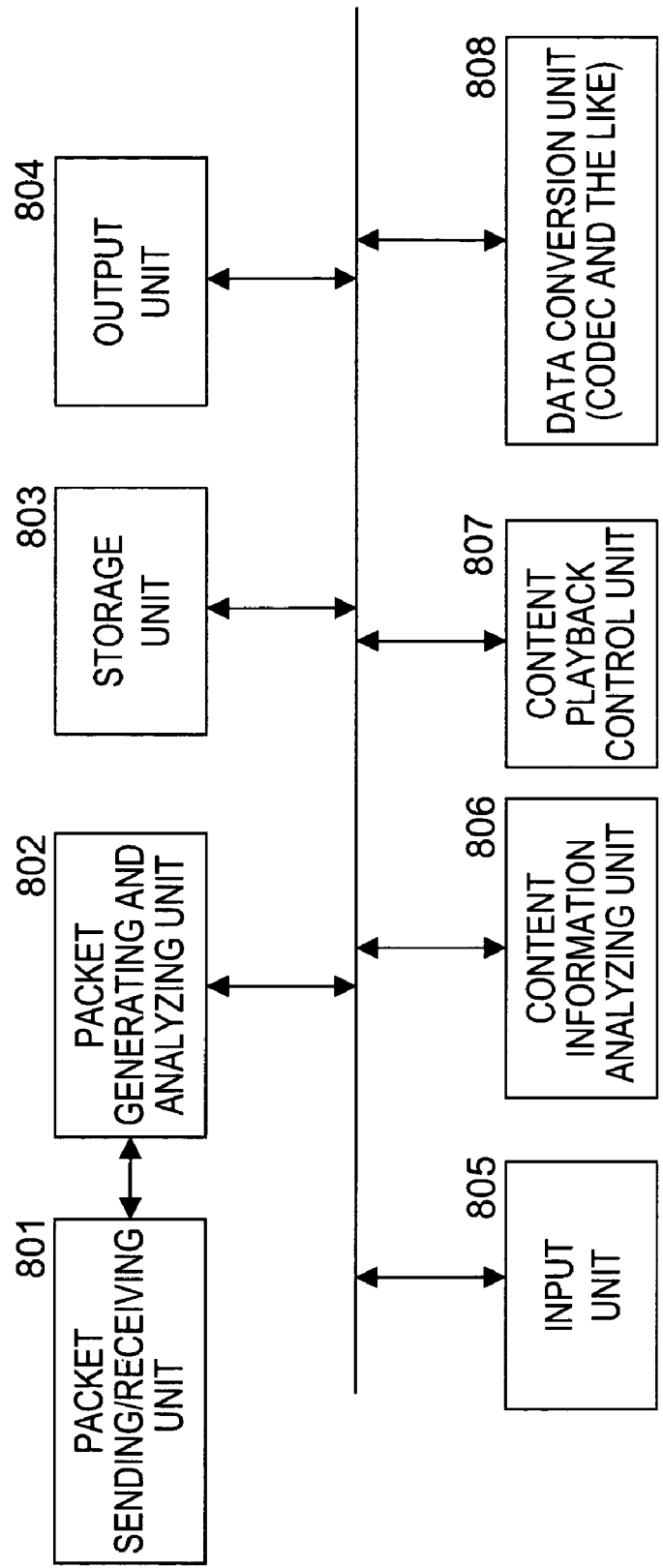
FIG. 29 is a block diagram describing the processing functionality of the client.

The server and the client functionally have the various functions illustrated in FIGS. 28 and 29, and execute the various above-described processing. However, the block diagrams illustrated in FIGS. 28 and 29 are block diagrams to describe functionality, and in actuality, various types of processing programs are executed under the control of the CPU with the hardware configuration such as the PC and so forth illustrated in FIG. 2.

Until this point, the present invention has been described in detail with reference to specific embodiments. However, it goes without saying that those skilled in the art can make modifications and substitutions in the range of not diverting from the subject matter of the present invention. In other words, the present invention has been disclosed in the form of examples, and should not be interpreted in a limited manner.

In order to determine the subject matter of the present invention, the appended claims should be referenced.

The series of processing described within the Specification herein can be executed by hardware or software, or a joint configuration of both. In the case of executing the processing by software, the program wherein the processing sequence is recorded is installed in the memory within the computer which is built into specific hardware and executed, or alternatively, installed into a general-purpose computer capable of executing various types of processing, and executed.

For example, the program can be stored in advance in a hard disk or ROM (Read Only Memory) which is a storage medium. Also, the program can be stored (recorded) temporarily or permanently in a removable storage medium such as a flexible disk, a CD-ROM (Compact Disc Read Only Memory), an MO (Magneto-optical) disk, a DVD (Digital Versatile Disc), a magnetic disk, or a semiconductor memory. Such removable storage media can be provided as so-called packaged software.

Now, other than installing the program from a removable storage medium as described above into a computer, it can be wirelessly transferred to a computer from a download site, or transferred by wire into a computer via a network such as a LAN (Local Area Network) or the Internet, and the computer can receive the program transferred as such, and can install it into the internal storage medium such as a hard disk or the like.

The various processing described in the Specification is not only to be executed in a time-series according to the description, but according to the processing ability of the device executing the processing, or as needed, the processing can be executed concurrently or individually. Also, a system according to the present Specification is a logical aggregate configuration of multiple devices, and is not limited to a configuration of devices within the same enclosure.

INDUSTRIAL APPLICABILITY

According to the present invention, as described above, this is configured such that a tuner control instance which executes streaming delivery control of the tuner-received content under the control of the tuner, and a storage unit control instance (video capsule control instance) which executes recording processing of the tuner-received content under the control of the content storage unit such as a hard disk, are independently set, and to each a channel list URL and video capsule URL are set as the content URL capable of specifying the processing control object, and requests can be requested from the client individually by setting a control instance ID which is a control instance (AVT instance) identifier, and therefore, independent processing according to the client request is enabled.

Also, with the configuration of the present invention, URI specification processing of the recorded image source content (AVT:X_SetAVTRecordInputURI action) is executed as to the AVT instance which handles the image recording target content, that is to say, video capsule control instance, and the recorded image source content URL, that is to say, the channel list URL is notified to the storage unit control instance (video capsule control instance), and therefore the storage unit control instance can specify the image recording processing objects independently.

Further, with the configuration of the present invention, a URL is set in the channel list as a channel aggregate, and the channel list URL is set in the tuner control instance as the recording source content identifier, and therefore when changing channels within the list, a content request based on a new URL does not need to be performed and continued content delivery is enabled, and the content recording can be executed after switching channels, without the content recording processing being interrupted.

The invention claimed is:

1. A content-providing server for executing content transmission to a client and content recording processing, the server comprising:
 a tuner;
 a data transmitter/receiver executing communication processing between the server and a client, wherein the communication processing includes communication of control information and content received by the tuner, the received content including a first content received by the tuner over a first channel and a second content received by the tuner over a second channel, the first channel being associated with a first Uniform Resource Locator (URL) and the first content being received by accessing the first URL, the second channel being associated with a second Uniform Resource Locator (URL) and the second content being received by accessing the second URL;
 a memory device including:
  a metadata storage storing attribute information corresponding to the received content, wherein the attribute information is stored as content information; and
  a content storage storing the received content in an hierarchical content management directory, wherein the metadata storage unit includes information describing the hierarchical management directory;
 a content manager processing the content information to be provided to the client; and
 a content deliverer processing the received content, the content deliverer comprising:
  a tuner control instance for arranging the first content and the second content as a unit of content by aggregating the first URL and the second URL to generate a combined URL that provides access to the unit of content, wherein a recording source content identifier is set corresponding to the unit of content, and the recording source content identifier is the combined URL; and
  a storage control instance for storing the unit of content, wherein a recording target content identifier is set corresponding to the unit of content,
 wherein the data transmitter/receiver uses the combined URL to provide access to the first content and the second content to the client by establishing a connection between the server and the client, and
 wherein the combined URL is used to switch between the first content and the second content by maintaining the connection and without setting a new URL to switch from the first content that is received over the first channel to the second content that is received over the second channel.

2. The content-providing server according to claim 1, wherein the recording source content identifier is included in the storage control instance, and the storage control instance processes the first content and the second content based on the recording source content identifier.

3. The content-providing server according to claim 1, wherein the content manager processes the content information based on the content management directory, and wherein the tuner control instance and the storage control instance set the recording source content identifier and the recording target content identifier based on a request from the client.

4. The content-providing server according to claim 1, wherein the combined URL identifies a channel list including the first channel and the second channel, and wherein the first content and the second content is provided to the client based on a control request received from the client, the control request including the combined URL.

5. The content-providing server according to claim 1, wherein the recording source content identifier identifies a content storage object included in the content storage.

6. The content-providing server according to claim 1, wherein the content manager is configured to store setting information corresponding to the received content, the setting information including time information and recording quality information, and wherein the recording target content identifier is set based on the setting information.

7. The content-providing server according to claim 1, wherein the content manager is configured to set a content storage object URL as the metadata.

8. The content-providing server according to claim 1, wherein the first content is live content, and providing the first content includes live streaming of the first content to the client.

9. The content-providing server according to claim 1, wherein the recording target content identifier includes a content storage object URL.

10. The content-providing server according to claim 1, wherein the content information includes protocol information including a function ID to identify the tuner, the function ID being used to determine the tuner control instance and the storage control instance.

11. The content-providing server according to claim 1, wherein the content deliverer is configured to set a control instance that is configured to manage a connection between the server and the client based on a connection management table corresponding to an instance ID, the instance ID identifying the tuner control instance and the storage control instance.

12. The content-providing server according to claim 1, wherein the content deliverer receives a Simple Object Access (SOAP) protocol content request from the client.

13. An information processing device requesting content received by a tuner in a server, the information processing device comprising:
 a memory device storing instructions; and
 a processor executing the instructions for:
  receiving, by the tuner, content over a plurality of channels, the received content including a first content received by the tuner over a first channel and a second content received by the tuner over a second channel, the first channel being associated with a first Uniform Resource Locator (URL) and the first content being received by accessing the first URL, the second channel being associated with a second Uniform Resource Locator (URL) and the second content being received by accessing the second URL;
  storing the received content in a hierarchical content management directory;
  storing metadata including attribute information associated with the received content, the metadata including information describing the hierarchical content management directory;
  arranging the first content and the second content as a unit of content by aggregating the first URL and the second URL to generate a combined URL that provides access to the unit of content;
  setting a recording source content identifier associated with the unit of content and used by a tuner control instance, wherein the tuner control instance is used to send the received content to a client, and the record source content identifier is the combined URL;

setting a recording target content identifier to be used by a storage control instance to control the storing of the received content;

receiving, from the client, a control request identifying the tuner control instance or the storage unit control instance; and providing access to the first content and the second content to the client by using the combined URL over a connection established between the server and the client, wherein the combined URL is used to switch between the first content and the second content by maintaining the connection and without setting a new URL to switch from the first content that is received over the first channel to the second content that is received over the second channel.

14. The information processing device according to claim 13, wherein the processor sends a request to set the recording source content identifier, the recording source content identifier being used by a control instance of the tuner to execute content control.

15. The information processing device according to claim 13, wherein the processor sends a request to set a recording target content identifier.

16. An information processing method for executing processing of content received from a tuner in a server, the method comprising:

receiving, by the tuner, content over a plurality of channels, the received content including a first content received by the tuner over a first channel and a second content received by the tuner over a second channel, the first channel being associated with a first Uniform Resource Locator (URL) and the first content being received by accessing the first URL, the second channel being associated with a second Uniform Resource Locator (URL) and the second content being received by accessing the second URL;

storing the received content in a hierarchical content management directory;

storing metadata including attribute information associated with the received content, the metadata including information describing the hierarchical content management directory;

arranging the first content and the second content as a unit of content by aggregating the first URL and the second URL to generate a combined URL that provides access to the unit of content;

setting a recording source content identifier associated with the unit of content and used by a tuner control instance, wherein the tuner control instance is used to send the received content to a client, and the record source content identifier is the combined URL;

setting a recording target content identifier to be used by a storage unit control instance to control the storing of the received content;

receiving, from the client, a control request identifying the tuner control instance or the storage unit control instance; and providing access to the first content and the second content to the client by using the combined URL over a connection established between the server and the client, wherein the combined URL is used to switch between the first content and the second content by maintaining the connection and without setting a new URL to switch from the first content that is received over the first channel to the second content that is received over the second channel.

17. The information processing method according to claim 16, further comprising:
setting the recording source content identifier used by a recording unit control instance.

18. The information processing method according to claim 16, further comprising:
storing the recording target content identifier as the metadata; and
processing the metadata based on a request from the client.

19. The information processing method according to claim 16, wherein the combined URL identifies the first channel and the second channel.

20. The information processing method according to claim 16, wherein the recording target content identifier identifies a content storage object included in a content storage region in the server.

21. The information processing method according to claim 16, further comprising:
processing setting information associated with the received content, the setting information including time information and recording quality information, wherein the recording target content identifier is set based on the setting information.

22. The information processing method according to claim 16, further comprising:
setting a content storage object URL as the metadata.

23. The information processing method according to claim 16, wherein the first content is live content and providing the first content includes live streaming of the first content to the client.

24. The information processing method according to claim 23, wherein the recording target content identifier includes a content storage object URL.

25. The information processing method according to claim 16, further comprising:
setting protocol information associated with the received content, the protocol information including a function ID to identify the tuner control instance and the storage unit control instance.

26. The information processing method according to claim 16, further comprising:
setting a control instance configured to manage a connection between the server and the client based on a management table corresponding to an instance ID, the instance ID identifying the tuner control instance and the storage unit control instance.

27. The information processing method according to claim 16, wherein the control request, received from the client, is based on a SOAP protocol.

28. A non-transitory computer-readable storage medium storing a program that, when executed on a processor of a server, causes the processor to perform a method for executing processing of content received by a tuner in the server, the method comprising:

receiving, by the tuner, content over a plurality of channels, the received content including a first content received by the tuner over a first channel and a second content received by the tuner over a second channel, the first channel being associated with a first Uniform Resource Locator (URL) and the first content being received by accessing the first URL, the second channel being associated with a second Uniform Resource Locator (URL) and the second content being received by accessing the second URL;

storing the received content in a hierarchical content management directory;

storing metadata including attribute information corresponding to the received content, the metadata including information describing the hierarchical content management directory;

arranging the first content and the second content as a unit of content by aggregating the first URL and the second URL to generate a combined URL that provides access to the unit of content;

setting a recording source content identifier corresponding to the unit of content and being used by a tuner control instance, wherein the tuner control instance is used to send the received content to a client, and the record source content identifier is the combined URL;

setting a recording target content identifier used by a storage unit control instance to control the storing of the received content;

receiving, from the client, a control request identifying the tuner control instance or the storage unit control instance; and providing access to the first content and the second content to the client by using the combined URL over a connection established between the server and the client, wherein the combined URL is used to switch between the first content and the second content by maintaining the connection and without setting a new URL to switch from the first content that is received over the first channel to the second content that is received over the second channel.

* * * * *